United States Patent

Cheng et al.

[11] Patent Number: 5,883,796
[45] Date of Patent: Mar. 16, 1999

[54] DYNAMIC SERIES VOLTAGE RESTORATION FOR SENSITIVE LOADS IN UNBALANCED POWER SYSTEMS

[75] Inventors: Po-Tai Cheng; Robert H. Lasseter; Deepakraj M. Divan, all of Madison, Wis.

[73] Assignee: Wisconsin Alumni Research Foundation, Madison, Wis.

[21] Appl. No.: 835,212

[22] Filed: Apr. 7, 1997

[51] Int. Cl.⁶ .................................................. H02M 1/12
[52] U.S. Cl. .............................. 363/40; 307/105; 361/76
[58] Field of Search ....................... 307/64, 105; 363/40; 361/76, 88

[56] References Cited

U.S. PATENT DOCUMENTS

| | | |
|---|---|---|
| 4,067,053 | 1/1978 | Chow . |
| 4,131,844 | 12/1978 | Hucker et al. . |
| 4,238,688 | 12/1980 | Boettcher, Jr. et al. . |
| 4,453,122 | 6/1984 | Johnson et al. . |
| 4,651,265 | 3/1987 | Stacey et al. . |
| 5,148,362 | 9/1992 | Braun et al. . |
| 5,198,746 | 3/1993 | Gyugyi et al. . |
| 5,329,222 | 7/1994 | Gyugyi et al. . |
| 5,384,696 | 1/1995 | Moran et al. . |
| 5,465,203 | 11/1995 | Bhattacharya et al. . |
| 5,513,090 | 4/1996 | Bhattacharya et al. . |
| 5,642,003 | 6/1997 | Edwards et al. ........................... 307/64 |
| 5,731,965 | 3/1998 | Cheng et al. .............................. 363/41 |
| 5,757,099 | 5/1998 | Cheng et al. ............................ 307/105 |

OTHER PUBLICATIONS

I. Takahashi & A. Nabae, "Universal Power Distortion Compensator of Line Commutated Thyristor Converter", Proc. IEEE/IAS Annu. Meeting, pp. 858–864, 1980.

Hirofumi Akagi, et al., "Instantaneous Reactive Power Compensators Comprising Switching Devices without Energy Storage Components", IEEE Trans. Indus. App., vol. IA–20, No. 3, pp. 625–630, 1984.

T. Kawabata, et al., "Three Phase Parallel Processing UPS Using Multi–Functional Inverter", Proc. 24th Ann. IEEE IAS Meeting, Oct. 1–5, 1989, San Diego, CA, pp. 982–987.

T. Kawabata, et al., "Parallel Processing Inverter System", IEEE Trans. Power Electronics, vol. 6, No. 3, pp. 442–450, Jul., 1991.

Mark F. McGranaghan, et al., "Voltage Sags in Industrial Systems", IEEE Trans. Indus. App., vol. 29, No. 2, pp. 397–402, Mar./Apr. 1993.

Giri Venkataramanan, et al., "Discrete Pulse Modulation Strategies for High–Frequency Inverter Systems", IEEE Trans. Power Electronics, vol. 8, No. 3, pp. 279–287, Jul., 1993.

(List continued on next page.)

*Primary Examiner*—Shawn Riley
*Attorney, Agent, or Firm*—Foley & Lardner

[57] ABSTRACT

A method and apparatus is provided for restoring a sagging voltage signal on a power transmission line, caused by a remote fault in the utility power system, to a balanced three-phase condition at the pre-fault voltage level. Voltage restoration is provided by injecting a voltage signal in series with the power transmission line which restores the load voltage vectors to the pre-fault condition. The restored load voltage vectors are rotated by a selected phase angle such that zero real power flow is associated with the voltage restoration. The voltage compensation signal may be injected into the power transmission line by connecting a voltage compensator inverter in series with the transmission line. The voltage compensator inverter may be controlled to provide the desired injected voltage signal using a synchronous reference frame based controller. The voltage restoration function may be achieved by controlling the inverter to generate an inverter voltage signal which restores the positive sequence load voltage component to pre-fault conditions, and which cancels negative and zero sequence components of the load voltage signal. Phase rotation to ensure the zero power flow condition is achieved by controlling the inverter to generate an inverter voltage signal which balances the voltage across a DC bus capacitor which powers the inverter. Uninterruptible power supply and active harmonic filtering functions may be provided by the system.

53 Claims, 25 Drawing Sheets

OTHER PUBLICATIONS

Alexandre Campos, et al., "Dynamic Analysis and Design of Static Series Compensators for Unbalanced AC Voltage Supplies", Proc. of the 29th Annual IAS Meeting, Denver, CO, Oct. 2–6, 1994, pp. 954–961.

Narain G. Hingorani, "Introducing Custom Power", IEEE Spectrum, Jun., 1995, pp. 41–48.

Ned Mohan & Girish R. Kamath, "A Novel, Per–Phase Interface of Power Electronic Apparatus for Power System Applications", presented at NAPS 95, Bozeman, Montana, 1995.

Po–Tai Cheng, et al., "Hybrid Solutions for Improving Passive Filter Performance in High Power Applications", IEEE Trans. Indus. App., vol. 33, No. 3, pp. 732–747, May–Jun., 1997.

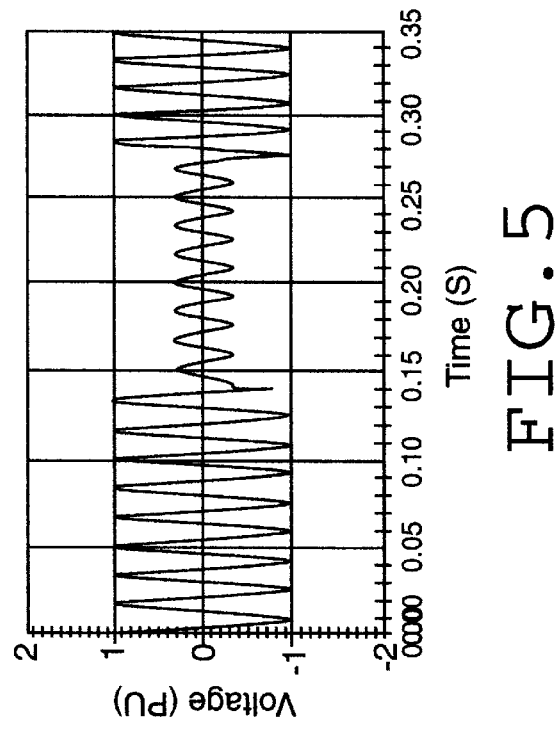
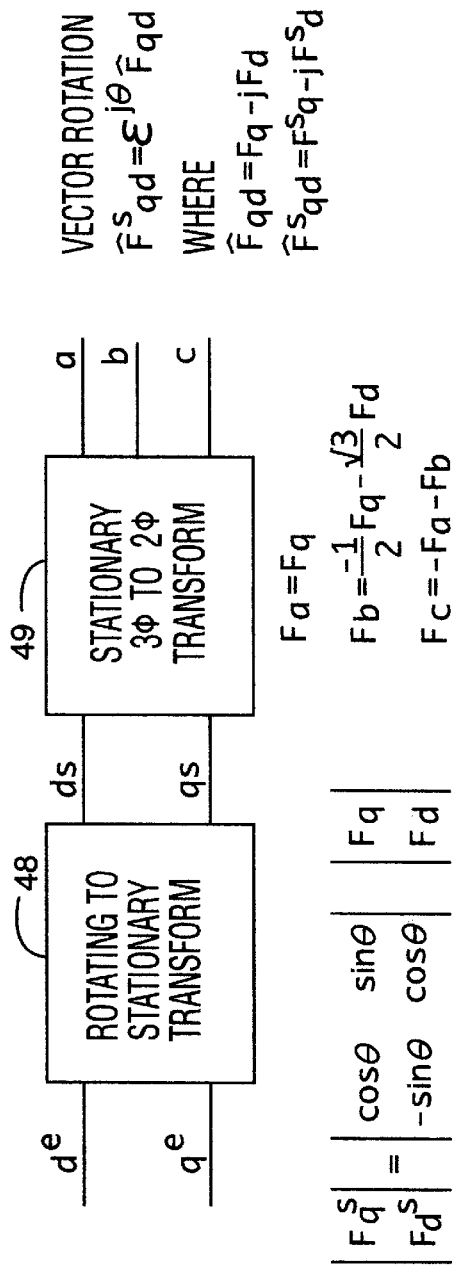
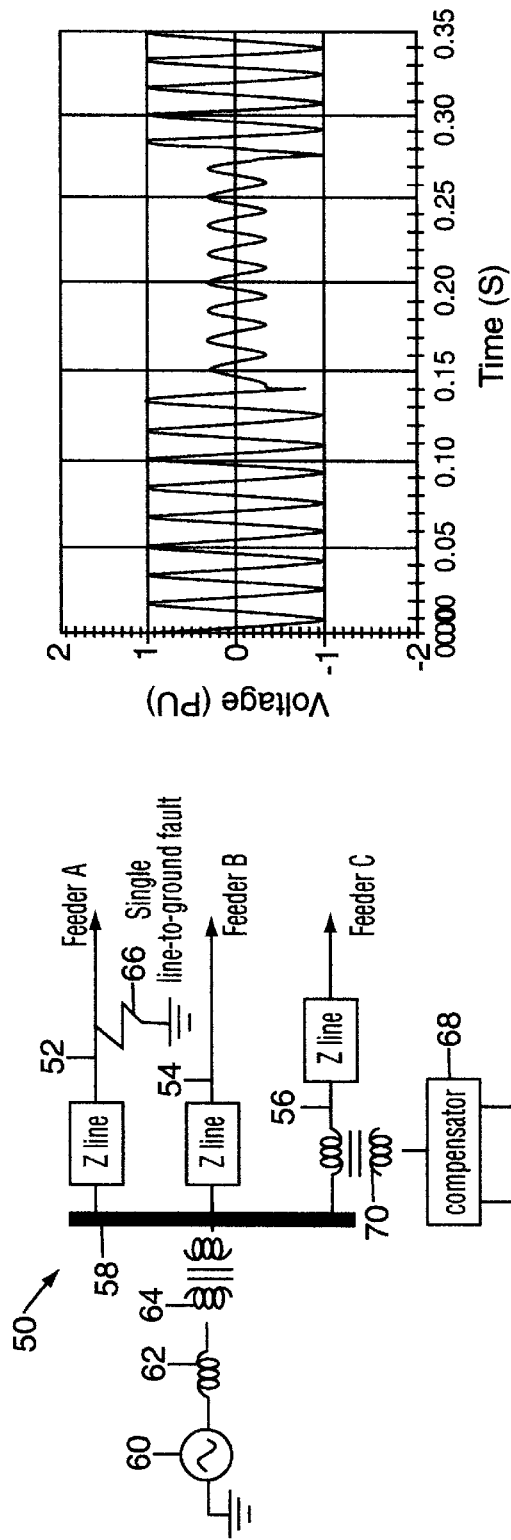

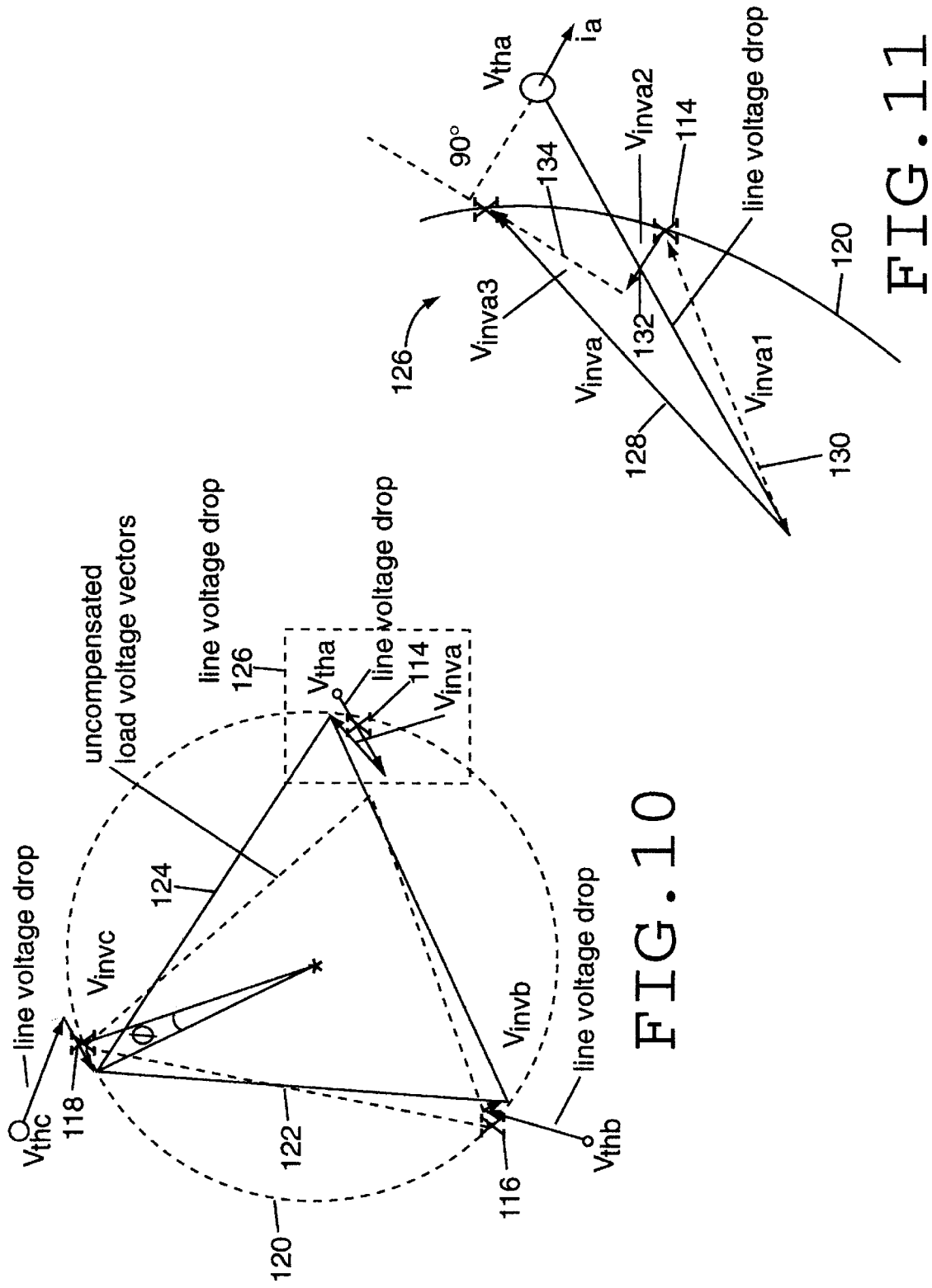

DYNAMIC SERIES VOLTAGE RESTORATION FOR SENSITIVE LOADS IN UNBALANCED POWER SYSTEMS

This invention was made with United States Government support awarded by the following agencies: DOE Grant No.: DE-FC65-95WA13229 and NSF Grant Nos.: EEC-9615778 and ECS-9216520. The United States Government has certain rights in this invention.

FIELD OF THE INVENTION

This invention pertains generally to multi-phase AC power systems and devices, and more particularly to methods and devices for maintaining constant AC voltage levels on the feeder branches of utility power distribution networks by dynamically compensating for transient disturbances in the distribution network so as to reduce and substantially eliminate power quality problems such as voltage sags.

BACKGROUND OF THE INVENTION

Two of the most important power quality problems facing industrial customers of electrical power utilities are voltage sags and voltage interruptions. A voltage sag is a momentary (i.e., 0.5–30 cycle) decrease in the RMS voltage magnitude provided to the customer. Voltage interruptions occur when a protective device actually interrupts the power provided to a particular customer. Voltage interruptions will normally only occur if there is a fault on the particular circuit that is being interrupted. Voltage sags, however, may occur during the period of a fault for faults over a wide part of a power system network. Faults on parallel feeder circuits or on remote parts of a power transmission system will cause voltage sags in many parts of the power system, but typically will not result in actual voltage interruptions. Voltage sags are thus much more frequent than voltage interruptions. For equipment that is sensitive to voltage sags, the frequency of problems resulting from voltage sags will be much greater than that resulting from complete voltage interruptions.

Faults resulting in voltage sags can occur within a particular customer's plant, or in the utility system providing power to the customer's plant. The voltage sag condition will last until the fault is cleared by a protective device. In the plant, this will typically be a fuse or a plant feeder breaker. On the utility system, the fault could be cleared by a branch fuse or a substation breaker. If reclosing is used by the utility, the voltage sag condition can occur multiple times.

Utility system faults can occur on the distribution system or on the transmission system. The typical distribution system includes a number of parallel feeders supplied from a common bus. A fault on one of the feeders will cause a voltage interruption on that feeder, which will directly affect the customer on that feeder. All of the customers on parallel feeders will experience a voltage sag while the fault is actually on the system. With the reclosing breakers at the substation, customers on parallel feeders can experience several voltage sags in succession, each lasting for durations ranging from a couple of cycles to more than ten cycles. Utility system faults on the transmission system can affect even more customers. Customers hundreds of miles from the fault location can experience a voltage sag when the fault is on the transmission system, resulting in equipment misoperation.

The large majority of faults on a utility system are single line-to-ground faults (SLGF). Three-phase faults are more severe, but less common. SLGFs often result from weather conditions such as lightning, wind, and ice. Contamination of insulators, animal contact, and accidents involving construction or transportation activities also cause such faults. Although utilities go to great lengths to prevent such faults on the system, they cannot be eliminated completely.

When a SLGF occurs, the voltage on the faulted phase goes to zero at the fault location. The voltage at the substation and on parallel feeders will depend on the distance of the fault from the substation. On transmission systems, the phase voltage at remote locations from the fault depends on the overall network impedances.

The quantity of concern to utility customers is the voltage level at the customer bus resulting from an SLGF somewhere on the utility system. The customer bus voltage will depend on the transformer connections between the faulted system and the customer bus. For a distribution system fault, the worst case occurs when the fault is close to the substation bus. Effectively, this is the same as a fault near the customer transformer primary. It is important to note that even a SLGF on the primary winding of the customer transformer will typically not result in a zero voltage across any of the secondary windings. For example, for an SLGF on the primary winding of a wye grounded/delta transformer, a circulating fault current in the delta secondary winding results in a voltage on each winding. With such a customer transformer connection, an SLGF on the primary of the transformer will result in a voltage sag at the customer bus that is no lower than 33% of the normal value.

SLGFs resulting in voltage sags, but without causing complete voltage interruptions, account for the great majority of faults on a utility power system.

However, statistics of voltage disturbances show that the vast majority of voltage sags are within 40% of the normal voltage level, and last less than 10 cycles.

Various types of electrical devices can be affected by even modest amounts of voltage sag. Such devices include motors, adjustable-speed drives, high-intensity discharge lighting, and control devices such as computers, contactors, and programmable logic controllers. The voltages experienced during a voltage sag condition will depend on the equipment connection. Individual phase voltages and phase-to-phase voltages can be quite different during an SLGF condition on the utility system. Thus, some single phase loads may be unaffected during the voltage sag condition, while other single phase loads may drop out, even though their sensitivities to voltage sags may be identical. Voltage unbalance is also a concern for motor heating. However, the durations of the unbalanced voltages during fault conditions are so short that motor heating is typically not a significant concern. Different categories of equipment, and even different brands of equipment within a category, can have significantly different sensitivities to voltage sags. It is important to recognize than an entire industrial process can depend on the sensitivity of a single piece of equipment. The overall process may involve controls, drives, motor contactors, robotics, etc., that are all integral to the plant operation. The failure of a single piece of equipment due to a voltage sag can, therefore, cause an entire industrial process to shut down. The interruption of an industrial process due to a voltage sag can result in very substantial costs to the operation. These costs include lost productivity, labor costs for clean-up and restart, damaged product, reduced product quality, delays in delivery, and reduced customer satisfaction.

Various solutions to the voltage sag problem have been suggested. It is possible for utilities to reduce the number of faults on the utility system through design practices and additional equipment, but it is never possible to eliminate faults on the system. Industrial plant equipment may be designed to handle the most common voltage sag conditions, or be retrofitted with appropriate power conditioning to ride through the voltage sag condition. Power conditioning equipment may be provided for particularly sensitive loads. Many voltage sag conditions can be handled by ferroresonant, or constant voltage, transformers. Such transformers may be effective power conditioners for loads with relatively low power requirements and loads which are constant. High power and variable loads pose a problem for such transformers because of the tuned circuit on the transformer output. Moreover, such transformers are heavy, expensive, and difficult to design and construct.

Another method for compensating voltage sags caused by faults in a utility power system involves the injection of energy into the power system transmission line to restore the load voltage magnitude. This may be accomplished by connecting an inverter in series with the transmission line. A DC power source, such as a battery, superconducting magnetic energy storage device, or a large DC bus capacitor, is used to provide power to the inverter. The inverter is controlled to convert the DC power provided by the DC power source into a voltage waveform which is injected into the transmission line to compensate for the voltage sag to restore the load voltage to the pre-fault load voltage condition. Since, in such systems, energy is provided from the DC power source to the utility transmission line, sufficient power must be stored in the DC power source to provide for voltage sag compensation throughout the duration of a fault on the utility system.

Other power quality problems which are also faced by industrial customers include unbalanced multi-phase power, which may be caused by unbalanced loads connected to the power system, and harmonic distortion in the power supply line, which is typically caused by non-linear loads, such as three-phase diode and thyristor bridge inverters used in DC power supplies, adjustable speed drives (ASDs), and Uninterruptible Power Supplies (UPS), which cause harmonic distortion in the power supply by injecting harmonic current into the power system that generates transient and spurious frequencies in the power signal. Active power line conditioners and/or active filters may be used to compensate for such unbalanced load and harmonic distortion conditions. Active line conditioners/balancers and harmonic filters may be implemented using inverters connected in series and/or in parallel with the power system transmission lines supplying the load. The inverters are controlled to inject or withdraw energy from the transmission line at the desired frequency to compensate for the unbalanced load and/or harmonic distortion condition.

Control of active power line conditioners and active harmonic filter inverters is often accomplished using a synchronous reference frame (SRF) based controller. An SRF based controller receives measure voltages or currents in the three-phase a-b-c reference frame as inputs, and transforms the three-phase quantities into a synchronously rotating two-phase d-q reference frame. Inverter control signals are generated initially from the measured quantities in the two-phase synchronous reference frame, and then converted back to the three-phase reference frame to be applied to control the inverter.

The transformation from a three-phase reference frame to a synchronously rotating two-phase reference frame is illustrated in FIG. 1. For exemplification purposes, the three-phase quantities may be three-phase currents $i_a$, $i_b$, and $i_c$.

The transformation of the three-phase currents $i_a$, $i_b$, and $i_c$ into synchronously rotating two-phase currents $i^e_q$ and $i^e_d$ is a two-step process. First, the three-phase currents are transformed to a two-phase ds-qs reference frame that is stationary with respect to the three-phase system. This three-phase to two-phase stationary transformation is equivalent to a set of linear equations with constant coefficients, as shown in FIG. 1. The two-phase stationary currents $i^s_q$ and $i^s_d$ are vectors that are 90° out of phase with each other. This three-phase to stationary two-phase transformation may be accomplished by a conventional three-phase to two-phase stationary transformation device 40 which executes the following equation:

$$\begin{bmatrix} i_q^s \\ i_d^s \end{bmatrix} = k_1 \begin{bmatrix} 1 & -1/2 & -1/2 \\ 0 & -\sqrt{3}/2 & \sqrt{3}/2 \end{bmatrix} \begin{bmatrix} i_a \\ i_b \\ i_c \end{bmatrix}, \quad (1)$$

where $k_1$ is a constant value equal to $\sqrt{(2/3)}$. The second step of the three-phase to two-phase synchronous reference frame transformation is the transformation of the stationary two-phase reference frame quantities ds and qs into synchronous rotating reference frame quantities de and qe. This stationary to rotating transformation 41 is achieved by multiplying the stationary reference frame values ds and qs by unit vectors cos θ and sin θ. Transformation from the stationary to rotating two-phase reference frame is accomplished by execution of the following equation:

$$\begin{bmatrix} i_q^e \\ i_d^e \end{bmatrix} = \begin{bmatrix} \cos\theta_n & -\sin\theta_n \\ \sin\theta_n & \cos\theta_n \end{bmatrix} \begin{bmatrix} i_q^s \\ i_d^s \end{bmatrix}. \quad (2)$$

The rotation transformation is often referred to as a "vector rotation", since the d-q quantities can be combined as a vector. The transformation then amounts to the rotation of one vector with respect to another. FIG. 1 includes the vector rotation equations.

The unit vectors cos θ and sin θ are obtained from a phase-locked loop (PLL). An exemplary prior art PLL is illustrated at 42 in FIG. 2. The PLL obtains an instantaneous vector sum of (for example) the three-phase input voltages ($V_{ia}$, $V_{ib}$, and $V_{ic}$) by using a three-to-two phase transformation 43 that generates signals $V_{di}$ and $V_{qi}$ in the synchronously rotating two-phase reference frame. These signals are conveyed to a phase detector 44. The phase detector output may be defined as:

$$\sin(\text{phase error}) = V_{di} \cos\theta - V_{qi} \sin\theta. \quad (3)$$

In equation 3, sin θ and cos θ are the values presently pointed to in a look-up table 45. The phase detector 44 output is processed by a proportional plus integral (PI) controller 46 that provides a fast response and zero steady-state tracking error. The PI controller 46 is used to determine the count parameter value of a timer or digital oscillator 47. The timer count value is decremented from the count parameter value at a constant rate. When zero is reached, the sin θ and cos θ pointers in the look-up table 45 are incremented. Since this is a closed-loop system, the count parameter value is either increased or decreased, depending on the PI controller 46 output, so as to reduce the phase error until a phase-locked condition is achieved.

The transformation from a synchronously rotating two-phase de-qe reference frame to a three-phase a-b-c reference frame is illustrated in FIG. 3. A rotating to stationary transformation 48 first transforms rotating two-phase quantities, for example, voltages $V_d^e$ and $V_q^e$, to stationary two-phase values using the equation:

$$\begin{bmatrix} V_q^s \\ V_d^s \end{bmatrix} = \begin{bmatrix} \cos\theta_n & \sin\theta_n \\ -\sin\theta_n & \cos\theta_n \end{bmatrix} \begin{bmatrix} V_q^e \\ V_d^e \end{bmatrix}, \qquad (4)$$

where $\cos\theta$ and $\sin\theta$ are derived from a PLL. The resulting stationary two-phase values $V_d^s$ and $V_q^s$ are then transformed by a stationary two-phase to three-phase transformation 49 to three-phase voltage quantities using:

$$\begin{bmatrix} V_a \\ V_b \\ V_c \end{bmatrix} = k_1 \begin{bmatrix} 1 & 0 \\ -1/2 & -\sqrt{3}/2 \\ -1/2 & \sqrt{3}/2 \end{bmatrix} \begin{bmatrix} V_q^s \\ V_q^s \end{bmatrix}. \qquad (5)$$

The vector rotation equations for the two-phase to three-phase transformations are also presented in FIG. 3.

SUMMARY OF THE INVENTION

The present invention provides a method and apparatus for compensating voltage sags caused by faults, such as single line-to-ground faults (SLGFs), at remote locations on a utility power distribution or transmission system. The present invention restores load voltage sags under SLGF and other fault conditions to pre-fault voltage levels without injecting any net energy into the system. This is achieved by first restoring the load voltage to a balanced condition at the pre-fault voltage levels, and then ensuring that the total real power provided by the voltage restoration system is equal to zero. In accordance with the present invention, zero real power flow is achieved by rotating the restored load voltage vectors by a phase rotation angle φ such that there is no real power flow between the voltage compensator of the present invention and the power system.

A voltage sag compensator in accordance with the present invention is preferably implemented using a three-phase inverter connected in series with the power transmission lines of one feeder branch of a multi-feeder power distribution system. When an SLGF or other fault occurs on a remote feeder in the system, a voltage sag may be produced on the power system feeder containing the voltage compensator. In accordance with the present invention, the voltage compensator inverter is controlled to inject a voltage signal in series with the power transmission lines which restores the three-phase load voltage provided on the transmission lines to a balanced three-phase condition at the pre-fault load voltage level. The voltage compensator inverter is controlled such that there is no net transfer of energy between the voltage compensator system and the power system associated with the injected voltage signal.

Control of the voltage compensator inverter to restore the load voltages to a balanced three-phase condition at pre-fault voltage signal levels, and to ensure that the total real power associated with the compensator inverter is equal to zero, is preferably accomplished using a synchronous reference frame (SRF) based controller. To restore the load voltages to a balanced three-phase condition at the pre-fault voltage signal levels, the controller preferably generates control signals which control the voltage compensator inverter to generate an inverter voltage signal in series with the power transmission line which restores the positive sequence component of the load voltage to the pre-fault positive sequence voltage condition, and which eliminates the negative sequence component of the load voltage caused by the remote system fault. Thus, the SRF controller preferably generates positive sequence and negative sequence inverter voltage command signals which are modulated to control switching devices in the voltage compensator inverter to generate the inverter voltage signal which restores the positive sequence load voltages and eliminates the negative sequence load voltages.

The positive sequence inverter voltage command signals are generated by first measuring the three-phase voltage compensator inverter terminal voltage levels, and transforming the three-phase voltage compensator inverter terminal voltage signals into two-phase synchronously rotating reference frame signal values at the fundamental frequency. This three-phase to two-phase SRF transformation employs $\sin\theta$ and $\cos\theta$ values to perform the three-phase to synchronously rotating two-phase transformation. The $\sin\theta$ and $\cos\theta$ values may preferably be derived from a phase-locked loop (PLL) on the voltage compensator inverter terminal voltage waveform, and a look-up table of $\sin\theta$ and $\cos\theta$ values. The DC component is then extracted from the resulting synchronously rotating two-phase voltage compensator inverter terminal voltage signal values, using low-pass filters or another method for extracting the DC component from a signal. This DC signal corresponds to the fundamental positive sequence component of the voltage compensator inverter terminal voltage. The fundamental positive sequence component voltage signal values are compared to positive sequence voltage compensator inverter terminal voltage reference command signals, which may be set equal to the fundamental positive sequence component of the voltage compensator inverter terminal voltage before the occurrence of a fault, to generate positive sequence inverter voltage command signals in the two-phase synchronously rotating reference frame. The two-phase positive sequence inverter voltage command signals are transformed, by a two-phase to three-phase transformation at the fundamental frequency, into three-phase positive sequence inverter voltage command signals which, in turn, are modulated and provided to the voltage compensator inverter to control the inverter switching devices to generate the desired inverter voltage signal which restores the positive sequence component of the load voltage to pre-fault levels.

The SRF based controller may also employ the measured voltage compensator inverter terminal voltages to generate the negative sequence inverter voltage command signals that are used to control the voltage compensator inverter to generate an inverter voltage signal that eliminates the negative sequence voltage components that are created by the utility system fault. The measured three-phase voltage compensator inverter terminal voltages are transformed into two-phase synchronously rotating reference frame signal values at the fundamental frequency by a negative sequence three-phase to two-phase synchronous reference frame transformation device. The three-phase to two-phase SRF transformation employs $\sin(-\theta)$ and $\cos(-\theta)$ values to perform the three-phase to synchronously rotating two-phase transformation. The $\sin(-\theta)$ and $\cos(-\theta)$ values may preferably be derived from the phase-locked loop (PLL) on the voltage compensator inverter terminal voltage waveform. The DC component is then extracted from the resulting synchronously rotating two-phase voltage compensator inverter terminal voltage signal values, using low-pass filters or another method for extracting the DC component from a signal. This DC signal corresponds to the fundamental negative sequence component of the voltage compensator inverter terminal voltage, which forms the two-phase negative sequence inverter voltage command signals. The two-phase negative sequence inverter voltage command signals are transformed, by a negative sequence two-phase to three-phase transformation, into three-phase negative sequence inverter voltage command signals which, in turn, are modulated and provided to the voltage compensator inverter to control the inverter switches to generate an inverter voltage signal which cancels the negative sequence voltage components caused by the utility system fault.

To enhance compensator stability in the negative sequence, a component of the negative sequence inverter voltage command signals may be derived from measured power transmission line currents. This component of the negative sequence inverter voltage command signals is used to control the voltage compensator inverter to generate an inverter voltage signal which drives the fundamental negative sequence component of the line current to zero. The measured three-phase line currents are transformed into two-phase synchronously rotating reference frame signal values by a negative sequence three-phase to two-phase synchronous reference frame transformation device. The three-phase to two-phase SRF transformation employs sin (−θ) and cos (−θ) values to perform the negative sequence three-phase to synchronously rotating two-phase transformation. As discussed previously, the sin (−θ) and cos (−θ) values may preferably be derived from a phase-locked loop (PLL) on the voltage compensator inverter terminal voltage waveform. The DC component is then extracted from the resulting synchronously rotating two-phase line current signal values, using low-pass filters or another method for extracting the DC component from a signal. This DC signal corresponds to the fundamental negative sequence component of the line current. The extracted DC signals are compared to negative sequence component line current reference command signals, that are preferably set to zero, to form negative sequence component line current error signals which are, in turn, provided to proportional-integral (PI) controllers to generate the negative sequence line current component of the negative sequence inverter voltage command signal in the two-phase reference frame. The negative sequence line current component of the negative sequence inverter voltage command signal is combined with the portion of the negative sequence inverter voltage command signals derived from the voltage compensator inverter terminal voltages to form combined two-phase negative sequence inverter voltage command signals. The combined two-phase negative sequence inverter voltage command signals are then transformed, as described previously, by a negative sequence two-phase to three-phase transformation, into the three-phase negative sequence inverter voltage command signals which, in turn, are modulated and provided to the compensator inverter to control the inverter switches to generate a voltage signal on the power transmission line which cancels both the negative sequence voltage and current components on the power transmission line which are caused by the utility system fault.

By restoring the positive sequence component of the load voltage to the pre-fault condition, and by canceling the negative sequence component of the load voltage caused by the utility system fault, the voltage compensator inverter voltage signal restores the voltage to a balanced three-phase condition at pre-fault voltage levels. In accordance with the present invention, the SRF controller also provides control signals to the compensator inverter to cause the compensator inverter to generate voltage signals on the power transmission lines which rotate the restored load voltage vectors by a phase rotation angle φ to ensure that the total real power exchanged between the voltage compensator inverter and the power transmission lines is zero.

To implement this phase rotation, the SRF based controller of the present invention employs measured power transmission line currents and the measured voltage across the DC bus which provides power to the voltage compensator inverter to generate DC bus control inverter voltage command signals. The DC bus control inverter voltage command signals are derived from two command signal components, a resistance command signal and an inductance command signal value. The resistance command signal value defines the magnitude of a positive sequence voltage which is injected into the power transmission line in phase with the positive sequence component of the line current to balance the DC bus voltage to maintain the DC bus voltage at a constant level while ensuring that the total real power exchanged between the DC bus and the power transmission lines is zero. The resistance command signal value is derived from the difference between the measured DC bus voltage and a DC bus voltage reference command signal, which forms a DC bus voltage error signal. The DC bus voltage error signal is provided to a proportional-integral controller. The output of the proportional-integral controller is the resistance command signal value.

The positive sequence voltage signal which would be generated by the compensator inverter based on the resistance command signal value alone might cause a decrease in the magnitude of the line current, because the injected voltage signal will have the effect of a line resistance. In order to rebuild the line current magnitude, another positive sequence voltage component which is in quadrature with the positive sequence line current is injected. The magnitude of this quadrature component of the injected voltage compensator inverter voltage signal is defined by the inductance command signal value. The inductance command signal value is derived from the difference between a positive sequence component magnitude of the power transmission line current and a positive sequence line current component magnitude reference command signal, which forms a positive sequence line current component magnitude error signal. The positive sequence line current component magnitude reference command signal may be set equal to the positive sequence line current component magnitude prior to the occurrence of the fault. The positive sequence line current component magnitude error signal is provided to a proportional-integral controller which, in turn, provides the inductance command signal value.

The resistance and inductance command signal values are provided to an active impedance synthesizer which generates the DC bus control inverter voltage command signals in the two-phase reference frame. The active impedance synthesizer employs measured power transmission line currents, in combination with the resistance and inductance command signal values, to generate the DC bus control inverter voltage command signals. The measured three-phase line currents are transformed into two-phase synchronously rotating reference frame signal values at the fundamental frequency by a positive sequence three-phase to two-phase synchronous reference frame transformation device. The three-phase to two-phase SRF transformation employs sin θ and cos θ values to perform the three-phase to synchronously rotating two-phase transformation. The sin θ and cos θ values may preferably be derived from a phase-locked loop (PLL) on the voltage compensator inverter terminal voltage waveform, and a look-up table of sin θ and cos θ values. The DC component is extracted from the resulting synchronously rotating two-phase line current signal values using low-pass filters or another method for extracting the DC component from a signal. This DC signal corresponds to the fundamental positive sequence line current component. The extracted DC signals are combined with the DC bus control resistance and inductance command signal values by the active impedance synthesizer to generate the DC bus control inverter voltage command signals in the two-phase reference frame. (The same extracted DC signals may also preferably be used to derive the positive sequence component magnitude of the line current which, as described previously, is used to derive the DC bus control inductance command signal value.)

The DC bus control inverter voltage command signals generated by the active impedance synthesizer preferably are combined with the two-phase positive sequence inverter voltage command signals. The combined two-phase DC bus control and positive sequence inverter voltage command signals are then transformed, by a positive sequence two-phase to three-phase transformation at the fundamental frequency, into three-phase command signals which, in turn, are modulated and provided to the voltage compensator inverter to control the inverter switches to generate the desired inverter voltage signal at the fundamental frequency. The positive sequence inverter voltage command signals, including the DC bus control inverter voltage command signals, in combination with the negative sequence inverter voltage command signals, cause the compensator inverter to be controlled to generate an inverter voltage signal in series with the power transmission lines which both restores the load voltage to a balanced three-phase condition at pre-fault voltage levels and rotates the restored load voltage vectors by a phase rotation angle $\phi$ to ensure that the total real power associated with the voltage compensator inverter is equal to zero.

The inverter voltage signals provided in series with the power transmission line by the compensator inverter achieve load voltage restoration with no real power flow in the compensator. In some cases, the remote utility system fault will cause a zero sequence load voltage component to be generated. The zero sequence voltage is a voltage component which is common to all of the phases. For delta connected loads, or loads connected to the power transmission system via a transformer which is insensitive to the zero sequence component, such as a transformer with a delta connected primary, the zero sequence voltage component is not a concern. This is because such systems are only sensitive to line-to-line voltage levels, in which voltage components common to all phases are eliminated. For wye-connected loads, however, the zero sequence voltage component preferably is eliminated. Elimination of the zero sequence voltage component is accomplished by injecting a zero sequence voltage component in series with the power transmission lines to cancel the zero sequence voltage component. The amount of series injected zero sequence voltage component required is one third of the sum of the three-phase voltage compensator inverter terminal voltage vectors.

An SRF based controller in accordance with the present invention may employ the measured voltage compensator inverter terminal voltages to generate zero sequence inverter voltage command signals that are used to control the voltage compensator inverter to generate an inverter voltage signal that cancels the zero sequence component of the load voltage. The measured three-phase voltage compensator inverter terminal voltages are added together and then divided by three to form the zero sequence inverter voltage command signals.

To enhance voltage compensator inverter stability in the zero sequence, the voltage compensator inverter preferably also is controlled to eliminate the zero sequence component in the line current. The SRF based controller of the present invention may thus derive a zero sequence line current component of the zero sequence inverter voltage command signal from the measured line currents. The sum of the measured three-phase power transmission line currents is divided by three and then the zero sequence component of the line current is extracted using a stationary to rotating transformation, at the fundamental frequency of the summed and divided line current signals. The DC component is extracted from the resulting rotating line current signal value using a low-pass filter or another method for extracting the DC component from a signal. This extracted DC signal corresponds to the zero sequence component in the line current. The zero sequence component in the line current is compared to a zero sequence line current reference command signal, that is preferably set to zero, to form a zero sequence line current component error signal that is, in turn, provided to a proportional-integral (PI) controller to generate the zero sequence line current component for the zero sequence inverter voltage command signal in the rotating reference frame. The zero sequence current component for the zero sequence inverter voltage command signal is then transformed, by a rotating to stationary transformation, at the fundamental frequency, into a signal which is combined with the sum of the voltage compensator inverter terminal voltages divided by three to form the combined zero sequence inverter voltage command signal. The combined zero sequence inverter voltage command signal is modulated and provided to the voltage compensator inverter to control the inverter switches to generate the desired inverter voltage signal at the fundamental frequency to eliminate the zero sequence component of the load voltage and current.

The voltage compensator inverter may be implemented using conventional inverter topologies, and modulation of the inverter voltage command signals generated by the SRF controller to provide control signals for the inverter switching devices may be accomplished using conventional modulation techniques. However, for voltage restoration systems in accordance with the present invention wherein the voltage compensator inverter is controlled to eliminate the zero sequence component of the load voltage, an inverter topology which may be controlled to provide a zero sequence voltage component, i.e., a common voltage on each phase, must be employed. For this purpose, three single phase inverters connected across a common inverter DC bus to form a three-phase inverter, or a conventional four-leg three-phase inverter topology, may be used. Either conventional hard switched or soft switched inverter topologies may be employed.

Various additions, modifications, and enhancements may be made to a dynamic series voltage restoration system in accordance with the present invention to enhance the utility of such a system under various operating conditions. A compensation reference decision system may be used to adjust the reference command signals employed by the restoration system controller in response to varying fault conditions. For very severe utility system faults, the voltage sag on the power transmission lines supported by a voltage restoration system in accordance with the present invention may be so extreme as to prevent full voltage restoration while maintaining zero real power flow between the voltage restoration system and the power transmission lines. In such a case, the compensation reference decision system may adjust the reference command signals employed by the restoration system controller such that the system controller will control the voltage compensator inverter to inject a voltage signal in series with the power transmission lines to restore the load voltage to a balanced three-phase condition at pre-fault voltage levels while minimizing the amount of net power flow from the compensator to the power transmission lines. This will maximize the duration of full voltage restoration under such extreme conditions before the energy stored on an inverter DC bus capacitor is depleted. For severe utility system faults of short duration, the dynamic series voltage restoration system of the present invention may be able to ride out the fault. The compensation reference decision system alternatively may select a lower level of voltage restoration when extreme voltage sags on the transmission lines are encountered. At lower voltage restoration levels, e.g., a restoration level of 90% of the pre-fault load voltage level, the voltage compensator inverter can be controlled such that there is no net power flow between the compensator and the utility transmission lines even under extreme fault conditions. Thus, the use of a compensation reference decision system allows voltage restoration at less than the full restoration level to be maintained indefinitely in response to severe utility system fault conditions.

The dynamic voltage restoration system of the present invention may also be configured to perform the functions of an uninterruptible power supply (UPS), to provide compensation for both voltage sags and complete voltage interruptions on the power transmission lines. For UPS applications, the voltage compensator inverter DC bus is supplied by a DC energy storage system, such as a battery, which is connected to back up the DC bus capacitor. The voltage compensator inverter is controlled in the normal manner to maintain the balanced three-phase voltage level on the power transmission lines in response to voltage sags caused by utility system faults. Complete interruptions of voltage on the power lines are detected by a UPS controller which provides control signals to the voltage compensator inverter to control the inverter to provide backup power from the DC power source to the power transmission lines. The UPS controller also opens a utility system isolation switching device on the power transmission line between the compensator inverter and the faulty utility system to prevent the backup power provided by the voltage compensator inverter from feeding back into the faulty utility system.

A dynamic voltage restoration system in accordance with the present invention may also be configured to perform the functions of a system for reducing or eliminating harmonic components in the power transmission line signal. A harmonic controller, such as an SRF controller, is used to generate harmonic inverter voltage command signals which are modulated and provided to the voltage compensator inverter to control the inverter switches to generate inverter voltage signals to cancel undesirable power transmission line harmonics. Since the harmonic inverter voltage command signals generated by the harmonic controller define the harmonic frequency of operation of the voltage compensator inverter, and the inverter voltage command signals provided by the voltage restoration controller define the fundamental frequency operation of the inverter, the harmonic inverter voltage command signals may be combined with the inverter voltage command signals provided by the voltage restoration controller so as to provide control signals for controlling the voltage compensator inverter to provide simultaneously both voltage restoration and harmonic compensation, without modification of the voltage compensator inverter itself.

An SRF based controller for a dynamic voltage restoration system in accordance with the present invention may be implemented using analog or digital components, or a combination thereof. The SRF based controller may be implemented using a programmable digital signal processor, or similar device, which may be programmed to implement the voltage restoration controller functions, as well as UPS and harmonic controller functions, if desired.

Although a dynamic series voltage restoration system in accordance with the present invention is intended primarily for the elimination of voltage sags, a dynamic series voltage restoration system in accordance with the present invention will also automatically correct for voltage surges on the power transmission lines. Voltage surge correction is also accomplished in accordance with the present invention without the exchange of real power between the voltage restoration system and the power transmission lines. Voltage surges are, however, not common.

The dynamic series voltage restoration system of the present invention automatically restores an unbalanced power system to the balanced condition. Thus, the present invention may be employed as, and automatically performs the function of, a power line conditioner for restoring balance to an unbalanced system, caused, for example, by connection of the power system to an unbalanced load.

The dynamic series voltage restoration system of the present invention will compensate voltage sags caused by any type of system fault. Three-phase faults are serious fault conditions which can result in severe voltage sags on power system feeder branches remote from the fault location. Three-phase faults thus typically require the injection of power into the power system to compensate the voltage sag. However, for less severe three-phase faults, the dynamic series voltage restoration system of the present invention may be able to provide voltage sag compensation without injecting any net power into the power system.

Additional features and advantages of the present invention will be apparent from the following detailed description taken in conjunction with the accompanying drawings.

BRIEF DESCRIPTION OF THE DRAWINGS

In the drawings:

FIG. 3 illustrates a synchronously rotating two-phase to three-phase reference frame transformation, as used in a synchronous reference frame based controller, and its corresponding mathematical model.

FIG. 4 is a simplified schematic illustration of a power distribution system with multiple feeders connected to a common bus, showing a single line-to-ground fault in one of the feeders, and a dynamic series voltage restoration system in accordance with the present invention connected to another of the feeders.

FIG. 5 is a waveform diagram illustrating a voltage sag in one phase of a feeder of the power distribution system illustrated in FIG. 4, caused by the single line-to-line ground fault in another feeder of the distribution system.

FIGS. 10 and 11 illustrate the voltage vectors generated by a voltage compensator in accordance with the present invention to restore a three-phase balanced condition at pre-fault voltage levels while ensuring that the total real power associated with the compensator is equal to zero.

DETAILED DESCRIPTION OF THE INVENTION

Figure 1:
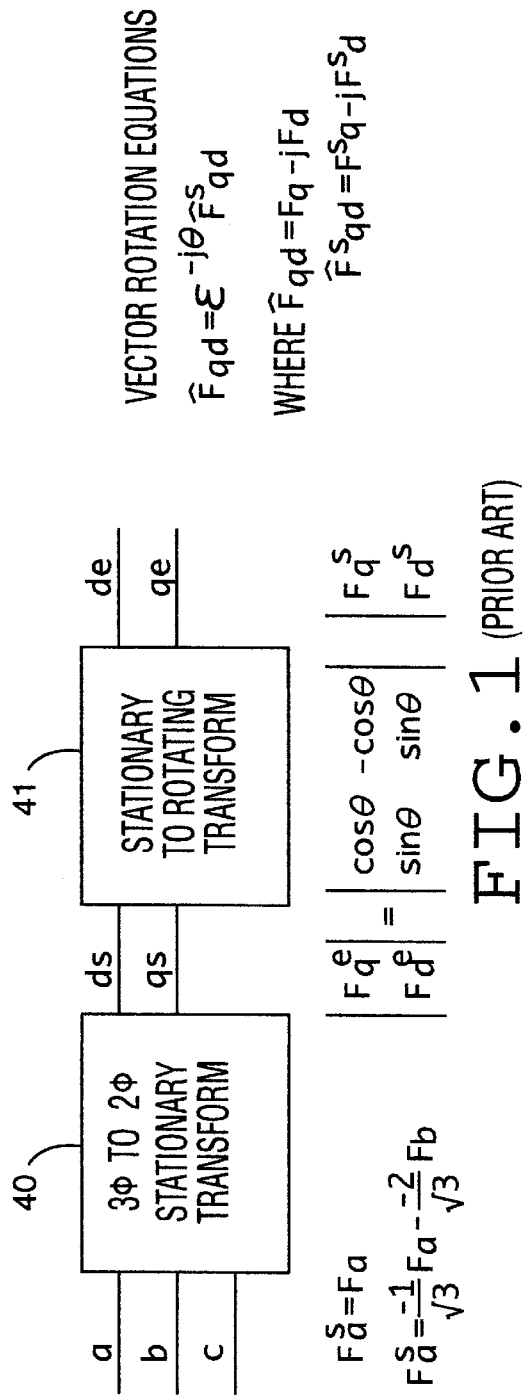
FIG. 1 illustrates a three-phase to synchronously rotating two-phase reference frame transformation, as used in a synchronous reference frame based controller, and its corresponding mathematical model.

This detailed description will begin with a brief description of the power distribution systems in which a dynamic series voltage restoration system in accordance with the present invention may typically be used. The description of the utility distribution systems will include a description of power quality problems, predominantly voltage sags, caused by remote faults on the utility system. The theoretical basis for a dynamic series voltage restoration system and method in accordance with the present invention for compensating voltage sags caused by a remote utility system fault, without requiring the injection of real power (energy) into the utility system, will then be discussed. A preferred embodiment of a dynamic series voltage restoration system in accordance with the present invention will then be described in detail. This will include a detailed description of a synchronous reference frame (SRF) based controller for controlling a voltage compensator inverter to provide load voltage restoration and to ensure that the total real power associated with the voltage compensator is equal to zero. Simulation results will then be presented to illustrate the operation and effectiveness of the present invention. Finally, various alternative embodiments of the present invention will be presented. These include embodiments of the present invention which incorporate uninterruptible power supply (UPS) and harmonic compensation functions, as well as an embodiment of the present invention wherein the compensator inverter controller is implemented using a programmable digital device.

As discussed previously, voltage sags are the most important power quality problem facing many industrial electrical power utility customers. The primary cause of voltage sags is remote faults on the utility distribution or transmission system. The vast majority of such faults are single line-to-ground faults (SLGF) which result in an unbalanced system, and which can cause voltage sags at remote locations throughout the utility system.

FIG. 4 illustrates a simplified power distribution system 50, with multiple feeders 52, 54, and 56, connected to a common bus 58. (Note that FIG. 4 is a single-line representation of a three-phase system.) Utility power, represented in FIG. 4 by AC power source 60 and series inductance 62, is provided to the common bus 58 via a transformer 64. A single line-to-ground fault 66 on one of the power system feeders 52 will be reflected through the common bus 58 as a voltage sag on the other feeders 54 and 56 of the distribution system. In order to compensate for the voltage sag disturbance on feeder 56, a voltage compensator 68 in accordance with the present invention is connected, via a transformer 70, in series with the power transmission line of the feeder 56. As will be discussed in more detail below, the voltage compensator 68 includes a voltage compensator inverter which is controlled to provide an inverter voltage waveform on the transformer 70, and therefore on the transmission line of feeder 56, from the voltage provided on a DC bus capacitor 72, to compensate for the voltage sag caused by the remote single line-to-ground fault 66. In accordance with the present invention, the voltage compensator 68 is controlled such that there is no net power flow between the DC bus capacitor 72 and the utility system feeder 56. Thus, a large DC storage device is not required by the present invention.

FIG. 5 illustrates an exemplary voltage sag on one phase of a power transmission line which may be caused by a single line-to-ground fault at a remote location on the utility system. The illustrated voltage sag is six cycles in duration. Most voltage sags last less than ten cycles, and are within 40% of the pre-fault voltage level. Since the rating of a voltage compensator in accordance with the present invention primarily depends on the maximum level of voltage compensation required, and the load current, these voltage sag statistics should be kept in mind during the design and implementation of such a device.

Figure 6:
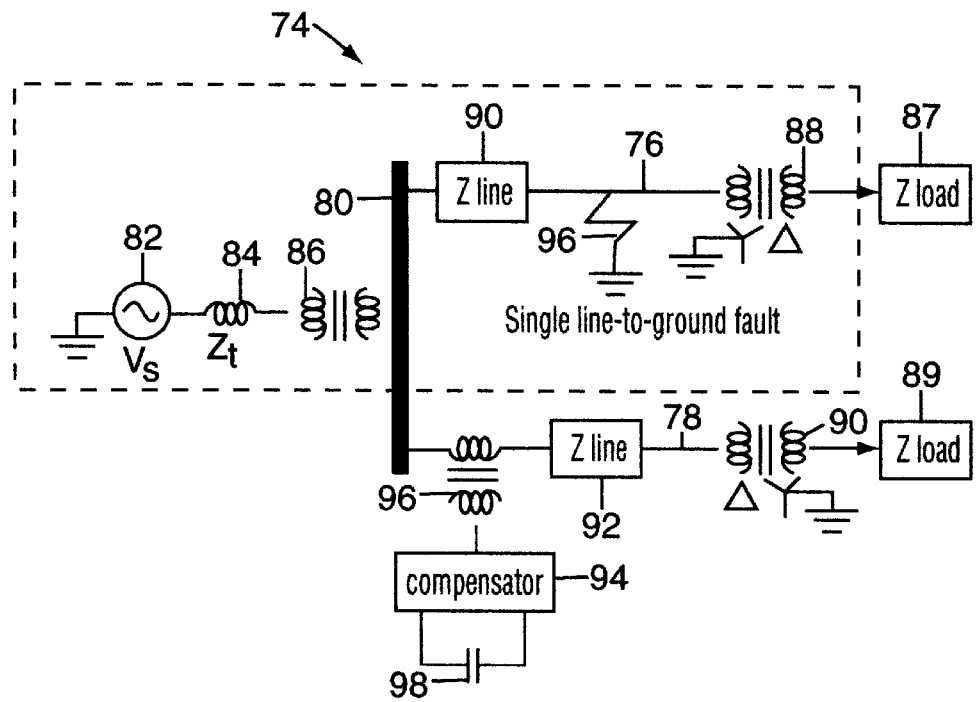
FIG. 6 is a simplified schematic illustration of a power distribution system with two feeders connected to a common bus, showing a single line-to-ground fault on the first feeder, and having a dynamic series voltage restoration system in accordance with the present invention connected to the second feeder of the system.

FIG. 6 shows a simplified power distribution system 74 with two feeders 76 and 78 connected to a common bus 80. (Note that FIG. 6 is a single-line representation of a three-phase system.) Utility power, represented by AC power source 82 and series connected inductance 84 in FIG. 6, is provided to the common bus 80 via a transformer 86. The power provided on each feeder 76 and 78 of the distribution system 74 may be provided to one or more loads 87 and 89 via transformers 88 and 90, respectively. Either wye or delta connected transformers 88 and 90 may be used to connect the feeder power transmission line 76 or 78, respectively, to one or more loads. Each feeder of the power distribution system 74 may be characterized by a line impedance $Z_{line}$ 90 or 92. Each load may be characterized by a load impedance $Z_{load}$.

A voltage compensator 94 is connected in series with the second feeder power transmission line 78 via a transformer 96. As discussed previously, a single line-to-ground fault 96 in the first feeder 76 will cause a voltage sag on at least one phase of the second feeder 78 of the power distribution system 74. As will be discussed in more detail below, the compensator 94 includes a voltage compensator inverter which is controlled in accordance with the present invention to provide an inverter voltage signal, via the transformer 96, in series with the second feeder power transmission lines 78, to compensate for the voltage sag caused by the single line-to-ground fault 96 in the first feeder 76. The voltage signal injected by the compensator 94 into the second feeder power transmission lines 78 is derived from the DC bus voltage across a DC bus capacitor 98.

In accordance with the present invention, the compensator 94 is controlled to provide dynamic voltage restoration by injecting a set of voltage signals onto the second feeder 78 of the distribution system 74 which satisfy two constraints. First, the injected voltage signals restore the load voltage of the second feeder 78 to a balanced three-phase condition at the load voltage magnitude before the fault occurred. Second, the voltage compensator 94 is controlled to ensure that the total real power associated with the compensator is equal to zero. Thus, no net real power is exchanged between the DC bus capacitor 98 and the power transmission lines 78 during the time when voltage restoration is being provided by the compensator 94. Therefore, a relatively small DC bus capacitor 98 may be used to support the voltage compensator inverter. Since a large storage capacitor, battery, or other energy storage device is not required, the cost, size, and weight of a voltage restoration system in accordance with the present invention can be reduced.

Figure 7:
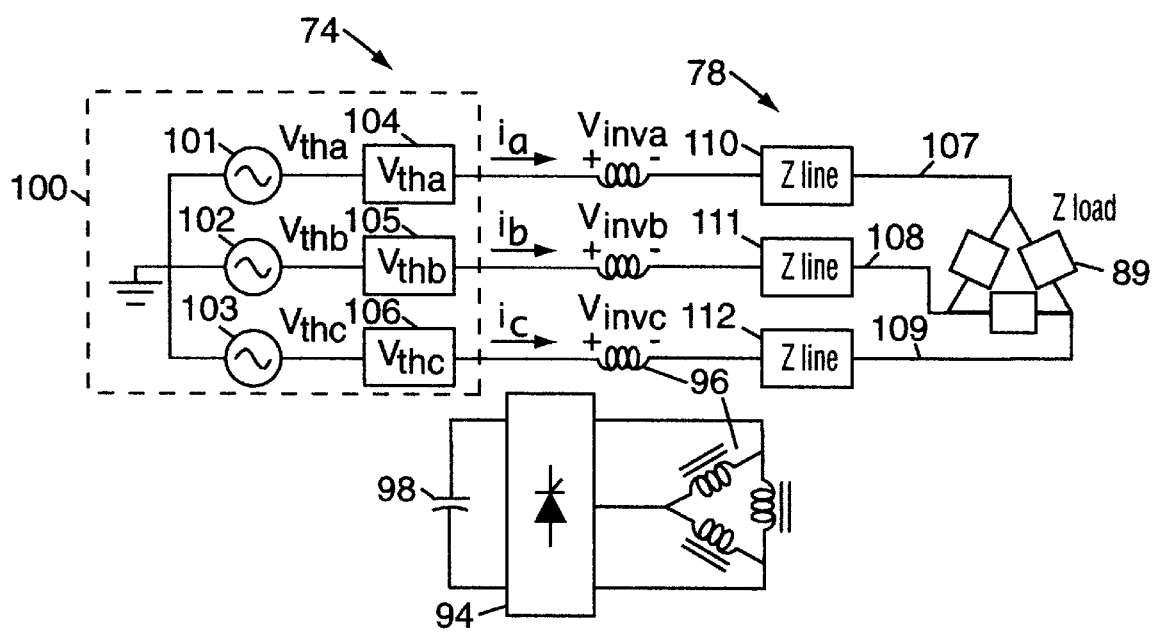
FIG. 7 is a schematic diagram of a Thevenin equivalent based model of the power distribution system illustrated in FIG. 6.

In order to meet the two constraints of the present invention, an appropriate set of compensator voltage signals for injection into the transmission lines 78 must be determined. An appropriate set of compensator voltage signals to be injected may be mathematically derived using a Thevenin equivalent model of the power distribution system 74, which is illustrated in FIG. 7. In FIG. 7, the faulted feeder 76 and the source voltage have been combined into a Thevenin equivalent circuit 100 consisting of three-phase source voltages 101–103, of magnitude $V_{tha-c}$, connected in series with three-phase line impedances 104–106, of magnitude $Z_{tha-c}$, which is connected in series with the second feeder 78 of the distribution system 74. In the three-phase representation of FIG. 7, the second feeder transmission lines 78 are represented as three-phase power transmission lines 107–109, having line impedances 110–112, assumed to be of equal impedance $Z_{line}$, which connect the source voltage to the three-phase load 89, having a load impedance $Z_{load}$, and which, in this case, is delta connected. A voltage compensator inverter 94 is controlled to generate compensator inverter voltage signals $V_{inva-c}$ in series with the three-phase power lines 107–109 of the second feeder, from the DC voltage across DC bus capacitor 98.

Using FIG. 7, the compensator inverter voltages $V_{inva-c}$, which must be injected by the compensator inverter 94 to meet the two constraints of voltage restoration and zero real power transfer, may be derived. First, let $V_{ab}$, $V_{bc}$, and $V_{ca}$ represent the pre-fault line-to-line load voltages. Next, assume that the restored load voltages, after the occurrence of a fault, have the same magnitude as the pre-fault load voltage vectors, but are rotated by a phase rotation angle $\phi$ from the load voltage vectors before the fault. Thus, the restored line-to-line load voltages $\hat{V}_{ab}$, $\hat{V}_{bc}$, and $\hat{V}_{ca}$ may be expressed as:

$$\hat{V}_{ab}=V_{ab}\exp(j\phi), \tag{6}$$

$$\hat{V}_{bc}=V_{bc}\exp(j\phi), \tag{7}$$

and $$\hat{V}_{bc}=V_{bc}\exp(j\phi), \tag{8}$$

Since the load impedances $Z_{load}$ are known, the three-phase line currents $i_{a-c}$ can be expressed in terms of the restored load voltages:

$$i_a = \frac{1}{Z_{load}}(\hat{V}_{ab} - \hat{V}_{ca}), \tag{9}$$

$$i_b = \frac{1}{Z_{load}}(\hat{V}_{bc} - \hat{V}_{ab}), \text{ and} \tag{10}$$

$$i_c = \frac{1}{Z_{load}}(\hat{V}_{ca} - \hat{V}_{bc}), \tag{11}$$

For the Thevenin model in FIG. 7, the injected compensator voltages in all three phases can be written as:

$$V_{inva}=V_{tha}-i_a(Z_{tha}+Z_{line}+Z_{load}/3), \tag{12}$$

$$V_{invb}=V_{thb}-i_b(Z_{thb}+Z_{line}+Z_{load}/3), \tag{13}$$

and $$V_{invc}=V_{thc}-i_c(Z_{thc}+Z_{line}+Z_{load}/3). \tag{14}$$

In order to have zero real power flow in the voltage compensator 94, the following constraint is applied:

$$\text{Real}(V_{inva}i_a^* + V_{invb}i_b^* + V_{invc}i_c^*) = 0, \quad (15)$$

where $i_{a-c}^*$ are the complex conjugates of the line currents $i_{a-c}$. It is clear that equation 15 can be expressed as a function of the phase rotation angle $\phi$. This shows that by rotating the load voltage vectors, a set, or multiple sets, of solutions for which the compensator will not have real power flowing in it may be obtained.

The injected compensator voltages $V_{inva-c}$ derived above successfully eliminate any negative sequence and zero sequence components of the load voltages which may be caused by a remote utility system fault. However, as will be discussed in more detail below, elimination of the zero sequence voltage component is not always required, and generation of a compensator voltage signal including a zero sequence compensation component requires use of a special inverter topology. Thus, it may be helpful to remove the zero sequence component from the injected compensator voltage vectors $V_{inva-c}$ just derived. The zero sequence voltage $V_{zs}$ associated with the injected compensator voltages $V_{inva-c}$ is:

$$V_{zs} = (1/3)(V_{inva} + V_{invb} + V_{invc}). \quad (16)$$

By removing the zero sequence voltage $V_{zs}$ from the injected compensator voltages $V_{inva-c}$, a new set of injected compensator voltages $\hat{V}_{inva-c}$, containing no zero sequence, can be obtained:

$$\hat{V}_{inva} = V_{inva} - V_{zs}, \quad (17)$$

$$\hat{V}_{invb} = V_{invb} - V_{zs}, \quad (18)$$

and $$\hat{V}_{invc} = V_{invc} - V_{zs}. \quad (19)$$

Without the zero sequence compensation voltage, any zero sequence voltage component caused by the remote utility system fault will be reflected directly on the load voltages. However, delta connected loads, and loads connected to the feeder by transformers which are insensitive to zero sequence voltages, will not see the zero sequence voltage. Note that the zero sequence does not involve any real power. Thus, the compensator voltages $\hat{V}_{inva-c}$ both satisfy the zero real power constraint, since the sum of the line currents $i_{a-c} = 0$, and restore the load voltages to a balanced three-phase condition at pre-fault voltage levels.

To further illustrate the principles underlying the present invention, the power distribution system 74 illustrated in FIG. 6 was simulated. The following simulation parameters were used:

$V_s = 12$ KV (line-to-line RMS);

$Z_t = 0.216 + j2.16$;

$Z_{line} = 6.12 + j8.28$; and $Z_{load} = 27.08 + j13.11$.

The two feeders 76 and 78 were considered to have the same line impedance and load impedance, but different load transformer connections, as illustrated in FIG. 6. The single line-to-ground fault 96 was simulated to occur at the midpoint between the common bus 80 and the load transformer 88 in the first feeder 76. The Thevenin equivalent voltages and impedances of the faulted feeder 76 and the source voltage were calculated as follows:

$V_{tha} = 7016.2 - j1110.6$;

$Z_{tha} = 0.40 + j1.52$;

$V_{thb} = -5069.4 - j7993.7$;

$Z_{thb} = 0.30 + j2.08$;

$V_{thc} = -4388.1 + j8387.1$; and $Z_{thc} = 0.30 + j2.08$.

Figure 9:
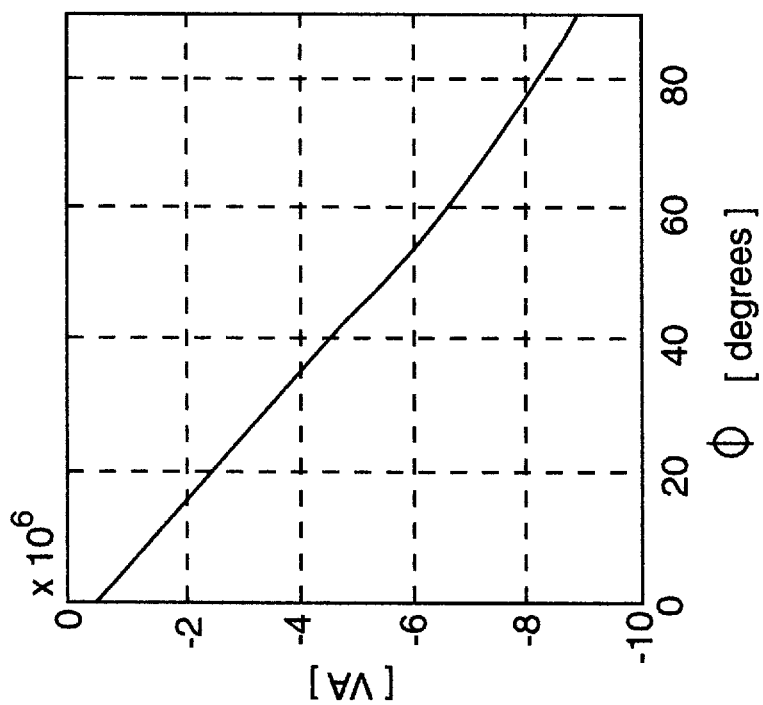
FIGS. 8 and 9 are graphs of real and reactive power, respectively, as a function of phase rotation angle φ, for a voltage compensator in accordance with the present invention.
Figure 8:
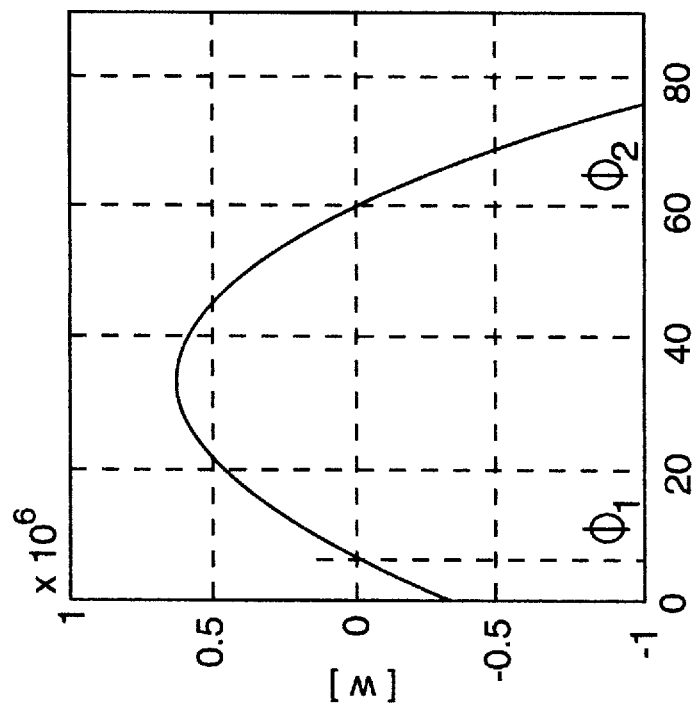

Based on these exemplary parameter values, FIGS. 8 and 9 show the power constraint condition of the present invention (Equation 15) as a function of the phase rotation angle $\phi$ (Equations 6–8). FIG. 8 shows compensator real power versus the phase rotation angle $\phi$, and FIG. 9 shows compensator reactive power versus the phase rotation $\phi$. The curve illustrated in FIG. 8 is basically that of a sinusoidal curve with a certain DC offset. This exemplary curve has two intersections with zero, one at $\phi_1 = 6.75°$ and the other at $\phi_2 = 59.6°$. Rotation of the restored load voltage vectors by either of these phase rotation angles will ensure zero real power flow between the voltage compensator 94 and the power distribution system 74. However, the phase rotation angle $\phi_1 = 6.75°$ is a better solution, because the reactive power associated with this phase rotation angle is significantly less. Reduction of the reactive power corresponds to reduced fluctuation of the DC bus voltage supporting the compensator 94.

The voltage vector illustration of FIG. 10 shows how a voltage compensator in accordance with the present invention is used to inject voltage signal vectors to restore the load voltage for an unbalanced three-phase system to a balanced three-phase condition. The Xs 114, 116, and 118, on the circle 120, mark the load voltage vector positions prior to the occurrence of a remote fault on the utility system. A remote single line-to-ground fault on the utility system causes the three-phase system to become unbalanced. The remote fault causes a voltage sag on the power system transmission lines. The resulting uncompensated load voltage vectors are illustrated by the dashed line triangle 122. The restored load voltages, after injection of a three-phase compensation voltage signal in accordance with the present invention, is illustrated by the solid line triangle 124. As can be seen, the restored load voltage vectors 124 are on the same circle 120 as the pre-fault voltage vectors 114, 116, and 118. However, the restored voltage vectors are rotated by a phase rotation angle $\phi$ from the pre-fault load voltage vectors. The phase rotation angle $\phi$ is selected such that the compensation voltage signals do not inject any real power into the utility system.

FIG. 11 shows in detail a portion 126 of FIG. 10. FIG. 11 illustrates one phase $V_{inva}$ 128 of the compensator voltage which is injected into the power transmission lines 78 to restore the load voltage for that phase to the pre-fault voltage condition and to rotate the load voltage by the phase rotation angle $\phi$. As illustrated in FIG. 11, the exemplary compensator voltage vector 128 $V_{inva}$ may be dissected into three component vectors, $V_{inva1-3}$. Each component of the compensator voltage $V_{inva}$ serves a separate function.

The compensator voltage component vector $V_{inva1}$ 130 restores the load voltage for this phase back to the pre-fault position 114. Thus, compensator voltage component vector $V_{inva1}$ 130 restores the phase voltage magnitude and phase back to the pre-fault condition. Similar compensator voltage component vectors $V_{invb1}$ and $V_{invc1}$ restore the load voltage vectors back to the pre-fault positions in the other two phases. These first components of the compensator voltage vectors operate to restore the Thevenin equivalent circuit of the power system back to the pre-fault condition. These first components of the compensator voltage vectors may thus be defined based on the pre-fault Thevenin equivalent voltage values $V_{tha0}$, $V_{thb0}$, and $V_{thc0}$, the pre-fault Thevenin equivalent impedances $Z_{tha0}$, $Z_{thb0}$, and $Z_{thc0}$, and the fault condition Thevenin equivalent voltages $V_{tha-c}$ and impedances $Z_{tha-c}$ as follows:

$$V_{inva1}=(V_{tha}-V_{tha0})+i_a(Z_{tha0}-Z_{tha}), \quad (20)$$

$$V_{invb1}=(V_{thb}-V_{thb0})+i_b(Z_{thb0}-Z_{thb}), \quad (21)$$

and $$V_{invc1}=(V_{thc}-V_{thc0})+i_c(Z_{thc0}-Z_{thc}). \quad (22)$$

The first compensation voltage vector components, $V_{inva1}$, $V_{invb1}$, and $V_{invc1}$, restore the load voltage to its pre-fault condition. However, the total real power associated with these three compensation voltage vector components may not be zero. Thus, energy must be provided from the compensator 94 to the utility system from an energy storage device in the compensator. However, in accordance with the present invention, an additional compensation voltage vector component is used to extract the required real power from the utility such that the net real power transfer between the compensator 94 and the utility system feeder 78 is zero.

The second voltage component vector $V_{inva2}$ 132 of the compensation voltage vector $V_{inva}$ 128 is an injected voltage vector which is in phase with the power line current $i_a$. Each compensation load voltage vector has a similar voltage vector component. The three compensation voltage vector components which are injected to ensure zero real power transfer between the compensator 94 and the distribution system branch 78 may be defined as follows:

$$V_{inva2}=k_1 i_a, \quad (23)$$

$$V_{invb2}=k_1 i_b, \quad (24)$$

and $$V_{invc2}=k_1 i_c, \quad (25)$$

where $k_1$ is a constant which is selected such that the magnitude of the injected voltage compensation vector components $V_{inva2}$, $V_{invb2}$, and $V_{invc2}$ result in zero real power flow in the compensator. Thus, given the first two voltage compensator vector components described:

$$\text{Real } ((V_{inva1}+V_{inva2})i_a{}^*+(V_{invb1}+V_{invb2})i_b{}^*+(V_{invc1}+V_{invc2})i_c{}^*)=0 \quad (26)$$

At this point, the injected compensation voltages will provide a balanced three-phase voltage to the load, with zero net power transfer. However, as illustrated in FIG. 11, the second compensator inverter voltage vector component $V_{inva2}$ 132 causes a voltage drop away from the pre-fault voltage level, i.e., away from the circle 120. Thus, a third compensation voltage vector component $V_{inva3}$ 134 is used to cancel the voltage drop across the transmission line inductance, to boost the load voltage magnitude back to the pre-fault voltage level. The third injected compensation voltage vector component is in quadrature with the line current $i_a$, so there is no real power flow associated with this voltage vector component. Similar third compensation voltage vector components $V_{inva3}$, $V_{invb3}$, and $V_{invc3}$ are provided in each phase. The third compensation voltage vector components may be defined as follows:

$$V_{inva3}=jk_2 i_a, \quad (27)$$

$$V_{invb3}=jk_2 i_b, \quad (28)$$

and $$V_{invc3}=jk_2 i_c, \quad (29)$$

where $k_2$ is a constant whose magnitude is selected such that the magnitude of the third compensation voltage vector component brings each phase voltage magnitude back to the pre-fault voltage level 120.

The three compensation voltage vectors $V_{inva-c}$ are the phase-by-phase combination of the above three sets of voltage vector components defined by Equations 20–22, 23–25, and 27–29. In summary, the first set of voltage vector components (Equations 20–22) achieve fault correction by re-building the Thevenin equivalent circuit back to the pre-fault condition. The second and third sets of compensation voltage vector components (Equations 23–25 and 27–29) rotate the restored load voltage vectors in a balanced fashion, by the phase rotation angle $\phi$, to a point where the zero real power flow constraint of a voltage compensator in accordance with the present invention is satisfied.

The three compensation load voltage vectors $V_{inva-c}$ achieve load voltage restoration with no real power flow in the compensator 94. However, these three vectors do not add up to zero, which means a zero sequence voltage exists in the compensator. In order to provide the zero sequence voltage component in a compensator inverter output voltage, a special inverter topology capable of producing a zero sequence output voltage is required. However, elimination of the zero sequence voltage component caused by a remote utility system fault is not always required. The zero sequence voltage component caused by the fault is the component of load voltage which is common to each of the three phases. Thus, for example, for a load which is connected to the utility through a delta-wye transformer, the zero sequence voltage component can be ignored. For such a load connection, it is the line-to-line voltages which are provided to the load. Since the zero sequence voltage component is common to each of the phases, the zero sequence voltage component is eliminated by such a transformer connection. However, for loads which are connected in a manner such that the load is sensitive to the zero sequence voltage, the zero sequence voltage component caused by the fault must be eliminated to prevent a zero sequence current from flowing in the load or the load transformer.

Figure 12:
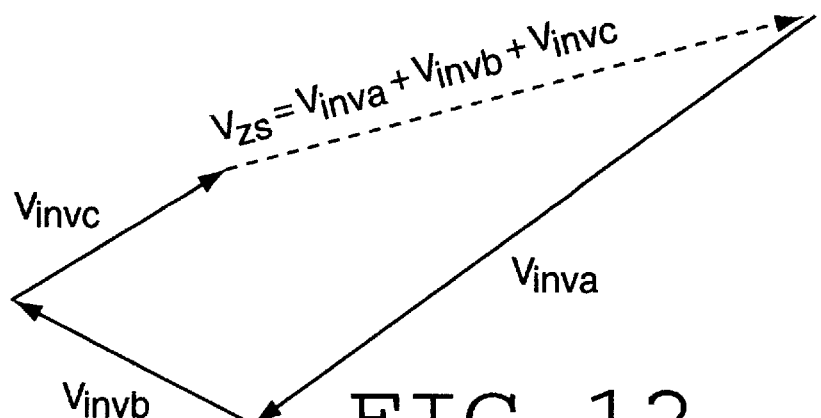
FIGS. 12–14 are voltage phase vector diagrams illustrating the removal of zero sequence components from injected compensator inverter voltages.
Figure 13:
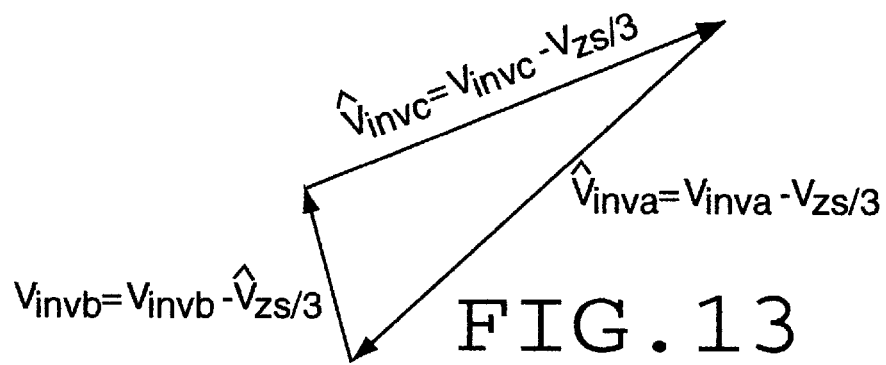
Figure 14:
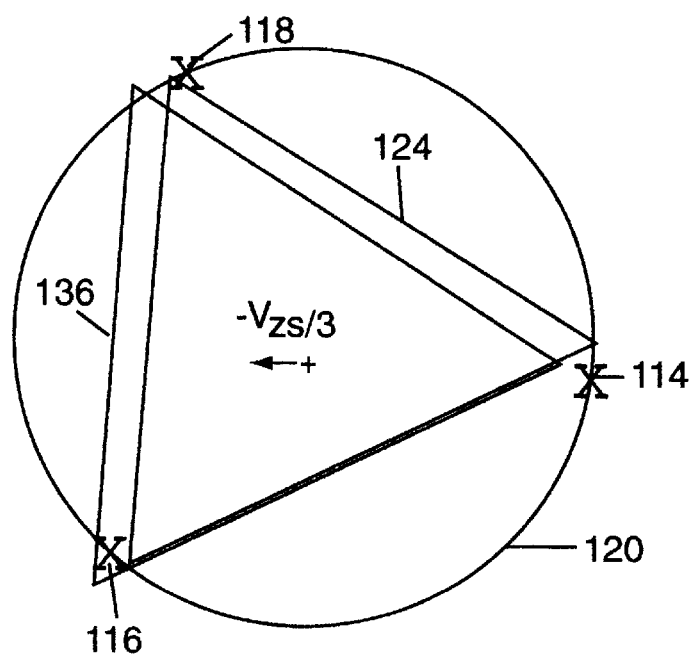

The vector diagram of FIG. 12 shows that the zero sequence voltage $V_{zs}$ in the compensator voltage signal is equal to the sum of the compensator voltage vectors $V_{inva-c}$. It is apparent that the zero sequence voltage $V_{zs}$ in the compensator voltage signal can be removed if $V_{zs}/3$ is subtracted from each of the compensator voltage vectors $V_{inva-c}$. The vector diagram of FIG. 13 illustrates the fact that the sum of the new set of compensation voltage vectors $\hat{V}_{inva-c}$, with the zero sequence voltage removed, equals zero. The removal of the zero sequence voltage component from the compensator voltage signal causes the load voltage vectors to move along the direction of $-V_{zs}/3$ in all three phases. Thus, as illustrated in FIG. 14, the restored and rotated load voltage vectors 124 drift away from the circle 120 which the pre-fault load vectors were on when the zero sequence voltage is eliminated from the compensator voltage signal. The translated voltage vectors are schematically illustrated by triangle 136 in FIG. 14. The translation of the load voltage vectors does not cause any problem for the delta connected load, because the line-to-line voltages remain the same. The zero sequence voltage does not affect the real power flow of the voltage compensator 94.

An exemplary embodiment of a dynamic series voltage restoration system in accordance with the present invention will now be described in detail. In the previous discussion, it was determined that a voltage sag caused by a remote utility system fault can be compensated by injecting an appropriate voltage signal in series with the transmission line supplying a load. In accordance with the present invention, the injected voltage signal is selected to restore the load voltage to a balanced three-phase condition at the pre-fault voltage level, while ensuring that the total real power exchanged between the voltage compensator system and the utility system is zero. This condition is achieved by restoring the load voltage vectors to their pre-fault condition, and rotating the restored load voltage vectors by a selected phase rotation angle φ. In the previous discussion, it was determined that the appropriate compensator voltage signals to be injected can be determined using a Thevenin equivalent model of the power distribution system under fault and pre-fault conditions. However, it should be clear that for practical applications of a voltage restoration system in accordance with the present invention, the Thevenin equivalent model of the power distribution system cannot be known. The Thevenin equivalent model of the power distribution system will vary depending upon the exact nature and location of the system fault. Therefore, a dynamic series voltage restoration system in accordance with the present invention preferably is able to determine the appropriate compensation voltages to be injected based on measurable quantities available to the voltage restoration system.

Prior to the occurrence of a remote fault on the utility system, the multi-phase voltage provided to a load is defined by a positive sequence voltage, with no negative or zero sequence component. A fault, such as a single line-to-ground fault on the utility system, causes the pre-fault positive sequence voltage provided to the load to be altered, and adds a negative sequence component to the transmission line voltage. The fault may also cause a zero sequence voltage component to be generated, depending on how the faulted feeder is connected. Thus, the load voltage may be restored to a balanced three-phase condition at pre-fault voltage levels if a voltage signal is injected into the transmission line which restores the positive sequence voltage to its pre-fault condition, and cancels the negative and zero sequence components caused by the fault. As will be discussed in more detail below, a voltage compensator inverter connected in series with the power transmission line may be controlled to inject such a voltage signal into the transmission line. The appropriate voltage signal is determined by a system controller based upon measured voltage compensator inverter terminal voltages. The voltage compensator inverter is also controlled simultaneously to inject a voltage signal in series with the power transmission line which ensures that no real power is exchanged between the voltage compensator inverter and the utility system. This component of the injected voltage signal is determined by the voltage compensator inverter controller based on measured DC bus capacitor voltage and power transmission line current values.

Figure 15:
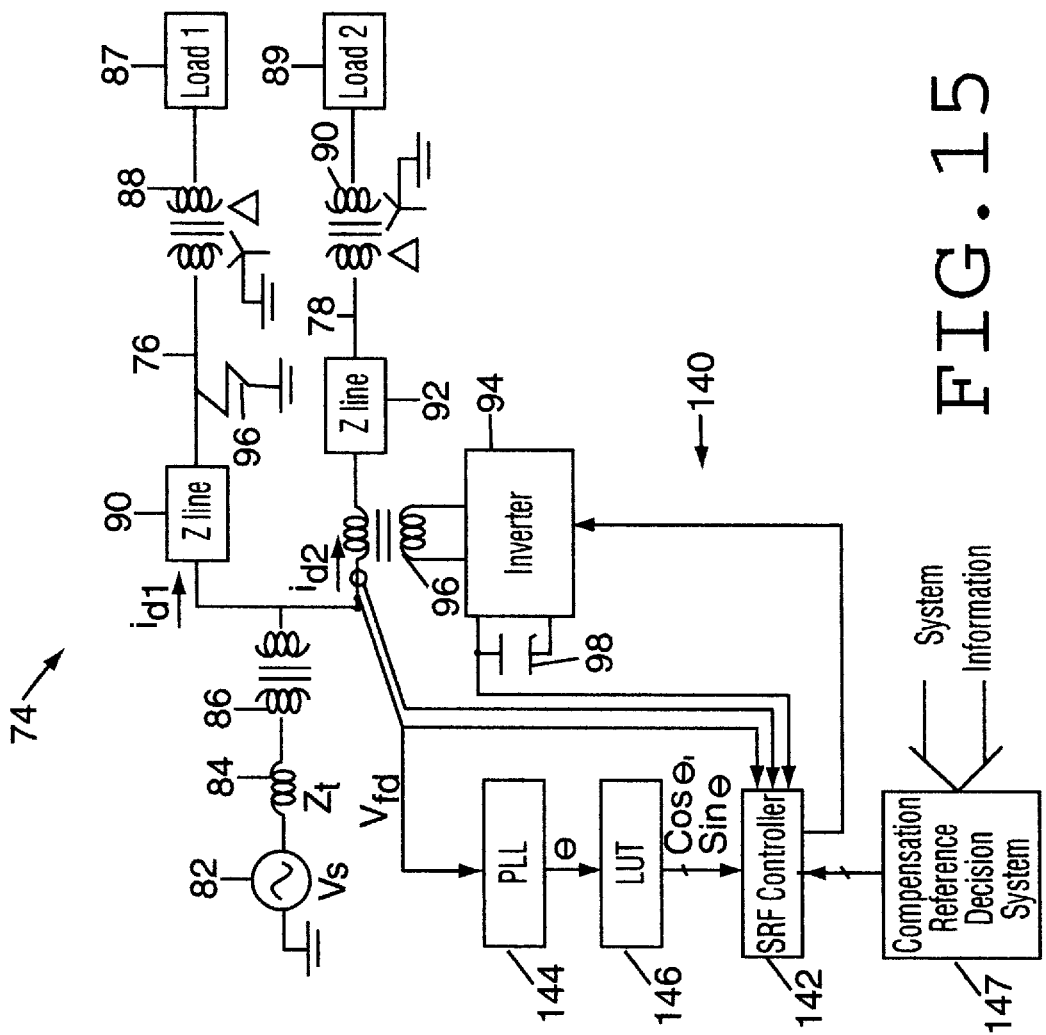
FIG. 15 is a block diagram of a dynamic voltage restoration system in accordance with the present invention showing the main functional components of a voltage compensator inverter control system.

The schematic block diagram of FIG. 15 illustrates a dynamic series voltage restoration system 140 in accordance with the present invention, along with functional elements of a voltage compensator inverter controller for providing control signals to the voltage compensator inverter 94 of the voltage restoration system 140, to control the voltage compensator inverter 94 in accordance with the present invention so as to restore the load voltage provided on power transmission line 78 to a load 89 to a balanced three-phase condition at pre-fault voltage levels, while ensuring that the total real power exchanged between the voltage restoration system 140 and the transmission lines 78 is equal to zero. The voltage restoration system 140 is illustrated in FIG. 15 as being connected to a second feeder 78 of a two feeder power distribution system 74. Note that the exemplary power distribution system 74 is the same as that illustrated previously in FIG. 6, and the same reference numerals used in FIG. 6 are carried over to FIG. 15 to identify identical parts thereof. As described previously, the dynamic series voltage restoration system 140 will compensate for voltage sags in the second feeder 78 of the power distribution system 74 which are caused by faults, such as single line-to-ground fault 96, in the first feeder 76 of the power distribution system 74. Of course, it should be apparent that a dynamic series voltage restoration system 140 in accordance with the present invention may be applied to any type of power distribution system, having any number of feeders, to compensate for voltage sags caused by faults at remote locations in the utility system.

The voltage compensator inverter controller 142 generates inverter control signals that are provided to the voltage compensator inverter 94 to control the inverter 94 to generate compensator inverter voltage signals that are injected, via transformer 96, into the power transmission lines 78 to provide voltage restoration and to ensure that total real power exchanged between the compensator inverter 94 and the transmission line 78 is equal to zero. The compensator inverter controller 142 is preferably implemented as a synchronous reference frame (SRF) based controller.

An SRF based controller operates by transforming measured three-phase signal values into two-phase synchronously rotating reference frame signal values, manipulating these two-phase reference frame signal values to generate two-phase inverter voltage command signals, and transforming the two-phase inverter voltage command signals to three-phase inverter voltage command signals that are provided to control the voltage compensator inverter 94. In accordance with the present invention, the measured three-phase values used to generate the compensator inverter voltage command signals are the three-phase voltage compensator inverter terminal voltages $v_{fda-c}$, and the three-phase power line currents $i_{d2a-c}$ in the second feeder 78 of the power system 74. The measured voltage $v_{dc}$ across the DC bus capacitor 98 is also employed by the compensator inverter controller 142 to generate the inverter voltage command signals. The voltages $v_{fda-c}$ and $v_{dc}$, and currents $i_{d2a-c}$, may be measured in a conventional manner. For example, a conventional current transformer may be used to measure the three-phase line currents $i_{d2a-c}$.

Figure 2:
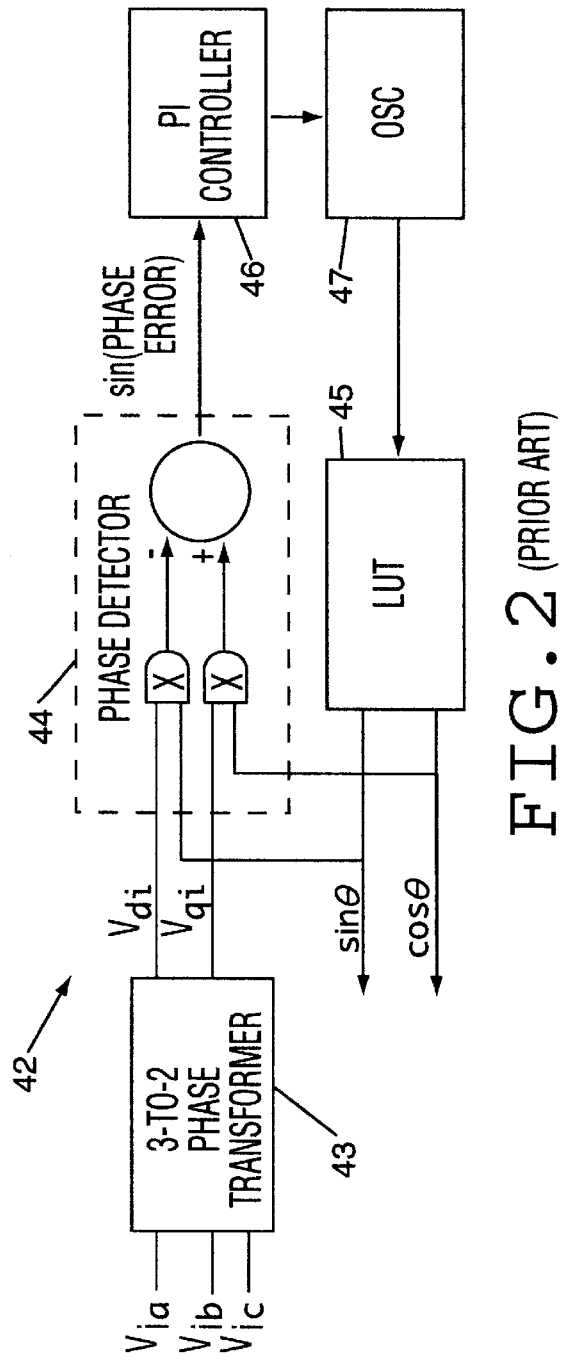
FIG. 2 is a block diagram of a phase-locked loop which may be used in conjunction with a synchronous reference frame based controller.

In the SRF based voltage compensator inverter controller 142, the measured three-phase voltage $v_{fda-c}$ and current $i_{d2a-c}$ values are transformed into synchronously rotating two-phase reference frame signal values at the fundamental frequency of the power signal. This transformation may be accomplished in a conventional manner. As described previously, the three-phase to two-phase transformation requires cos θ and sin θ signal values calculated from the phase angle signal value θ at the fundamental frequency. These signal values may be generated in a conventional manner, as previously described with respect to FIG. 2, using, for example, a phase-locked loop (PLL) 144 on the measured voltage compensator inverter terminal voltage $v_{fd}$, to produce the θ signal value, and a look-up table 146 to provide the cos θ and sin θ signal values from the phase-locked angle θ. The PLL 144 and look-up table 146 are also used in transforming two-phase inverter voltage command signals into three-phase inverter voltage command signals.

The voltage compensator inverter 94 synthesizes the inverter voltage signal that is injected into the power transmission lines 78 from the voltage across a DC bus capacitor 98. The control signals provided to the compensator inverter 94 from the SRF controller ensure that there is zero total real power flow between the compensator inverter 94 and the transmission lines 78. This is achieved by controlling the inverter 94 to provide injected compensation voltage signals which achieve power balancing of the DC bus capacitor 98, and which compensate for the losses of the inverter 94, by maintaining a desired DC bus voltage level across the DC bus capacitor 98. As will be described in more detail below, power balancing of the DC bus capacitor 98 is achieved by the SRF controller 142 by generating DC bus control inverter voltage command signals based on the measured power line currents $i_{d2a-c}$ and the measured voltage $v_{dc}$ across the DC bus capacitor 98. The voltage $v_{dc}$ across the DC bus capacitor 98 may be measured in a conventional manner.

In accordance with the present invention, the SRF based controller 142 may generate simultaneously positive sequence, negative sequence, zero sequence, and DC bus control inverter voltage command signals. These different command signals are combined together in the SRF controller before being applied to control the compensator inverter 94. Switching signals for the compensator inverter 94 may be derived from the combined inverter voltage command signals in a conventional manner, using, for example, conventional PWM modulation techniques. The compensator inverter 94 is thereby controlled simultaneously to perform both functions of restoring the load voltage to a balanced three-phase condition at pre-fault voltage levels, while ensuring that the total real power exchanged between the compensator inverter 94 and the transmission line 78 is equal to zero.

In generating the inverter voltage command signals, the SRF based controller 142 employs various reference command signal values which, as described in more detail below, may be set to default values. However, under certain operating conditions, such as severe fault conditions, it may be desirable to adjust these reference command signal values in order to optimize the performance of the voltage restoration system 140. For this purpose, a compensation reference decision system 147, which derives the adjusted reference command signal values from the required system information under certain operating conditions, may be employed. Use of a compensation reference decision system 147 will be described in more detail below.

An exemplary SRF-based voltage compensator inverter controller 142, for use with the present invention, is described in more detail with reference to FIG. 16. This exemplary controller provides control signals for controlling the compensator inverter 94 to restore the load voltage to a balanced three-phase condition at pre-fault voltage levels while ensuring that the total real power associated with the voltage compensation function is equal to zero. The load voltage restoration function is accomplished by the SRF based controller 142 by generating positive sequence inverter voltage command signals for controlling the voltage compensator inverter 94 to restore the positive sequence load voltage to the pre-fault positive sequence voltage condition, negative sequence inverter voltage command signals, for controlling the voltage compensation inverter to cancel the negative sequence component of the load voltage caused by a remote utility system fault, and, optionally, zero sequence inverter voltage command signals, for controlling the voltage compensator inverter 94 to generate a voltage signal which cancels the zero sequence component of the load voltage caused by the remote utility system fault. The zero total real power transfer condition of the voltage restoration system 140 is implemented by the SRF based controller 142 by generating DC bus control inverter voltage command signals for controlling the voltage compensator inverter 94 to generate an inverter voltage signal which balances the voltage on the DC bus capacitor 98.

The portion of the exemplary SRF based controller 142 which generates the positive sequence inverter voltage command signals for controlling the voltage compensator inverter to restore the positive sequence load voltages to the pre-fault condition will be described first. Positive sequence control is based on the three-phase voltage compensator inverter terminal voltages $v_{fda-c}$, which may be measured in a conventional manner. The measured voltage compensator inverter terminal voltage signal values $v_{fda-c}$ are applied to a positive sequence three-phase to two-phase synchronous reference frame transformation device 150. The positive sequence three-phase to two-phase transformation device 150 may be implemented in a conventional manner to transform the three-phase voltage compensator inverter terminal voltage values $v_{fda-c}$ into two-phase synchronously rotating voltage compensator inverter terminal voltage values $v_{fdq,pos}$ and $v_{fdd,pos}$ at the fundamental frequency, in the manner described previously with respect to FIG. 1. The positive sequence three-phase to two-phase synchronous frame transformation 150 thus employs sin θ and cos θ signal values, that may be generated by the PLL 144 on the measured voltage compensator inverter terminal voltage $v_{fd}$, and the look-up table 146, to perform the three-phase to two-phase transformation.

Figure 17A:
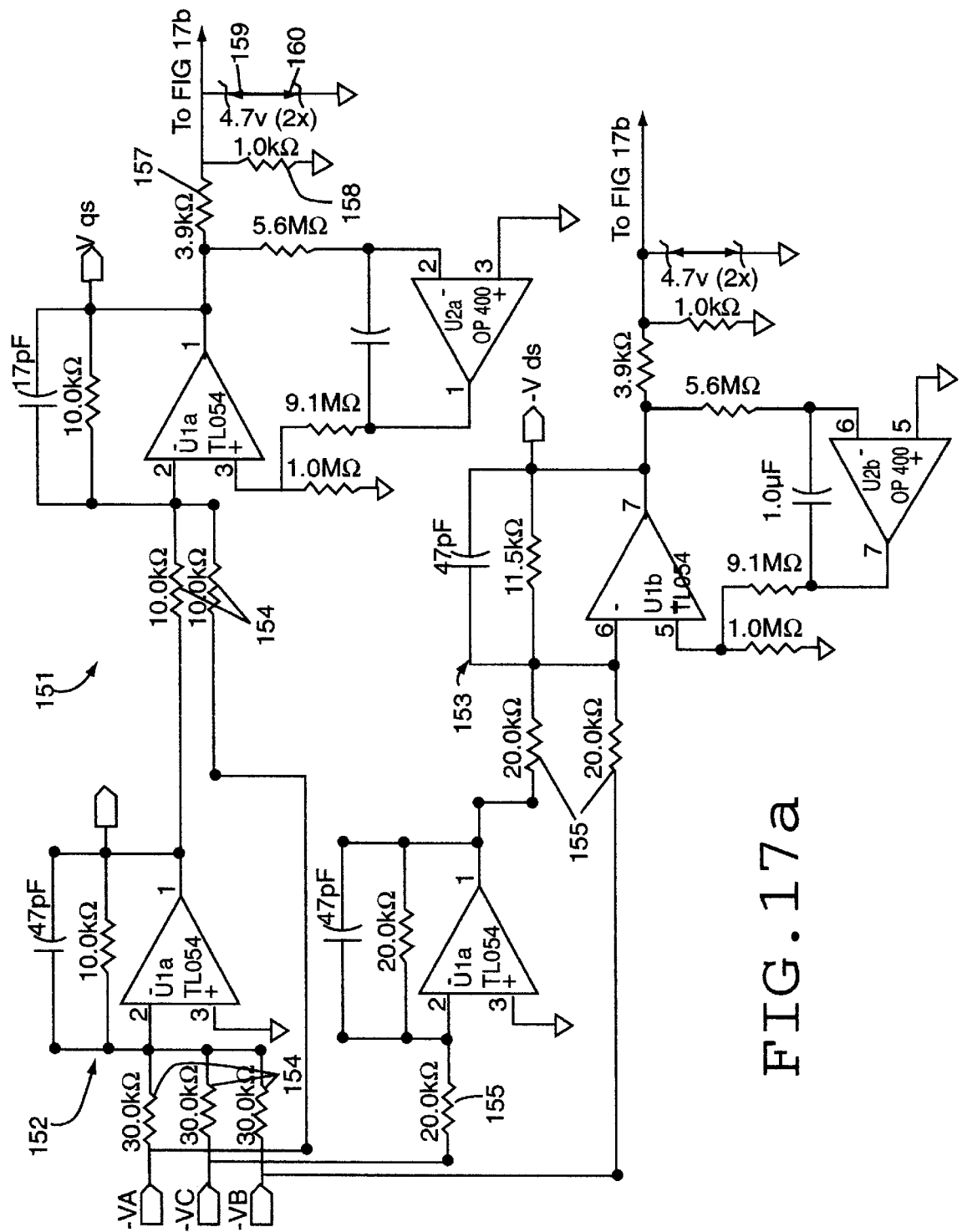
FIG. 17 is a schematic circuit diagram of a three-phase to two-phase synchronous reference frame transformation device that may be employed in the controller for the voltage compensator inverter of the present invention.
Figure 17B:
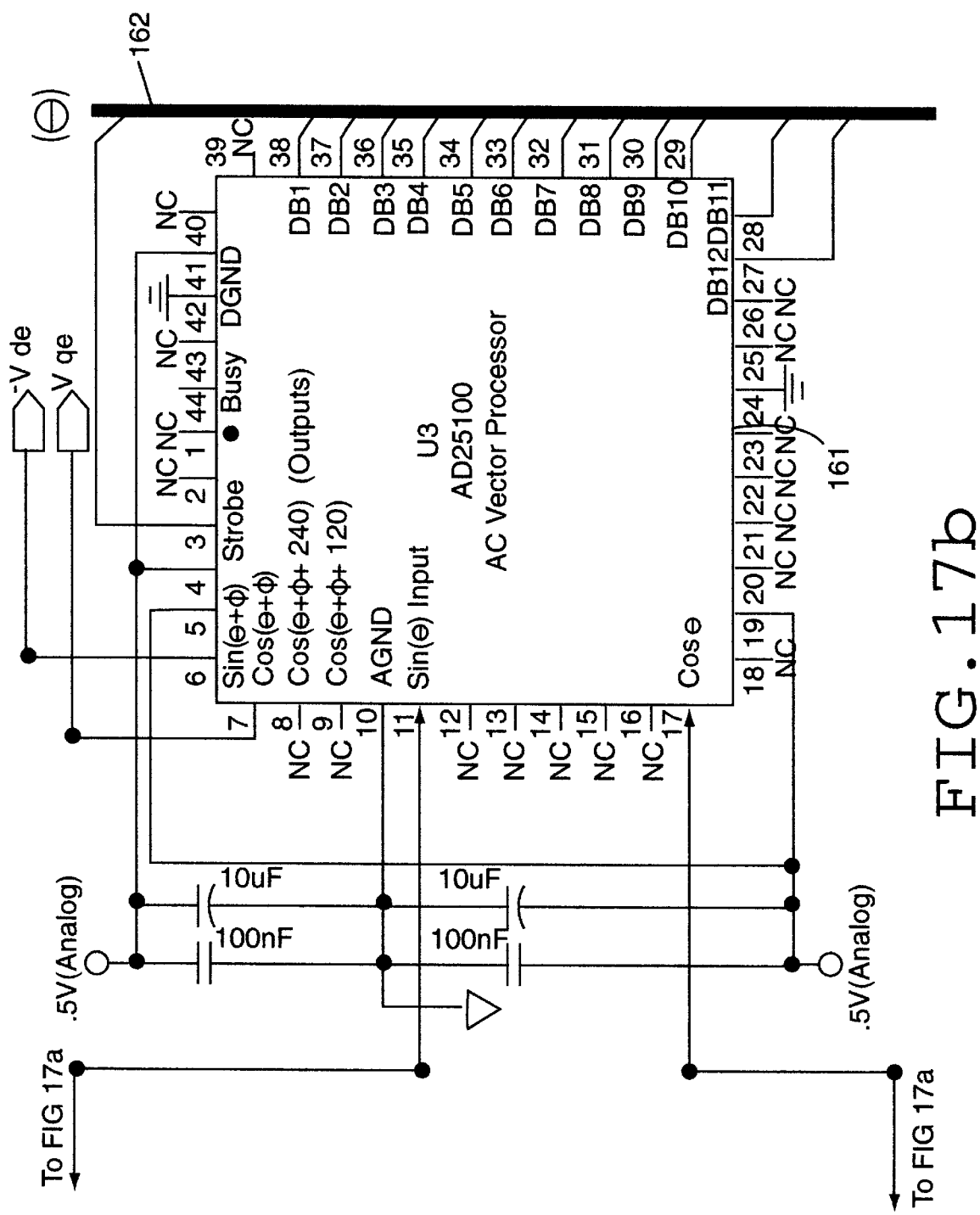

An exemplary circuit for implementing the positive sequence three-phase to two-phase synchronous reference frame transformation 150 is illustrated in FIG. 17. An amplifier circuit 151 is used to perform the initial transformation of the three-phase signal to the two-phase stationary ds-qs reference frame. A first amplifier circuit 152 generates $v_q^s$ from the three voltage compensator inverter terminal voltage signals $v_{fda-c}$. In a similar manner, a second amplifier circuit 153 generates signal $v_d^s$ in the stationary two-phase reference frame based on the measured three-phase voltage signals $v_{fda-c}$. The amplifier circuits 152 and 153 generate $v_d^s$ and $v_q^s$ in the stationary two-phase reference frame by combining the voltage signals $v_{fda-c}$ multiplied by the appropriate constants as defined by Equation 1. Note that the two amplifier circuits 152 and 153 are essentially identical; however, the resistors 154 in amplifier circuit 152, and resistors 155 in amplifier circuit 153, have resistance values chosen to provide multipliers of the desired ratio between the voltage signals $v_{fda-c}$ to form $v_q^s$ and $v_d^s$. Resistors 157 and 158, and back-to-back zener diodes 159 and 160, in each amplifier circuit 152 and 153, provide a voltage divider for reducing the scale of the $v_q^s$ and $v_d^s$ quantities and a voltage limiter, respectively.

Multiplication by the sin θ and cos θ unit vectors is achieved in the SRF transformation circuit 150 shown in FIG. 17 by use of an integrated circuit AC vector processor chip 161, such as the AD2S100 or AD2S105. The stationary two-phase reference frame signals $v_q^s$ and $v_d^s$ are input to the vector processor 161 at the sin θ and cos θ inputs, respectively. The rotating two-phase reference frame signal values $v_q^e$ and $v_d^e$ are output from the vector processor 161. The amount by which the stationary two-phase reference frame signal values $v_q^s$ and $v_d^s$ are rotated to form the rotating two-phase reference frame signal values $v_q^e$ and $v_d^e$ is determined by a signal, representative of the phase angle θ, which is applied on lines 162 to the inputs of the vector processor 161. The lines 162 are inputs to a look-up table within the vector processor 161 that correspond to the cos θ and sin θ values that are required by Equation 2. Thus, the look-up table function 146 of FIG. 15 is implemented in the vector processor 161. Other circuits may also be used to accomplish the three-phase to stationary two-phase reference frame transformation, and to achieve the transformation from stationary to synchronous rotating two-phase quantities. For example, digital implementation of the three-phase to two-phase transformation 150, using a microprocessor or digital signal processor (DSP), may be used.

Figure 18:
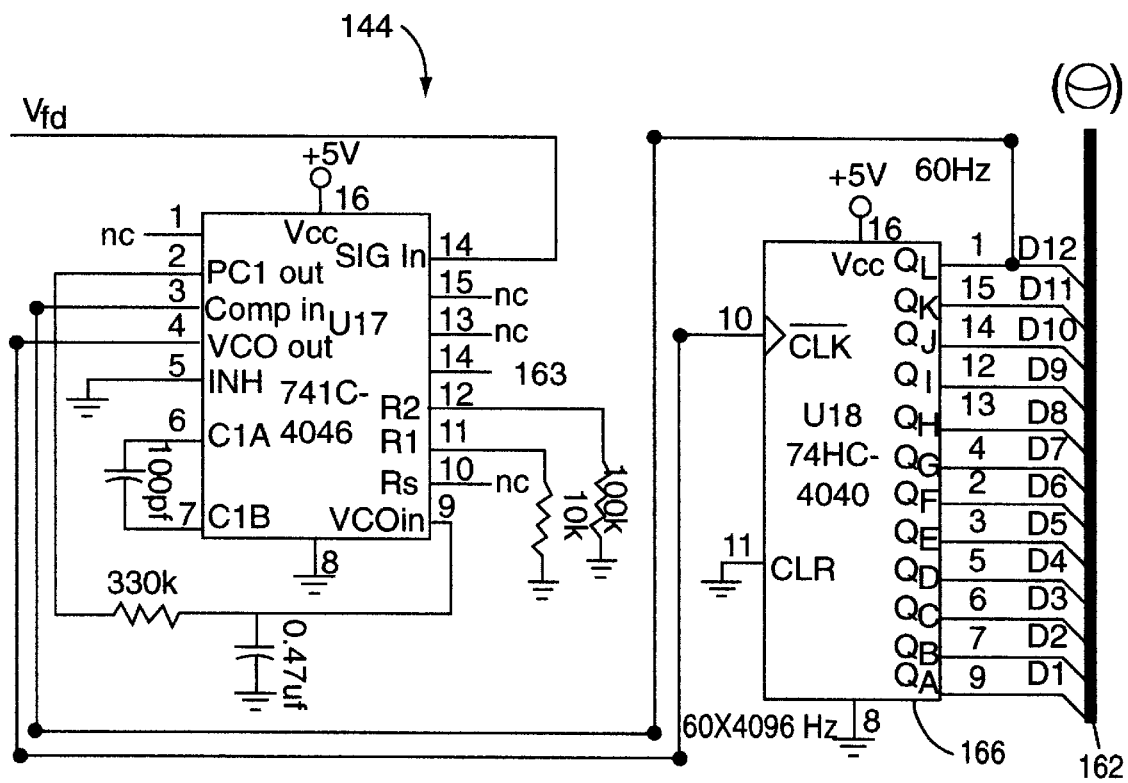
FIG. 18 is a schematic circuit diagram of a phase locked loop that may be employed in the controller for the voltage compensator inverter of the present invention.

The stationary to rotating two-phase transformation is preferably based on cos θ and sin θ values that are derived from a phase-locked loop (PLL) 144 on the measured voltage compensator inverter terminal voltage $v_{fd}$. Of course, any signal which locks to the fundamental frequency on the power transmission line may be used. For the three-phase to two-phase SRF transformation circuit 150 shown in FIG. 17, the corresponding PLL 144 is illustrated in FIG. 18. A signal that locks to the fundamental frequency, such as the line-to-neutral voltage compensator inverter terminal voltage $v_{fd}$, for any one phase, is applied to the input of integrated circuit 163. A clocking signal output of the circuit 163 increments the count in a binary counter 166. The outputs of binary counter 166 are address signals corresponding to θ. These signals are applied to the lines 162 where they may be used by vector processing circuits, such as vector processor 161 in FIG. 17, as addresses for internal look-up tables containing the desired sin θ and cos θ values. The binary counter 166 also outputs a signal pulse at the fundamental frequency of $v_{fd}$, e.g., 60 Hz. This signal is fed back as an input to the integrated circuit 163. The integrated circuit 163 adjusts its clocking rate output to bring the signal received from the counter 166 into phase lock with the $v_f$ input signal. Other PLL circuits, including PLLs implemented digitally in microprocessors or digital signal processors (DSPs) may also be used. It should be noted that the exemplary three-phase to two-phase transformation and the PLL circuits just described may be used, with slight modification, wherever use of a three-phase to two-phase transformation or PLL is called for in this application.

In transforming the three-phase voltage compensator inverter terminal voltage signal values $v_{fda-c}$ into the two-phase synchronously rotating voltage compensator inverter terminal voltage signal values $v_{fdq,pos}$ and $v_{fdd,pos}$, at the fundamental frequency, the fundamental positive sequence component of the measured voltage compensator inverter terminal voltage signal values is converted into a DC component of the two-phase voltage compensator inverter terminal voltage signal values $v_{fdq,pos}$ and $v_{fdd,pos}$. Thus, signals $/v_{fdq,pos}$ and $/v_{fdd,pos}$, corresponding to the fundamental positive sequence component of the voltage compensator inverter terminal voltages, may easily be extracted without any phase delay from the two-phase voltage compensator inverter terminal voltage signal values $v_{fdq,pos}$ and $v_{fdd,pos}$. Any method for extracting a DC component from a signal may be used. For the positive sequence in particular, a fast DC component extraction method is preferred. Low-pass filters 168 and 170 may be used to extract the DC component from the two-phase voltage compensator inverter terminal voltage signals $v_{fdq,pos}$ and $v_{fdd,pos}$. The low-pass filters 168 and 170 may be realized by maximally flat Butterworth low-pass filters. Other conventional low-pass filter designs may also be used, such as sixth order switch-capacitor low-pass filters with an appropriate cut-off frequency (e.g., 10 Hz). The ability to extract a particular frequency component from a measured current or voltage signal, using a low-pass filter or similar device, without introducing any phase delay, is a significant advantage of SRF based controllers. Most other controllers will introduce significant phase shift at both harmonic and fundamental frequencies.

Figure 19:
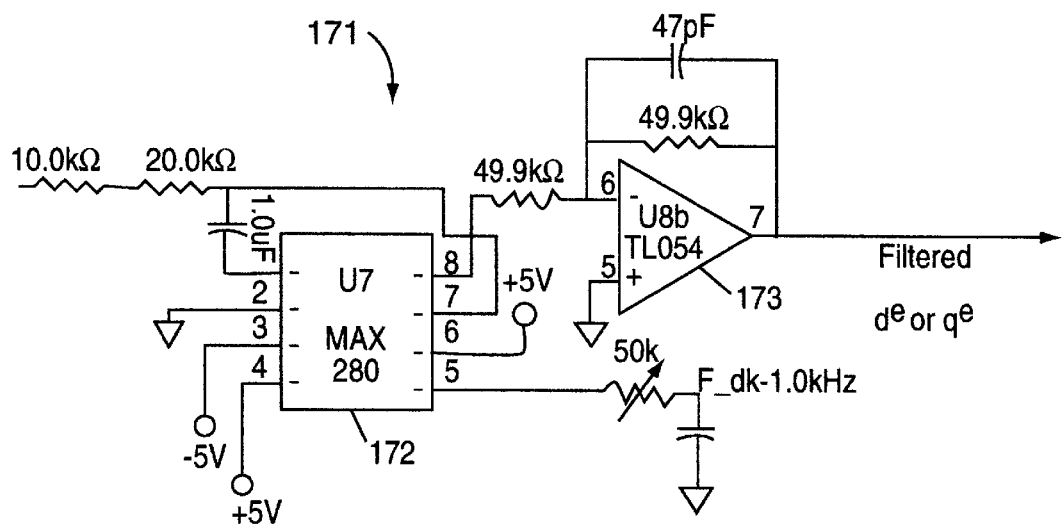
FIG. 19 is a schematic circuit diagram of a switched capacitor low-pass filter that may be employed in the controller for the voltage compensator inverter of the present invention.

The low-pass filters 168 and 170 may be implemented using switched capacitor low-pass filters 171, of the type illustrated in FIG. 19. In the switched capacitor low-pass filter 171, an integrated circuit switch 172 switches to extract the DC component from an input signal. An amplifier circuit 173 provides an output buffer for the low-pass filter 171. Of course, other low-pass filter designs may also be employed, such as LPFs using an analog Sallen-Key approach, or digital LPFs implemented in a digital signal processor (DSP). It should also be noted that the switched capacitor LPF just described may be used wherever use of a LPF is called for in this specification, provided that the dynamic performance requirements of load voltage restoration can be achieved.

The extracted DC signal values corresponding to the fundamental positive sequence component of the voltage compensator inverter terminal voltage are compared with positive sequence voltage reference command signal values $/v_{fdq,pos}*$ and $/v_{fdd,pos}*$ at junctions 174 and 176, respectively, to produce the positive sequence inverter voltage command signals $v_{invq,pos,v-loop}*$ and $v_{invd,pos,v-loop}*$ in the two-phase reference frame. The positive sequence voltage reference command signal values $/v_{fdq,pos}*$ and $/v_{fdd,pos}*$ preferably represent the fundamental positive sequence voltage component of the voltage compensator inverter terminal voltage prior to the occurrence of a remote fault on the utility system. These default reference command signal values may be derived during normal operating conditions of the utility system, i.e., before a fault condition occurs, by measuring the voltage compensator inverter terminal voltages $v_{fda-c}$ in the three-phase reference frame, transforming the measured voltage compensator inverter terminal voltages into two-phase voltage values using a three-phase to two-phase synchronous reference frame transformation operating at the fundamental frequency, and extracting the DC component from the resulting two-phase signal values to obtain the fundamental positive sequence component of the voltage compensator inverter terminal voltage prior to the occurrence of a fault. The resulting positive sequence voltage reference command signals may be stored in a conventional manner for use by the SRF controller 142 during a fault condition. Alternatively, under certain severe fault conditions, the positive sequence voltage reference command signals may be set by a compensation reference decision system 147 to optimize system performance under such conditions. The compensation reference decision system 147 will be discussed in more detail below.

It should be apparent that the difference between the positive sequence voltage reference command signals and the measured fundamental positive sequence component of the voltage compensator inverter terminal voltage corresponds to the change in the positive sequence voltage component caused by the occurrence of a remote system fault. Thus, the two-phase positive sequence inverter voltage command signals represent the positive sequence voltage that must be injected into the power transmission line 78 in order to restore the positive sequence voltage to pre-fault conditions.

The two-phase positive sequence inverter voltage command signals are combined with two-phase DC bus control inverter voltage command signals at summing junctions 178 and 180. Generation of the DC bus control inverter voltage command signals will be described in more detail below.

The two-phase positive sequence inverter voltage command signals are transformed from the two-phase synchronously rotating reference frame into three-phase positive sequence inverter voltage command signals by a positive sequence two-phase to three-phase synchronous frame transformation 182. The positive sequence two-phase to three-phase synchronous frame transformation device 182 may be implemented in a conventional manner to perform the two-phase to three-phase transformation described earlier with respect to FIG. 3. The positive sequence two-phase to three-phase reference frame transformation is accomplished at the fundamental frequency, and, therefore, requires sin θ and cos θ signal values that may be provided by the PLL 144 on the voltage compensator inverter terminal voltage $v_{fd}$, or other signal locked to the fundamental frequency, and the look-up table 146.

Figure 20A:
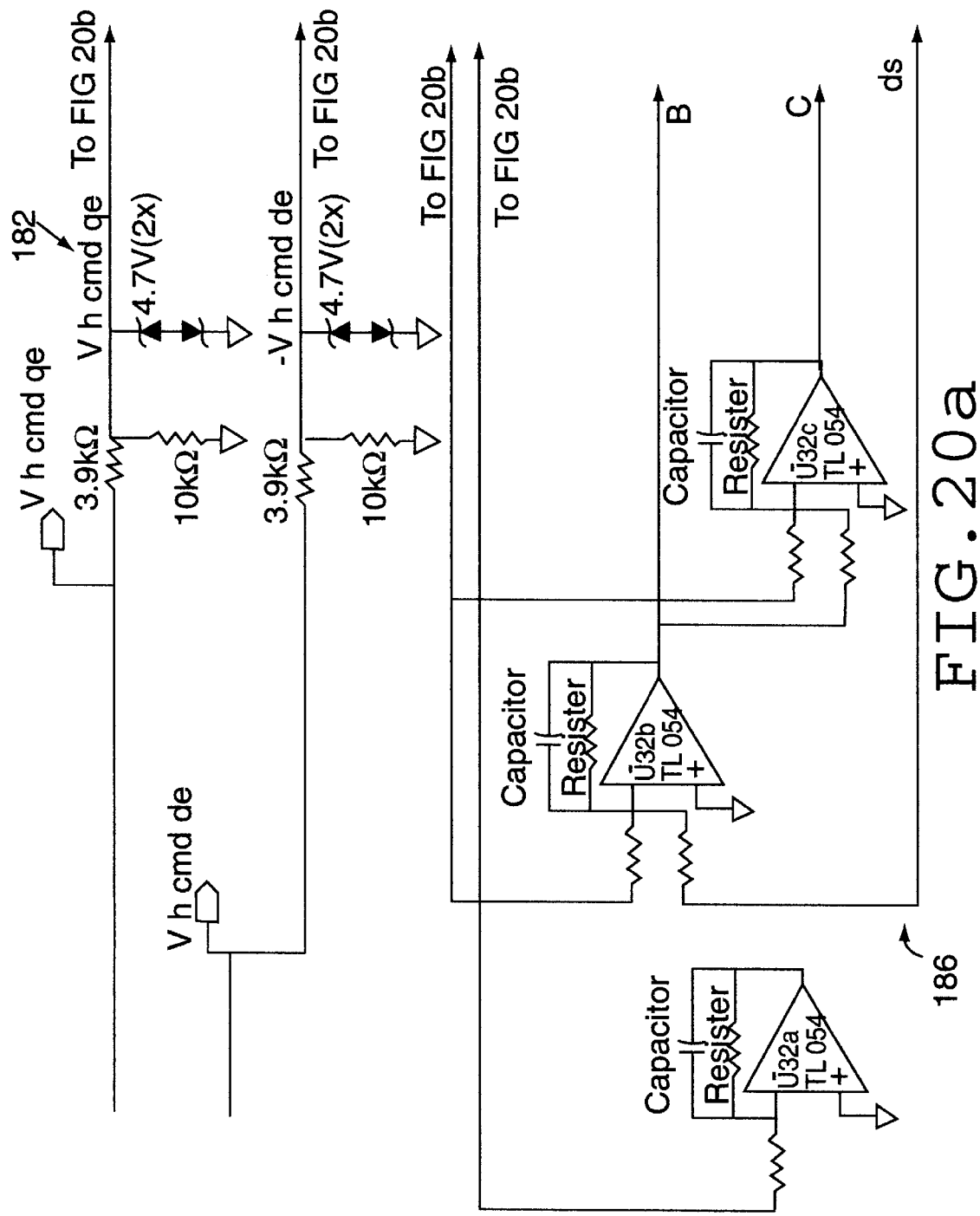
FIG. 20 is a schematic circuit diagram of a two-phase to three-phase synchronous reference frame transformation device that may be employed in the controller for the voltage compensator inverter of the present invention.
Figure 20B:
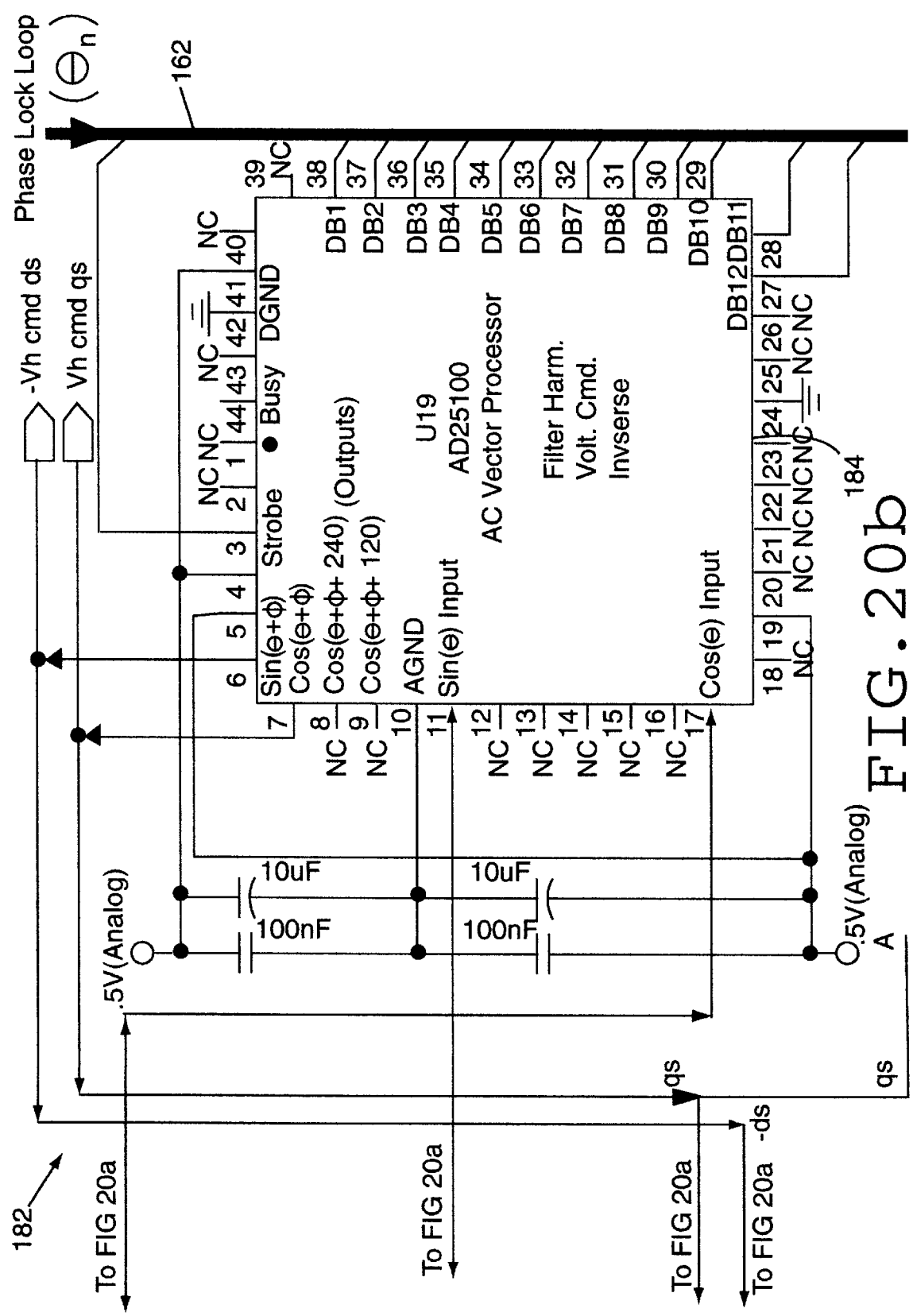

A schematic circuit diagram of an exemplary two-phase to three-phase transformation circuit 182 is illustrated in FIG. 20. An integrated circuit vector processor chip 184 performs the two-phase rotating to two-phase stationary transformation. The required multiplications by sin θ and cos θ, as required by Equation 4, are implemented in the circuit 184 by an internal look-up table addressed by the address signals on lines 162 from the PLL 144 corresponding to θ. The outputs of the vector processor 184, representing voltage values in the stationary two-phase reference frame, are applied to an amplifier circuit 186 that multiplies the stationary two-phase reference frame signal values by the constants required by Equation 5, to transform the two-phase signal values into three-phase signal values. Other analog or digital circuits, including digital signal processor circuits, may be used to implement the two-phase to three-phase transformation 182. It should also be noted that this exemplary two-phase to three-phase transformation circuit may be used, with slight modification, wherever use of a two-phase to three-phase transformation is called for in this specification.

The three-phase positive sequence inverter voltage command signals are combined with negative sequence inverter voltage command signals and zero sequence inverter voltage command signals at summing junctions 188, 190, and 192. Generation of the negative and zero sequence inverter voltage command signals will be described in more detail below. The combined inverter voltage command signals are provided to a switching control circuit 194. The switching control circuit 194 includes a modulator which generates inverter switching signals for switching devices in the voltage compensator inverter 94 from the inverter voltage command signals. The positive sequence inverter voltage command signal component of the combined inverter voltage command signal ensures that the compensator inverter switching devices will be controlled to synthesize a three-phase inverter voltage signal on the transmission lines 78 which will restore the positive sequence load voltage to the pre-fault condition.

Negative sequence inverter voltage command signals are used to control the voltage compensator inverter 94 to inject a voltage signal in series with the power transmission lines 78 which cancels any negative sequence voltage component caused by a remote fault in the utility system. The negative sequence inverter voltage command signals are also based on the three-phase voltage compensator inverter terminal voltages $v_{fda-c}$, which may be measured in a conventional manner. The measured voltage compensator inverter terminal voltage signals are applied to a negative sequence three-phase to two-phase synchronous reference frame transformation device 196. The negative sequence three-phase to two-phase transformation device 196 may be implemented in a conventional manner to transform the three-phase voltage compensator inverter terminal voltage values $v_{fda-c}$ into two-phase synchronously rotating negative sequence voltage compensator inverter terminal voltage signal values $v_{fdq,neg}$ and $v_{fdd,neg}$ in the manner described previously with respect to FIG. 1. The three-phase to two-phase synchronous reference frame transformation 196 employs sin (−θ) and cos (−θ) signal values, that may be generated by the PLL 144 on the measured compensator terminal voltage $v_{fd}$, and the look-up table 146, to perform the three-phase to two-phase transformation. The exemplary circuits previously illustrated in and described with reference to FIGS. 17 and 18 may, with appropriate modification, be used to perform the negative sequence three-phase to two-phase transformation 196.

In transforming the three-phase voltage compensator inverter terminal voltage signal values $v_{fda-c}$ into the negative sequence two-phase synchronously rotating voltage compensator inverter terminal voltage signal values $v_{fdq,neg}$ and $v_{fdd,neg}$, the fundamental negative sequence component of the voltage compensator inverter terminal voltage signal values is converted into a DC component of the two-phase voltage compensator inverter terminal voltage signal values $v_{fdq,neg}$ and $v_{fdd,neg}$. Thus, signals $/v_{fdq,neg}$ and $/v_{fdd,neg}$, corresponding to the fundamental negative sequence component of the voltage compensator inverter terminal voltage, may easily be extracted without any phase delay from the two-phase voltage compensator inverter terminal voltage signal values $v_{fdq,neg}$ and $v_{fdd,neg}$. Any method for extracting the DC component from a signal may be used. A fast DC component extraction method is preferred. Low-pass filters 198 and 200 may be used to extract the DC fundamental negative sequence component from the two-phase voltage compensator inverter terminal voltage values $v_{fdq,neg}$ and $v_{fdd,neg}$. As discussed previously, the low-pass filters 198 and 200 may be realized using various low-pass filter topologies, including maximally flat Butterworth low-pass filters, switched capacitor low-pass filters, or any other device for extracting the DC component from a signal.

The extracted DC signal component corresponds to the fundamental negative sequence component of the voltage compensator inverter terminal voltage, which is caused by a remote fault on the utility system. These signals thus also represent the amount of negative sequence voltage that must be canceled from the transmission lines 78 to restore the load voltage provided on the power transmission lines 78 to the pre-fault condition. Thus, the two-phase fundamental negative sequence voltage component signal values $/v_{fdq,neg}$ and $/v_{fdd,neg}$ also form the two-phase negative sequence inverter voltage command signals.

The two-phase negative sequence inverter voltage command signals are transformed from the two-phase synchronously rotating reference frame into three-phase negative sequence inverter voltage command signals by a negative sequence two-phase to three-phase synchronous frame transformation device 202. The negative sequence two-phase to three-phase synchronous frame transformation device 202 may be implemented in a conventional manner to perform the two-phase to three-phase transformation described earlier with respect to FIG. 3. The negative sequence two-phase to three-phase reference frame transformation requires sin (−θ) and cos (−θ) signal values that may be provided by the PLL 144 on the voltage compensator inverter terminal voltage $v_{fd}$, or any other signal locked to the fundamental frequency, and look-up table 146. The negative sequence two-phase to three-phase synchronous frame transformation 202 may be implemented in a conventional manner, such as by the exemplary two-phase to three-phase transformation circuit 182 illustrated in FIG. 20, modified appropriately to provide the negative sequence transformation.

A two-phase negative sequence current component for the negative sequence inverter voltage command signals may be combined with the negative sequence inverter voltage command signals derived from the voltage compensator inverter terminal voltage signal values $v_{fda-c}$, at summing junctions 204 and 206, before being provided to the negative sequence two-phase to three-phase synchronous frame transformation 202. This current based component of the negative sequence inverter voltage command signal is derived from the three-phase power transmission line current signal values $i_{d2a-c}$. The use of a negative sequence current component for the negative sequence inverter voltage command signals is optional. However, use of a negative sequence current component for the negative sequence inverter voltage command signals will cause the compensator inverter 94 to generate an inverter voltage signal on the transmission lines 78 which eliminates any negative sequence current component in the power line. This enhances the overall stability of the voltage restoration system 140.

The negative sequence current component of the negative sequence inverter voltage command signals is based on the three-phase power line currents $i_{d2a-c}$, which may be measured using a current transformer or other conventional current measuring device. The measured power line current signal values are applied to a negative sequence three-phase to two-phase synchronous reference frame transformation device 208. The negative sequence three-phase to two-phase transformation device 208 may be implemented in a conventional manner to transform the three-phase line current signal values $i_{d2a-c}$ into two-phase synchronously rotating line current signal values $i_{d2q,neg}$ and $i_{d2d,neg}$ in the manner described previously with respect to FIG. 1. The negative sequence three-phase to two-phase synchronous reference frame transformation 208 thus employs sin (–θ) and cos (–θ) signal values, that may be generated by the PLL 144 on the measured voltage compensator inverter terminal voltage $v_{fd}$, and the look-up table 146, to perform the three-phase to two-phase transformation. The three-phase to two-phase transformation circuit illustrated in FIG. 17, with appropriate modification, may be used for this purpose.

In transforming the three-phase line current signal values $i_{d2a-c}$ into the two-phase synchronously rotating line current signal values $i_{d2q,neg}$ and $i_{d2d,neg}$, the fundamental negative sequence component of the line current is converted into a DC component of the two-phase line current signal values $i_{d2q,neg}$ and $i_{d2d,neg}$. Thus, signals $/i_{d2qneg}$ and $/i_{d2d,neg}$, corresponding to the fundamental negative sequence component of the line current, may easily be extracted without any phase delay from the two-phase line current signal values $i_{d2q,neg}$ and $i_{d2d,neg}$. Any method for extracting the DC component from a signal may be used. A fast DC component extraction method is preferred. Low-pass filters 210 and 212 may be used to extract the DC component from the two-phase line current signals $i_{d2q,neg}$ and $i_{d2d,neg}$. The low-pass filters 210 and 212 may be realized using any circuit for extracting the DC component from a signal, such as maximally flat Butterworth low-pass filters, or switched capacitor low-pass filters, as described previously with respect to FIG. 19.

The extracted DC signal values corresponding to the fundamental negative sequence component of the line current are compared with negative sequence line current reference command signal values at junctions 214 and 216, to produce negative sequence line current error signals. Since the objective is to drive the negative sequence component of the line current to zero, the negative sequence line current reference command signal values preferably are set to zero. The negative sequence line current error signals, representing the difference between the negative sequence component of the measured line current and the desired negative sequence line current component, are applied to proportional-integral (PI) regulators 218 and 220. The PI regulators 218 and 220 may be implemented in a conventional manner. The output of the PI regulators 218 and 220 are the negative sequence current components $v_{invq,neg,i-loop}^{*}$ and $v_{invd,neg,i-loop}^{*}$ of the negative sequence inverter voltage command signals. The negative sequence current component of the negative sequence inverter voltage command signals are combined with the negative sequence voltage component of the negative sequence inverter voltage command signals, derived from the voltage compensator inverter terminal voltages $v_{fda-c}$, at summing junctions 204 and 206. The combined two-phase negative sequence inverter voltage command signals are transformed from the two-phase synchronously rotating reference frame into three-phase negative sequence inverter voltage command signals by the negative sequence two-phase to three-phase synchronous frame transformation 202, which may be implemented in a conventional manner, as described previously.

The resulting three-phase negative sequence inverter voltage command signals are combined with the positive sequence inverter voltage command signals at summing junctions 188, 190 and 192. The combined three-phase inverter voltage command signals are provided to the switching control system 194 which modulates the inverter voltage command signals to generate inverter switching signals for the voltage compensator inverter 94. The combined effect of the positive sequence inverter voltage command signals and negative sequence inverter voltage command signals is to control the voltage compensator inverter 94 to generate an inverter waveform in series with the power transmission lines 78 which restores the voltage provided to the load 89 to a balanced three-phase condition at pre-fault voltage levels.

As discussed previously, although the compensation voltages generated in response to the positive and negative sequence inverter voltage command signals restore the load voltage to pre-fault conditions, the real power associated with these compensation voltages may not be zero. Thus, there may be a net exchange of real power between the compensator inverter 94 and the power transmission lines 78. However, in accordance with the present invention, the compensator inverter 94 is also controlled to ensure that there is no net power flow between the compensator inverter 94 and the power transmission lines 78. As discussed previously, this is accomplished by rotating the restored load voltage vectors by a phase rotation angle φ, such that the magnitude of the load voltage vectors is maintained, while zero real power transfer between the voltage restoration system and the transmission lines 78 is assured. This phase rotation is implemented by DC bus control inverter voltage command signals generated in the SRF controller 142. Two command signals are used to generate the DC bus control inverter voltage command signals, a resistance command signal $R_{cmd}$, and an inductance command signal $L_{cmd}$. A proportional-integral (PI) closed loop control on the voltage $v_{dc}$ across the DC bus capacitor 98 is used to maintain $v_{dc}$ at a proper level. The required power flow to control $v_{dc}$ is developed by injecting a positive sequence voltage in phase with the positive sequence component of the power line current. The magnitude of the positive sequence voltage needed to maintain $v_{dc}$ at the proper level is determined by the resistance command signal value $R_{cmd}$, which is the output of the $v_{dc}$ control loop. The $v_{dc}$ control loop includes a summing junction 222 at which the measured DC bus capacitor voltage $v_{dc}$ is compared to a DC bus voltage reference command signal $v_{dc}*$, which is the desired DC bus capacitor voltage level. The DC bus voltage reference command signal may be set at a fixed default value, or may be adjusted by the compensation reference decision system 147 to optimize system performance under certain operating conditions, such as severe fault conditions. The compensation reference decision system 147 will be discussed in more detail below. The difference between the measured DC bus capacitor voltage $v_{dc}$ and the DC bus capacitor reference voltage $v_{dc}*$ is a DC bus capacitor voltage error signal which is provided to proportional-integral (PI) regulator 224. The output of the PI regulator 224 is the resistance command signal value $R_{cmd}$.

A DC bus control inverter voltage command signal based on the resistance command signal value $R_{cmd}$ alone might cause a decrease in the magnitude of the line current, because the injected voltage signal based on the resistance command signal value $R_{cmd}$ will have the same effect as a line resistance. In order to rebuild the power line current magnitude, another positive sequence voltage component which is in quadrature with the positive sequence power line current must be injected into the power transmission line 78 by the compensator inverter 94. This component of the injected inverter voltage signal has a similar effect to a negative impedance in the transmission line 78, i.e., it cancels actual line impedances to increase the line current magnitude. The magnitude of the quadrature voltage component necessary to restore the load voltage to the pre-fault level is defined by the inductance command signal value $L_{cmd}$.

The inductance command signal value $L_{cmd}$ is derived from the three-phase power line currents $i_{d2a-c}$, which may be measured using a current transformer or other conventional current measuring device. The measured line current signal values are applied to a positive sequence three-phase to two-phase synchronous reference frame transformation device 226. The positive sequence three-phase to two-phase transformation device 226 may be implemented in a conventional manner to transform the three-phase line current signal values $i_{d2a-c}$ into two-phase synchronously rotating line current signal values $i_{d2q,pos}$ and $i_{d2d,pos}$, at the fundamental frequency. The positive sequence three-phase to two-phase synchronous reference frame transformation 226 thus employs sin θ and cos θ signal values, that may be generated by the PLL 144 on the measured voltage compensator inverter terminal voltage $V_{fd}$, and the look-up table 146, to perform the three-phase to two-phase transformation. A three-phase to two-phase transformation circuit similar to that previously illustrated and described with respect to FIG. 17 may be used to perform the positive sequence three-phase to two-phase synchronous frame transformation 226 of the three-phase line current signal values.

In transforming the three-phase line current signal values $i_{d2a-c}$ into the two-phase synchronously rotating line current signal values $i_{d2q,pos}$ and $i_{d2d,pos}$, at the fundamental frequency, the fundamental positive sequence component of the measured line current signal values is converted into a DC component of the two-phase line current signal values $i_{d2q,pos}$ and $i_{d2d,pos}$. Thus, signals $/i_{d2q,pos}$ and $/i_{d2d,pos}$, corresponding to the fundamental positive sequence current component of the line current, may be easily extracted without any phase delay from the two-phase line current signal values $i_{d2q,pos}$ and $i_{d2d,pos}$. Any method for extracting the DC component from a signal may be used. A fast DC component extraction method is preferred. Low-pass filters 228 and 230 may be used to extract the DC component from the two-phase line current signal values $i_{d2q,pos}$ and $i_{d2d,pos}$. The low-pass filters 228 and 230 may be realized using any conventional circuit for extracting the DC component from a signal, such as maximally flat Butterworth low-pass filters, or switched capacitor low-pass filters, as described previously.

The magnitude of the positive sequence component of the line current $\|i_{d2,pos}\|$ can be calculated from the fundamental positive sequence component line current signal values $/i_{d2q,pos}$ and $/i_{d2d,pos}$ as follows:

$$\|i_{d2d,pos}\| = \sqrt{/i^2_{d2q,pos} + /i^2_{d2d,pos}} \quad . \tag{30}$$

Equation 30 is implemented in the SRF controller 142 by squaring the signals $/i_{d2q,pos}$ and $/i_{d2d,pos}$ at 232 and 234, adding the resulting squared signal values together at summing junction 236, and taking the square root of the resulting sum at 238. The squaring 232 and 234, summing 236, and square root 238 functions may be implemented in a conventional manner using analog or digital circuitry, including the use of commercially available integrated circuit components to perform the squaring and square root functions.

The resulting magnitude of the positive sequence line current $\|i_{d2,pos}\|$ is compared to a positive sequence line current magnitude reference command signal value $\|i_{d2,pos}\|*$ at junction 240. The positive sequence line current magnitude reference command signal value $\|i_{d2,pos}\|*$ is the desired magnitude of the positive sequence component of the line current, and is preferably set to the pre-fault magnitude of the positive sequence component of the line current. Alternatively, the positive sequence line current magnitude reference command signal value may be set by the compensation reference decision system 147, based on required system information, to optimize system performance under certain operating conditions, such as severe fault conditions. The compensation reference decision system 147 will be discussed in more detail below. The difference between the magnitude of the positive sequence line current $\|i_{d2,pos}\|$ and the positive sequence line current magnitude reference command signal value $\|i_{d2,pos}\|*$ is a positive sequence line current magnitude error signal value, which is provided to a proportional-integral regulator 242. The PI regulator 242 may be implemented in a conventional manner. The output of the PI regulator 242 is the inductance command signal $L_{cmd}$, which defines the magnitude of the component of the voltage compensator inverter voltage which will be injected in quadrature with the line current.

The DC bus control inverter voltage command signals are generated in the two-phase reference frame from the resistance command $R_{cmd}$ and inductance command $L_{cmd}$ signal values and the fundamental positive sequence components of the line current $/i_{d2q,pos}$ and $/i_{d2d,pos}$, by an active impedance synthesizer 244. The active impedance synthesizer 244 implements the following two equations to generate the DC bus control inverter voltage command signals $V_{invq,pos,i-loop}*$ and $V_{invd,pos,i-loop}*$ in the two-phase reference frame:

$$v_{invq,pos,i-loop}* = /i_{d2q,pos}R_{cmd} + i_{d2d,pos}\omega_e L_{cmd}, \tag{31}$$

and $$v_{invd,pos,i-loop}* = /i_{d2d,pos}R_{cmd} - i_{d2q,pos}\omega_e L_{cmd}, \tag{32}$$

where $\omega_e$ is the fundamental frequency. Equations 31 and 32 may be implemented in the active impedance synthesizer 244 in any conventional manner.

The two-phase DC bus control inverter voltage command signals provided by the active impedance synthesizer 244 are combined with the two-phase positive sequence inverter voltage command signals at the summing junctions 178 and 180 before being transformed into three-phase inverter voltage command signals by the positive sequence two-phase to three-phase synchronous frame transformation device 182. The effect of the DC bus control inverter voltage command signals is to generate control signals which control the voltage compensator inverter 94 to generate inverter voltage signals which will rotate the restored load voltage vectors from the pre-fault location, by a phase rotation angle φ, to a new location where zero real power flow in the voltage restoration system 140 is achieved.

The combined effect of the positive sequence, negative sequence, and DC bus control inverter voltage command signals is to control the compensator inverter 94 to inject an inverter voltage signal in series with the power transmission line 78 which both restores the pre-fault load voltage to a balanced three-phase condition at the pre-fault voltage level and which ensures zero real power transfer between the compensator inverter 94 and the power transmission line 78. However, as discussed previously, a remote utility system fault may cause a zero sequence component to exist in the system. For some loads, such as delta connected loads, there is no need to eliminate the zero sequence caused by the fault. However, for other loads, the zero sequence component, which is common to each of the phases, must be eliminated. The compensator inverter 94 is controlled by the SRF controller 142 using zero sequence inverter voltage command signals to cancel the zero sequence component.

As discussed previously, the zero sequence component of the voltage compensator terminal voltage is one-third of the sum of the individual three-phase voltage compensator inverter terminal voltages $V_{fda-c}$. This same amount of zero sequence voltage must, therefore, be injected into the power transmission line 78 by the voltage compensator inverter 94 to cancel the zero sequence voltage caused by the fault. Thus, the zero sequence inverter voltage command signal $V_{inv,zero,v-loop}*$ may be generated by adding the voltage compensator inverter terminal voltage signals $V_{fda-c}$ together at summing junction 246, and then dividing the resulting sum by three at 248. The zero sequence inverter voltage command signal $V_{inv,zero,v-loop}*$ is then combined with the positive sequence and negative sequence inverter voltage command signals at summing junctions 188, 190, and 192, before being applied to the voltage compensator inverter switching control system 194.

To enhance system stability, the zero sequence inverter voltage command signal may include a zero sequence current component derived from the measured line currents $i_{d2a-c}$. The zero sequence current component of the zero sequence inverter voltage command signal is used to generate a compensator inverter voltage signal which cancels the zero sequence component in the line current. The measured line currents $i_{d2a-c}$ are added together at summing junction 250. The sum of the line currents is divided by three at 252. The sum of the line currents $i_{d2a-c}$ divided by three represents the zero sequence component $i_{d2,zero}$ in the line current. A stationary to rotating reference frame transformation process is applied to the zero sequence component in the line current $i_{d2,zero}$ in a particular way to obtain the projection of the zero sequence line current component in the two-phase reference frame. The zero sequence component of the line current $i_{d2,zero}$ is transformed by a stationary to rotating reference frame transformation device 254 which implements the following function:

$$\begin{bmatrix} i_{d2q,zero} \\ i_{d2d,zero} \end{bmatrix} = \begin{bmatrix} \cos\theta & -\sin\theta \\ \sin\theta & \cos\theta \end{bmatrix} \begin{bmatrix} i_{d2,zero} \\ 0 \end{bmatrix}. \quad (33)$$

In transforming the zero sequence line current component signal $i_{d2,zero}$ into the rotating signal values $i_{d2q,zero}$ and $i_{d2d,zero}$, the zero sequence component of the line current is converted into a DC component of the signal values $i_{d2q,zero}$ and $i_{d2d,zero}$. Thus, signals /$i_{d2q,zero}$ and /$i_{d2d,zero}$, corresponding to the zero sequence component of the line current, may easily be extracted without any phase delay from the two-phase zero sequence line current signal values $i_{d2q,zero}$ and $i_{d2d,zero}$. Any method for extracting the DC component from a signal may be used. A fast DC component extraction method is preferred. Low-pass filters 256 and 258 may be used to extract the DC component from the zero sequence line current signals $i_{d2q,zero}$ and $i_{d2d,zero}$. The low-pass filters 256 and 258 may be implemented using any circuit for extracting the DC component from a signal, such as a maximally flat Butterworth low-pass filter, or a switched capacitor low-pass filter, as described previously.

The extracted DC signal values corresponding to the zero sequence component of the line current are multiplied by two at 259, to obtain the correct magnitude of the zero sequence signal, and are compared with zero sequence line current reference command signal values at junctions 260 and 262, to produce zero sequence line current error signals. Since the objective is to drive the zero sequence component of the line current to zero, the zero sequence line current reference command signal values preferably are both set to zero. The zero sequence line current error signals, representing the difference between the measured zero sequence line current and the desired zero sequence line current, are applied to proportional-integral (PI) regulator 264 and 266. The PI regulators 264 and 266 may be implemented in a conventional manner. The output of the PI regulators 264 and 266 are transformed by a rotating to stationary reference frame transformation device 268. The q-axis output of the rotating to stationary transformation 268 forms the current component $V_{inv,zero,i-loop}*$ of the zero sequence inverter voltage command signal. The current component $V_{inv,zero,i-loop}*$ of the zero sequence inverter voltage command signal is added to the voltage component $V_{inv,zero,i-loop}*$ of the zero sequence inverter voltage command signal, derived from the measured voltage compensator inverter terminal voltages $V_{fda-c}$, at junction 272 to form the combined zero sequence inverter voltage command signal. The combined zero sequence inverter voltage command signal is combined with each phase of the positive and negative sequence inverter voltage command signals at the junctions 188, 190, and 192, before being provided to the inverter switching control system 194.

The three-phase inverter voltage command signals provided to the inverter switching control device 194 are modulated to generate inverter switching signals for switching devices in the voltage compensator inverter 94. Any conventional modulation technique, such as pulse width modulation (PWM), may be employed by the inverter switching control system 194 to convert the inverter voltage command signals into the inverter switching signals. The modulation technique which is employed may depend, of course, on the type of inverter that is used to implement the voltage compensator inverter 94.

In general, any conventional voltage source inverter topology may be used to implement the voltage compensator inverter 94. However, if zero sequence voltage/current cancellation is provided, the inverter topology which is used must be capable of providing the zero sequence output. Conventional three-phase inverter topologies are not capable of providing a zero sequence voltage.

Figure 21:
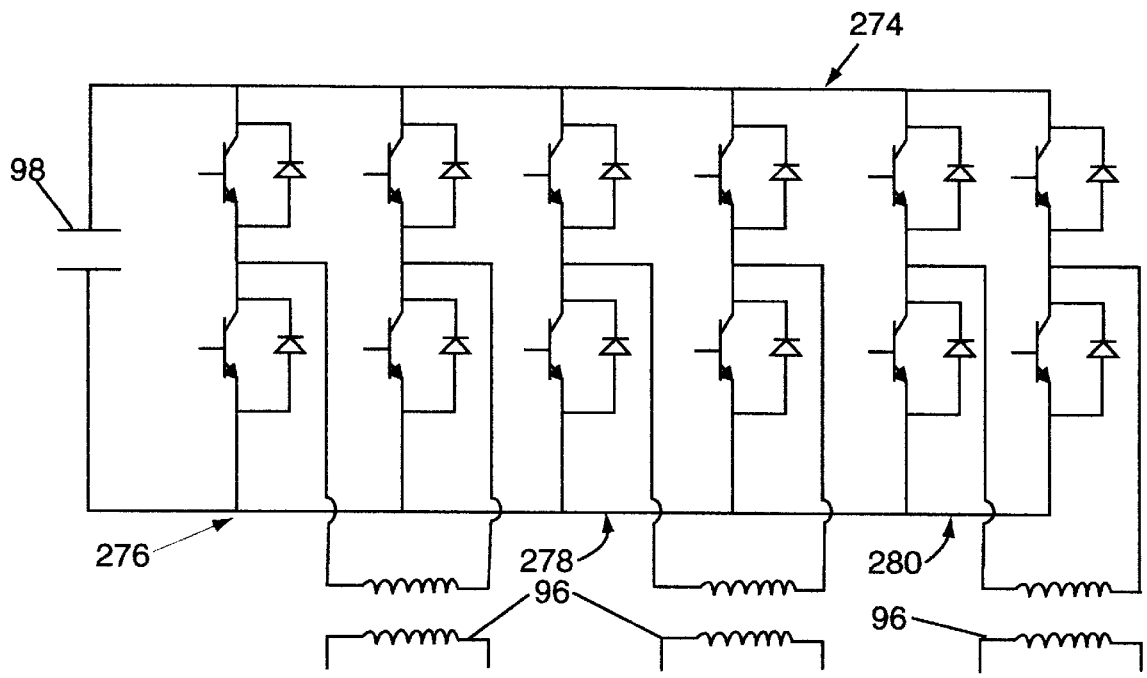
FIG. 21 is a schematic circuit diagram of three single-phase inverters connected across a common DC bus which may be used to implement the three-phase voltage compensator inverter of the present invention.
Figure 22:
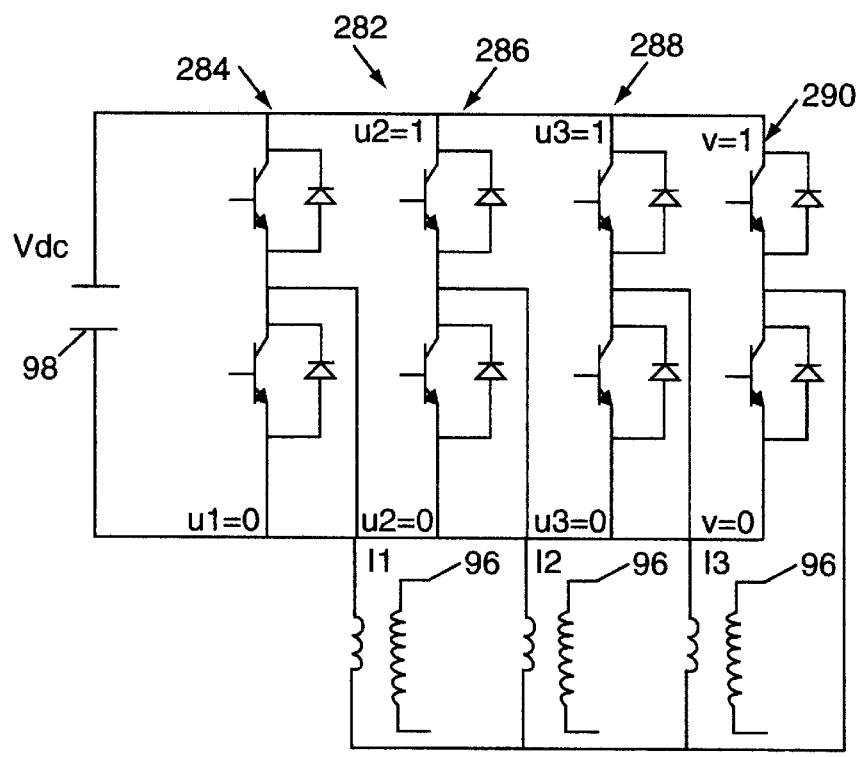
FIG. 22 is a schematic circuit diagram of a four-leg three-phase inverter which may be used to implement the voltage compensator inverter of the present invention.

Exemplary inverter topologies which may be used to implement the voltage compensator inverter 94, and which are capable of providing zero sequence voltages, are illustrated in FIGS. 21 and 22. The inverter 274 illustrated in FIG. 21 is a three-phase inverter which is implemented using three single phase inverters 276, 278 and 280, connected in parallel across the common DC bus capacitor 98. Each inverter 276, 278, and 280 includes inverter switching devices which may be controlled to connect the DC bus capacitor 98 across one winding of the multi-phase transformer 96 which is used to connect the voltage compensator inverter 94 in series with the power transmission lines 78. The switching devices in the inverter 274 may be controlled in a conventional manner, using conventional modulation techniques, to provide the inverter voltage signals on the transmission line 78 as defined by the inverter voltage command signals provided by the SRF controller 142.

A four-leg three-phase inverter 282 is illustrated in FIG. 22. This inverter topology 282 includes four series connected pair 284, 286, 288, and 290 of inverter switching devices connected across the DC bus capacitor 98. The switching devices in the four inverter legs 284, 286, 288, and 290 are controlled to apply the voltage across the DC bus capacitor 98 to the windings of the three-phase transformer 96, which is used to connect the inverter 282 in series with the power transmission line 78, to inject the desired inverter voltage signal in series with the transmission line 78. In this case, the fourth inverter leg 290 is used to control the neutral voltage level of the transformer 96.

Either hard or soft switched inverters may be used to implement the voltage compensator inverter. More information on the construction and control of soft switched inverters will be found in U.S. Pat. No. 4,864,483, to Deepakraj M. Divan, the disclosure of which is incorporated herein by reference.

The simplified power distribution system illustrated in FIG. 6 was simulated, using the voltage and impedance parameters presented earlier, to demonstrate the operation and effectiveness of a dynamic voltage restoration system in accordance with the present invention. Simulation results are illustrated in FIGS. 23–27. In each of the waveforms illustrated in FIGS. 23–27, a single line-to-line ground fault 96 in a first feeder 76 of the power distribution system 74 is assumed to occur at time t=0.2. At time t=0.3, the dynamic series voltage restoration system of the present invention is activated. For real-world applications of a dynamic series voltage restoration system in accordance with the present invention, the voltage compensator 94 will begin to provide voltage compensation immediately following the occurrence of the remote utility system fault. However, in the simulation discussed below, turn-on of the voltage restoration system was delayed by several cycles following the occurrence of the remote utility system fault in order better to illustrate the effectiveness of the voltage restoration system in restoring load voltage and current levels to pre-fault levels.

Figure 23:
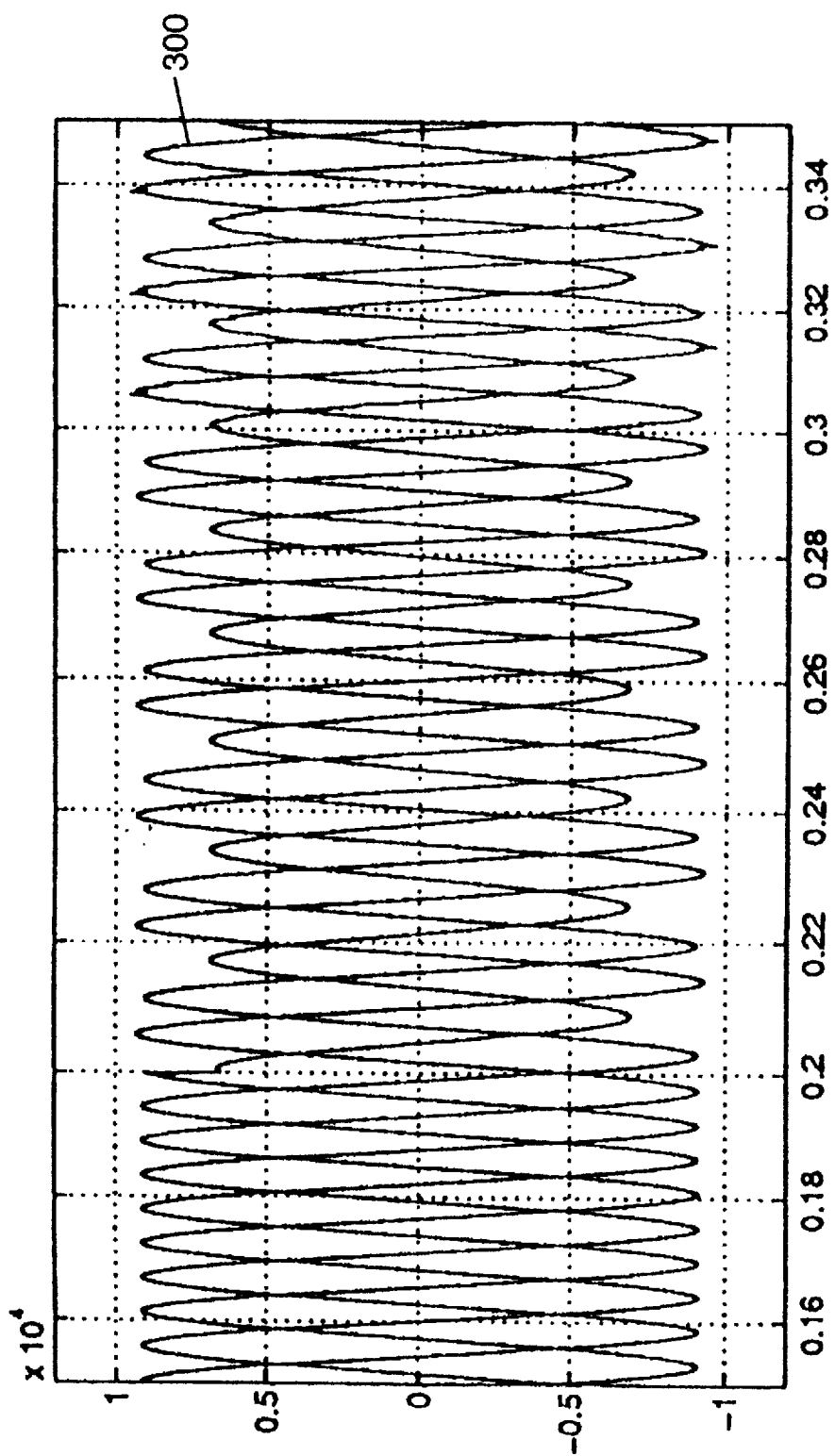
FIGS. 23–25 are waveform diagrams illustrating simulated voltage compensator inverter terminal voltage, load voltage, and power transmission line current, respectively, for pre-fault, single line-to-ground fault, and post voltage restoration time periods.

FIG. 23 is a simulated waveform 300 illustrating the three-phase voltage compensator inverter terminal voltages $V_{fda,b,c}$ for pre-fault and post fault time periods. At time t=0.2, the remote utility system single line-to-ground fault in the first power distribution system feeder 76 causes an effect on the voltage provided on the second power distribution system feeder 78. In particular, there is a noticeable drop in the magnitude of one of the voltage compensator terminal phase voltages beginning at time t=0.2, when the remote system fault occurs. Note that this voltage sag condition at the voltage compensator inverter terminal continues after the dynamic series voltage restoration system is turned on at time t=0.3. This is because the dynamic series voltage restoration system of the present invention injects a voltage into the power distribution system power transmission line 78 after the point at which the voltage compensator inverter terminal voltage is measured. Thus, the injected compensation voltage is not reflected in the voltage compensator inverter terminal voltage.

Figure 24:
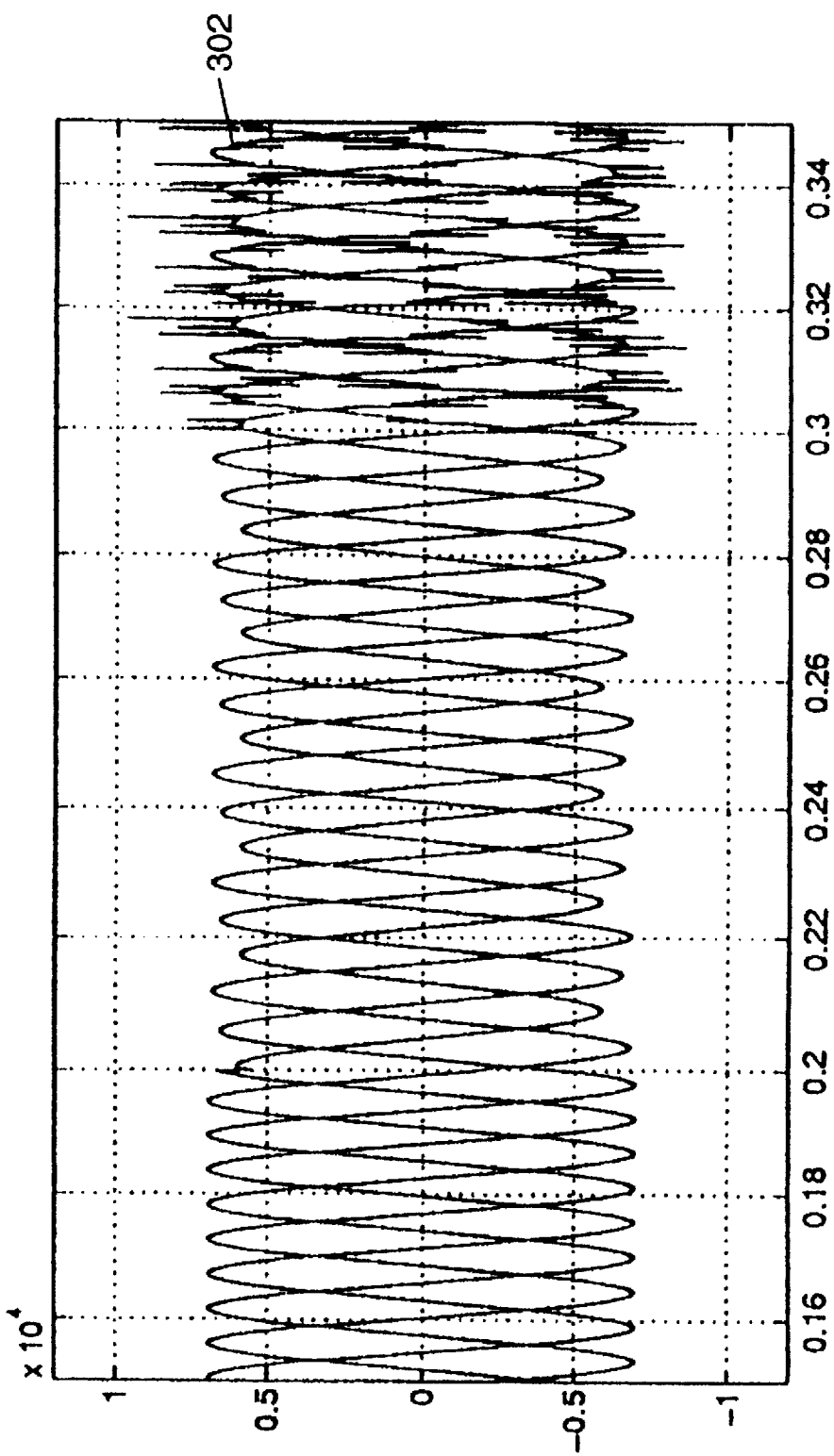

The waveform 302 illustrated in FIG. 24 is the simulated three-phase load voltage provided to the load 89 on the second feeder power transmission lines 78. Once again, a noticeable voltage sag in one of the phases of the load voltage occurs at time t=0.2, when the remote single line-to-ground fault occurs on the utility system. At time t=0.3, however, the dynamic voltage restoration system of the present invention is activated, and a balanced three-phase condition at the pre-fault voltage level is restored. The high frequency spikes which appear on the load voltage signal following the turn-on of the dynamic series voltage restoration system are caused by the high frequency switching of the switching devices in the voltage compensator inverter.

Figure 25:
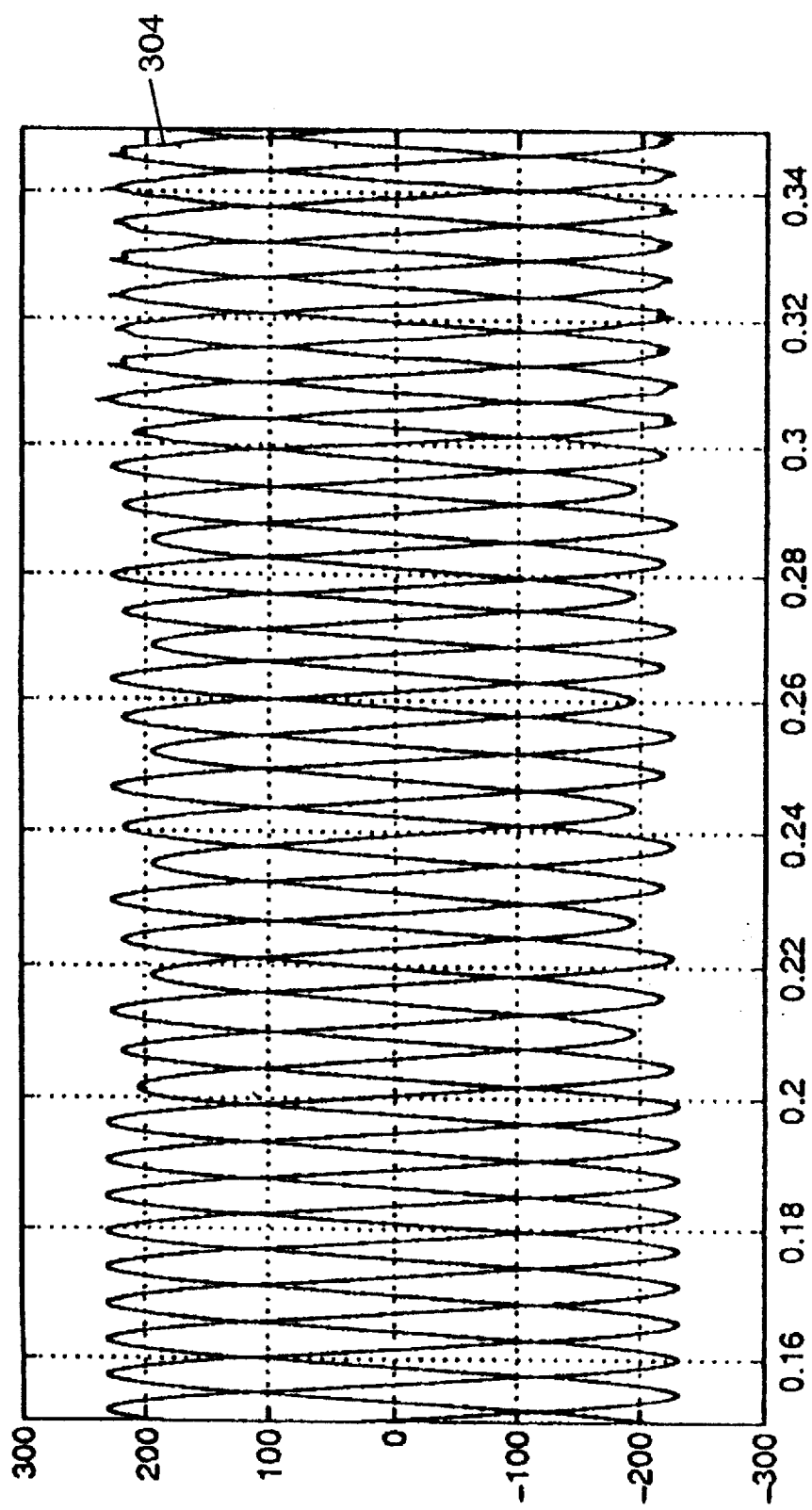

The waveform 304 illustrated in FIG. 25 is the simulated three-phase line current $i_{d2a,b,c}$. At time t=0.2 the occurrence of the single line-to-ground fault at a remote location on the utility system causes the line current to sag. At time t=0.3, the voltage restoration system of the present invention is turned on, and a voltage signal is injected in series with the power transmission line 78 which restores the three-phase line current to a balanced three-phase condition at the pre-fault level.

Figure 26:
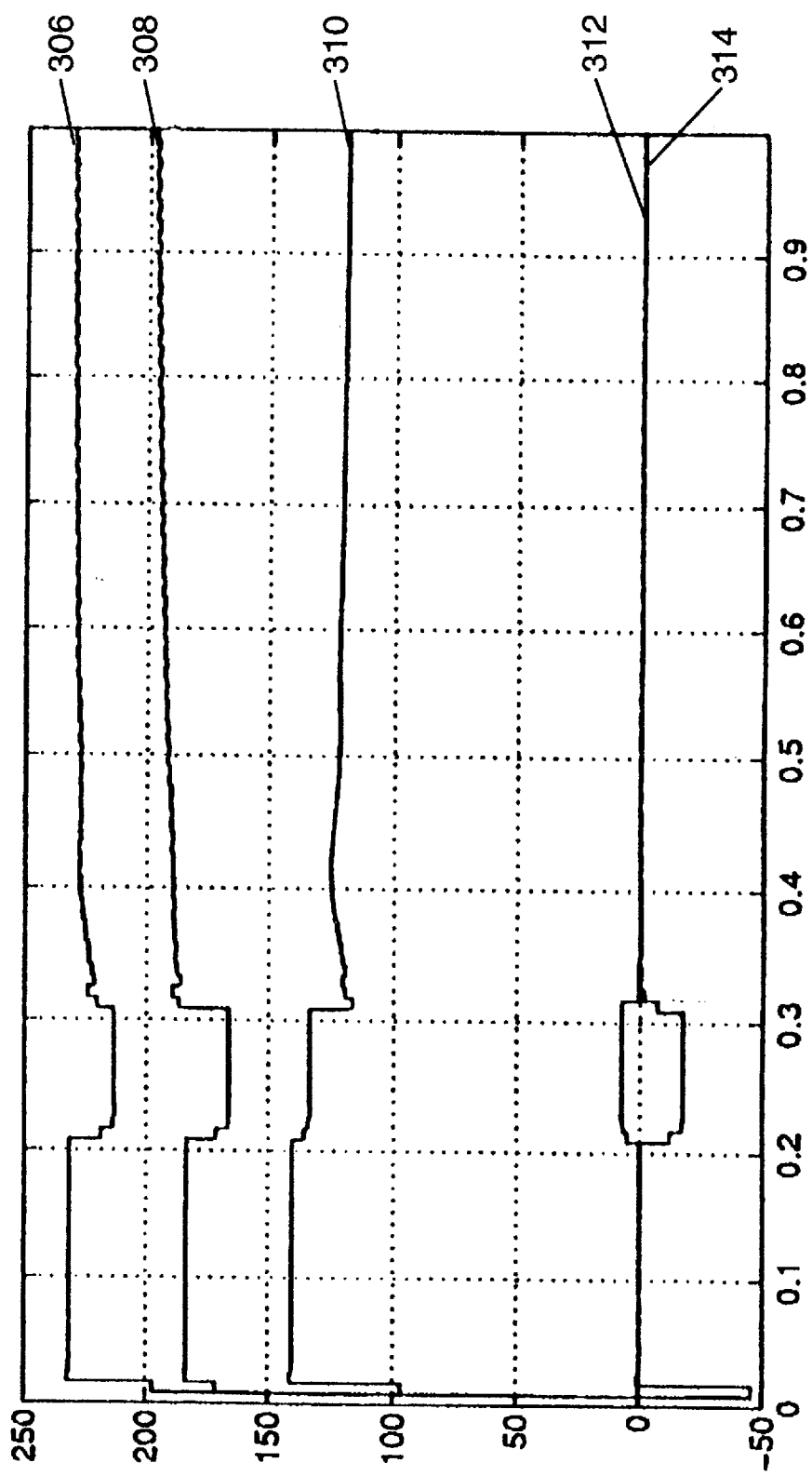
FIG. 26 is a diagram illustrating simulated positive and negative sequence components of the power line current in the two-phase d-q reference frame and the positive sequence line current component magnitude for pre-fault, single line-to-ground fault, and post voltage restoration time periods.

Simulated positive and negative sequence components of the line current in the d-q reference frame, and the magnitude of the simulated positive sequence line current, are illustrated in FIG. 26. The magnitude of the simulated positive sequence line current is illustrated at 306. The d-axis component of the simulated positive sequence line current in the d-q reference frame is illustrated at 308. The q-axis component of the simulated positive sequence line current in the d-q reference frame is illustrated at 310. The d-axis component of the simulated negative sequence component of the line current in the d-q reference frame is illustrated at 312, and the q-axis component of the simulated negative sequence component of the line current in the two-phase d-q reference frame is illustrated at 314.

Prior to the occurrence of a fault at time t=0.2, there is no negative sequence component of the line current. At time t=0.2, the remote single line-to-ground fault causes a negative sequence component to be introduced into the line current, and causes the magnitude of the positive sequence component of the line current 306 to drop. This drop in the magnitude of the positive sequence component of the line current 306 is reflected in changes in the d and q axis components 308 and 310 of the positive sequence component of the line current. Soon after the dynamic series voltage restoration system of the present invention is turned on at time t=0.3, the negative sequence component of the line current is, once again, regulated to zero. The compensator inverter voltage signal injected into the transmission line 78 also brings the magnitude of the positive sequence component of the line current 306 back to the pre-fault level. Note, however, that the d and q axis components 308 and 310 of the positive sequence component of the line current are not returned to their pre-fault levels. This is due to the fact that the injected inverter voltage signal provided by the compensator inverter 94 of the present invention causes a rotation in the load voltage vectors, by a phase rotation angle φ, so that there is no exchange of real power between the compensator inverter 94 and the power transmission line 78. This phase rotation is reflected as a change in the d and q axis components of the positive sequence component of the line current from the pre-fault condition.

Figure 27:
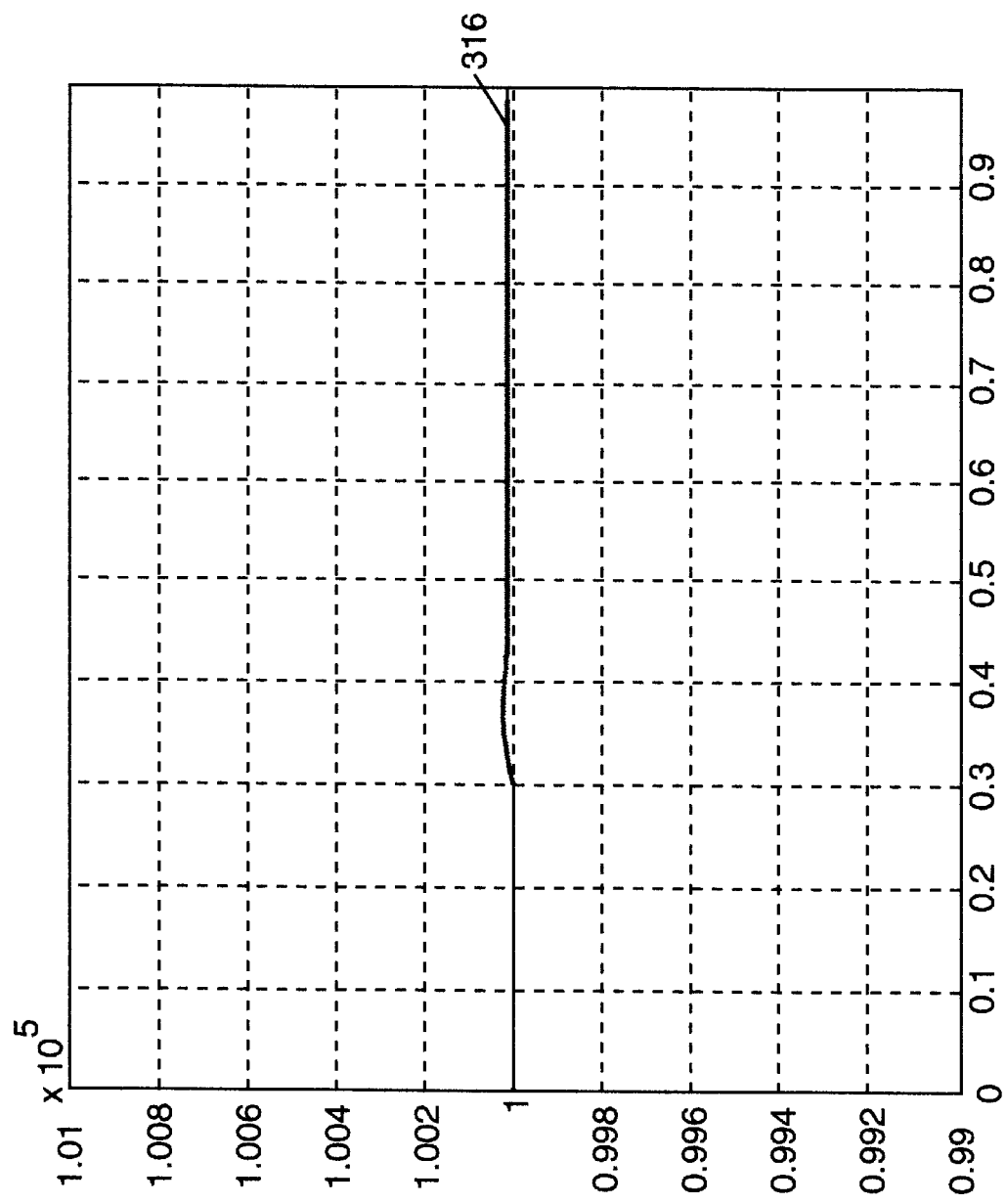
FIG. 27 is a waveform diagram illustrating simulated DC bus capacitor voltage for a voltage compensator inverter in accordance with the present invention for a pre-fault period and for a post-fault period wherein the voltage compensator inverter is controlled to provide voltage restoration.

FIG. 27 illustrates at 316 the simulated voltage $V_{dc}$ across the DC bus capacitor 98. Note that after the voltage restoration system of the present invention is activated at time t=0.3, the DC bus capacitor voltage is regulated to within less than 1% deviation from the DC bus capacitor voltage before the voltage restoration system was activated. Thus, it is apparent that the dynamic series voltage restoration system of the present invention is capable of providing compensation for voltage sags caused by remote utility system faults, while ensuring that there is no real power flow associated with the voltage compensation.

Figure 28:
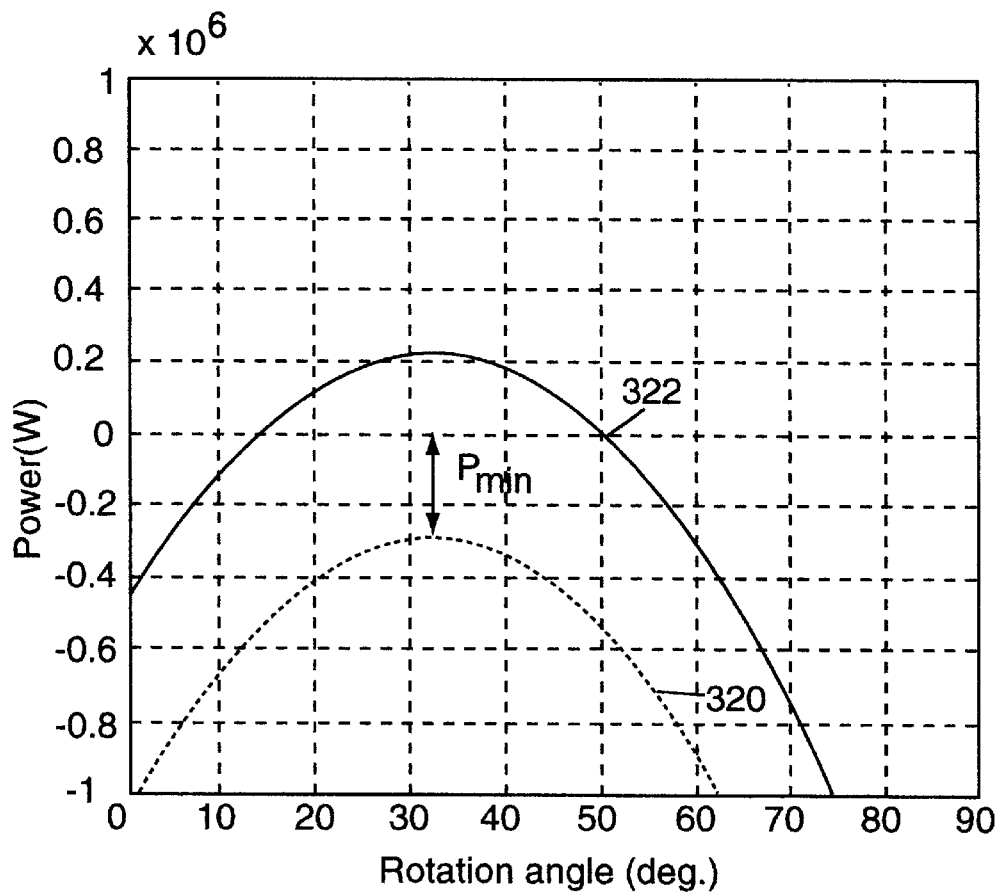
FIG. 28 is a graph of real power as a function of phase rotation angle φ for 100% and 90% voltage restoration in accordance with the present invention under a severe fault condition.

The operating range of a dynamic series voltage restoration system in accordance with the present invention is dependent on the severity of the fault for which the system is to provide voltage compensation. For example, for a very severe fault, such as a single line-to-ground fault which is very close to the common bus, the voltage sag on the transmission line to be compensated by a voltage restoration system in accordance with the present invention may be so severe that insufficient power is available from the utility power line to both restore the load voltage to a balanced three-phase condition at the pre-fault voltage level, and to ensure zero real power flow between the voltage restoration system and the power transmission line. For example, FIG. 28 illustrates the plot 320 of real power flow versus phase rotation angle φ for the simulated power distribution and voltage restoration system of the present invention described previously under severe voltage sag conditions caused by a single line-to-ground fault which is very close to the common bus. As can be seen, the curve 320 does not have any intersection with zero, so a solution for voltage restoration to a balanced three-phase condition at pre-fault voltage levels with zero real power transfer in the compensator does not exist. But from the curve 320, the minimum power $P_{min}$ required for 100% voltage restoration under the extreme fault condition can be found by measuring the shortest distance between zero and the curve 320. This is important in determining the size of the DC bus capacitor energy storage device 98 and the rating of the power electronic devices in the voltage compensator inverter 94. From curve 320, it is apparent that under extreme fault conditions there will be a net real power flow from the compensator 94 to the transmission line 78. Thus, the duration for which voltage restoration can be provided is limited by the energy stored in the DC bus capacitor 98. To increase the duration for which voltage restoration can be provided under such extreme conditions, the energy storage capability of the DC bus capacitor must be increased. This may be accomplished, for example, by using a larger DC bus capacitor, or by replacing the DC bus capacitor 98 with a battery or superconducting energy storage device. However, such a solution will add to the cost, weight, and complexity of the voltage restoration system.

Another solution to the problem caused by an extreme voltage sag condition is to adjust the level of voltage compensation provided by the voltage restoration system in order to avoid discharging the compensator DC bus capacitor 98. A curve showing real power flow in the compensator versus the phase rotation angle φ of the positive sequence load voltage vector, under the same severe fault condition previously described, but where the dynamic voltage restoration system is tuned down to provide restoration of the load voltage to 90% of the pre-fault load voltage level, is illustrated at 322 in FIG. 28. It is apparent from curve 322 that, at this tuned-down voltage compensation level, a phase angle solution for zero real power flow between the compensator and the transmission line can be found. Thus, if the load for which voltage compensation is provided by a voltage restoration system in accordance with the present invention is able to operate at less than 100% of the pre-fault voltage level, the voltage restoration system of the present invention can be operated indefinitely to provide compensation at the reduced load voltage level for as long as the severe fault condition exists.

Figure 29:
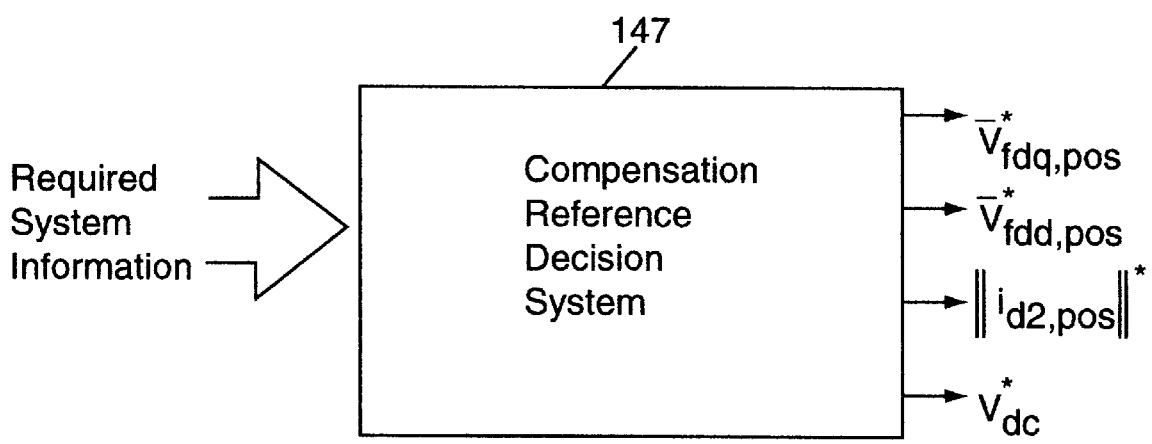
FIG. 29 is a block diagram of a compensation reference decision system for a dynamic voltage restoration system in accordance with the present invention.

As illustrated in FIG. 29, the compensation reference decision system 147 may be used to make the proper adjustment in the compensation level in response to severe fault conditions. Compensation level adjustment is accomplished by adjusting the inverter voltage command signals, which, in turn, is accomplished by adjusting the positive sequence voltage compensator inverter terminal voltage reference command signals /$V_{fdq,pos}$* and /$V_{fdd,pos}$*, the positive sequence power line current magnitude reference command signal $\|i_{d2,pos}\|$*, and the DC bus voltage reference command signal $V_{dc}$* employed in the SRF controller 142, as described previously. The compensation reference decision system 147 may be used to adjust these reference command signal parameters such that the compensator inverter 94 operates at or near the minimum power level $P_{min}$ required for 100% voltage restoration under extreme fault conditions. Alternatively, the compensation reference decision system may tune-down voltage compensation to a level less than 100%, to achieve zero real power flow under the extreme fault condition. In essence, the compensation reference decision system 147 adjusts the reference command signal values to achieve the desired level of real power flow from the compensator under various operating conditions.

The compensator inverter DC side current $i_{dc}$ and the DC capacitor voltage $V_{dc}$ may be measured to calculate the real power flow $P_{inv}$ of the voltage compensator inverter 94. If the zero power flow solution exists, the real power flow $P_{inv}$ of the compensator inverter 94 should reach zero and stay at that point. If the real power flow $P_{inv}$ of the voltage compensator inverter has climbed over the peak of the compensator power curve, which means there is no zero power solution, then the compensation level should be tuned down.

Figure 30:
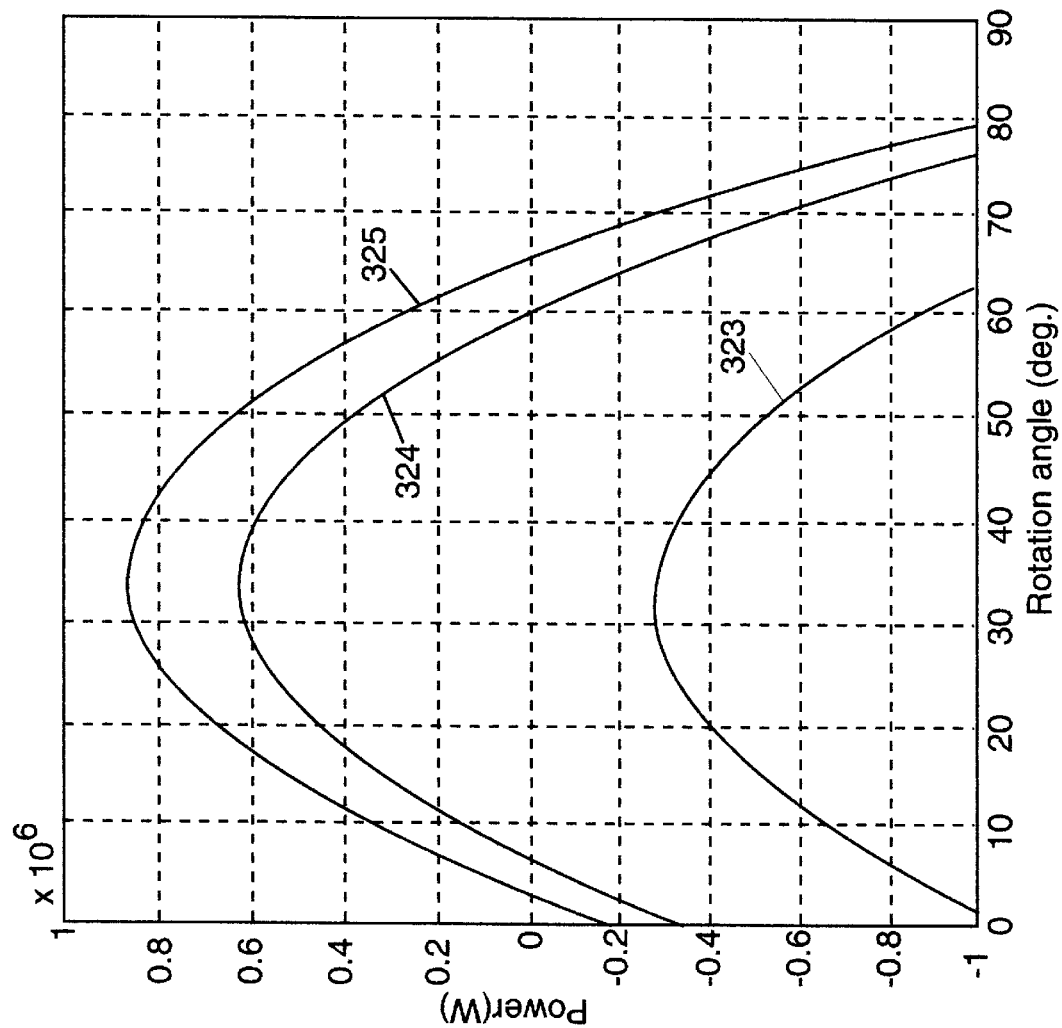
FIG. 30 is a graph of real power as a function of phase rotation angle φ for 100% voltage restoration in accordance with the present invention under fault conditions of various severity.

The decision to tune down the voltage compensation level may, for example, be implemented in the compensation reference decision system 147 by setting a limit on the phase rotation angle φ. FIG. 30 shows simulated curves for real power flow in the compensator versus the phase rotation angle φ for 100% voltage restoration for fault conditions of various severity. Curve 323 shows the real power flow versus phase rotation angle φ for a severe fault condition, caused by a remote single line-to-ground fault near the common bus. Curve 324 shows the real power flow versus phase rotation angle φ for a fault condition caused by a remote single line-to-ground fault at the midpoint of a feeder. Curve 325 shows the real power flow versus phase rotation angle φ for a relatively low fault condition, caused by a remote single line-to-ground fault near the far end of a feeder. As can be seen, for the simplified model simulated, the peak point of all three curves 323–325 occurs in the range of φ=30°–35°. For the severe fault condition, no phase rotation angle exists for which zero real power flow can be achieved at 100% voltage restoration. (Curve 323 never reaches zero power.) For the other two fault conditions, however, a zero real power flow condition at 100% voltage restoration can be achieved. For each curve 324 and 325, the zero real power flow solution occurs well below a selected phase rotation angle, e.g., $\phi=25°$. Thus, the compensation reference decision system 147 may set a maximum phase rotation angle $\phi_{max}=25°$. If the rotation reaches $\phi_{max}$, and has not converged yet, then the compensation reference decision system 147 may assume that no zero power flow solution exists, and may thus adjust the reference command signals used in the SRF controller 142 to tune down the voltage compensation level. At a tuned down voltage restoration level, a zero power flow condition may be achieved, thereby avoiding discharging of the DC bus capacitor 98.

The selection of the maximum phase rotation angle $\phi_{max}$ is dependent on the characteristics of the utility and the load. The phase rotation angle $\phi$ generated by the compensator inverter 94 may be calculated by the compensation reference decision system 147, and then compared to $\phi_{max}$ to determine whether the voltage compensation level should be tuned down. The phase rotation angle $\phi$ may be calculated as follows:

$$\|v_{rotate}\| = \sqrt{(\|i_{d2}\|R_{cmd})^2 + (\|i_{d2}\|\omega_e L_{cmd})^2} \qquad (34)$$

$$\phi = 2\sin^{-1}\left(\frac{\|v_{rotate}\|}{2\|v_{load}\|}\right), \qquad (35)$$

where $\|V_{load}\|$ is the magnitude of the pre-fault load voltage.

The compensation reference decision system 147 effects the tuning down of the compensation voltage level by providing the adjusted voltage and current reference command signal values for use in the SRF controller 142. The decision to reduce the compensation level, and the amount by which the compensation level should be reduced, may be based on a variety of system information, including load characteristics, utility characteristics, and characteristics of the voltage compensator 94. Relevant load characteristics include load sensitivities to voltage sags, load transformer impedance, load transformer configuration, and so on. Relevant utility characteristics include transmission line impedance, the characteristics of neighboring feeders, and so on. Relevant compensator characteristics include voltage compensator inverter rating, coupling transformer impedance, and so on. It is apparent that the decision making process implemented in the compensation reference decision system 147 to adjust the voltage and current reference command signal values provided to the SRF controller 147 based on the required system information will be highly dependent on the installation environment of the particular voltage restoration system involved. The compensation reference decision system 147 may preferably be implemented as a software routine in a programmable digital processor, or similar device.

Figure 31:
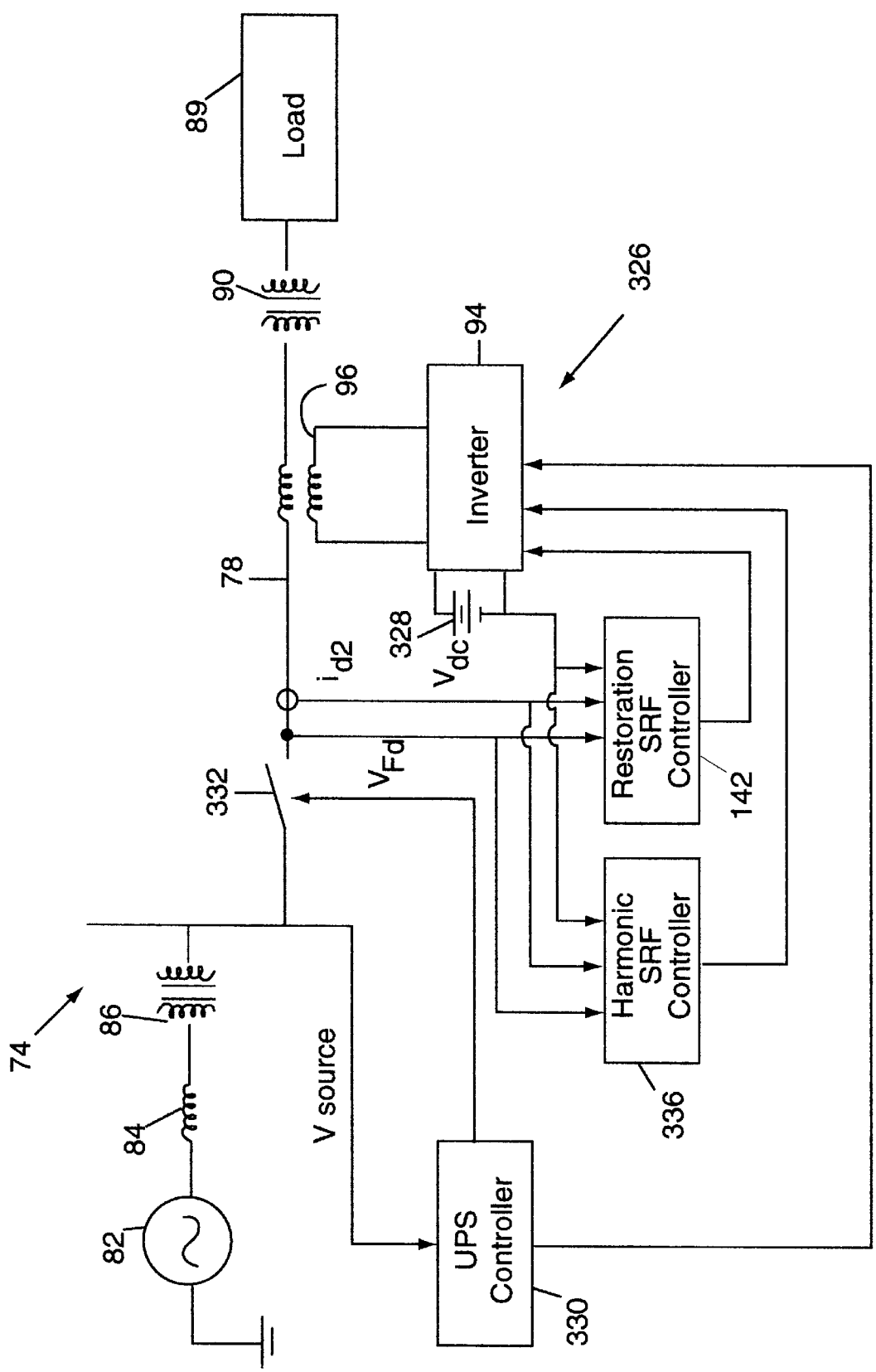
FIG. 31 is a block diagram of an alternative embodiment of a dynamic voltage restoration system in accordance with the present invention including uninterruptible power supply and harmonic compensation controller functions.

An alternative embodiment of a dynamic voltage restoration system 326 in accordance with the present invention is described with reference to FIG. 31. The alternative embodiment voltage restoration system 326 includes an inverter 94 which is connected, via a transformer 96, in series with the transmission line 78 of one feeder of a power distribution system 74. The power distribution system 74 illustrated in FIG. 31 may be of the type described previously with respect to FIG. 6, and thus the same reference numerals which are used in FIG. 6 to refer to parts of the power distribution system 74 are used to indicate corresponding parts of the power distribution system 74 illustrated in FIG. 31. The alternative embodiment voltage restoration system 326 includes a voltage restoration SRF based controller 142. The voltage restoration SRF controller 142 employs measured inverter terminal voltage $V_{fd}$, line current $i_{d2}$, and DC bus voltage $V_{dc}$ signals, to generate voltage restoration inverter voltage command signals which are provided to the inverter 94 to control the inverter 94 to inject a voltage signal in series with the transmission line 78 which restores the voltage level provided to the load 89 to a balanced three-phase condition at pre-fault voltage levels, and which ensures that there is zero real power flow between the voltage restoration system and the power line 78. This voltage restoration function may be implemented in the manner previously described.

The effective method of the present invention for compensating for voltage sags on the power transmission line 78 will not, however, be able to support the load 89 if there is a complete interruption of the power provided on the transmission line 78, such as may be caused by a complete failure of the utility voltage source 82. In order to deal effectively with voltage interruptions, the alternative embodiment voltage restoration system 326 may also be configured to operate as an uninterruptible power supply. An uninterruptible power supply (UPS) is able to provide backup or auxiliary power to the load 89 if there is a complete or near complete interruption of the voltage provided on the power transmission line 78. In order to implement the UPS function, an auxiliary energy storage device, such as a battery 328, must be provided to power the inverter 94. Also, a UPS controller 330 is provided to control the voltage restoration system 326 to implement the UPS functions. The UPS controller 330 monitors the source voltage provided to the transmission line 78. If a complete, or near complete, interruption of the source voltage is detected by the UPS controller 330, the UPS controller provides control signals to the inverter 94 to control the inverter to generate an inverter voltage signal on the transmission line 78, to support the load 89 from the energy stored in the auxiliary energy storage device 328. Preferably, the UPS controller 330 is able to detect a voltage interruption and activate the inverter 94 so as to prevent any interruption in the voltage provided to the load 89. Various line fault detection schemes are known in the prior art and may be employed by the UPS controller 320 to detect rapidly the occurrence of a source voltage interruption and to respond quickly thereto. At the same time that the UPS controller 330 activates the inverter 94 to provide backup power to the load 89, the UPS controller 330 preferably opens a utility isolation switching device 332, such as a static switch, connected between the utility power source 82 and the series connected inverter 94, to prevent the backup power provided on the transmission line 78 by the inverter 94 from back feeding into a faulty utility system. The UPS controller 330 continues to monitor the source voltage throughout the voltage interruption. When the UPS controller 330 detects a return to normal source voltage levels, the UPS controller 330 may turn off the inverter 94 and close the utility isolation static switching device 332 to return the normal supply of utility power to the load 89. Under normal operating conditions, the UPS controller 330 may preferably provide control signals to the inverter 94 to control the inverter 94 to provide a charging current from the utility line 78 to the auxiliary energy storage device 328 to recharge the auxiliary energy storage device 328.

The functions implemented by the UPS controller 330 may be implemented in a conventional manner by those skilled in the art of uninterruptible or standby power systems. The UPS function is advantageously combined with the voltage restoration functions previously described since both functions may be implemented using a single inverter 94. Since the inverter 94 is typically the most expensive component of an uninterruptible power supply or a voltage restoration system, both UPS and voltage restoration functions may be implemented in a combined system in accordance with the present invention for much less than it would cost to implement the two functions separately using separate devices.

Another function which may be advantageously incorporated in the alternative embodiment voltage restoration system 326 is harmonic filtering or harmonic compensation. As discussed previously, certain non-linear power electronic loads, such as three-phase diode and thyristor bridge inverters used in DC power supplies, adjustable speed drives (ASDs), and uninterruptible power supplies (UPS), can cause harmonic distortion in the power supply line 78, such as by injecting harmonic current into the power system. However, it is known that these harmonic components in the transmission line signal can be reduced or eliminated through active filtering. Active filtering involves the injection of voltage signals into the power transmission line which cancel the undesirable harmonics on the power transmission line.

The inverter 94 of the voltage restoration system 326, which is used to inject a voltage signal in series with the power transmission line 78 at the fundamental frequency to restore the load voltage to pre-fault conditions, may be controlled simultaneously to inject a voltage signal in series with the power transmission line 78 at desired harmonic frequencies to cancel the undesirable harmonic signals on the power transmission line 78. A harmonic controller 334, which may preferably be implemented as an SRF controller, may be used to generate the required harmonic inverter voltage command signals for controlling the inverter 94 to generate the desired harmonic voltage signals. The harmonic inverter voltage command signals may be generated by the harmonic SRF controller 336 based on measured inverter terminal voltage $V_{fd}$ and line current $i_{d2}$ signal values. The harmonic inverter voltage command signals may also be generated to preserve the voltage balance on the inverter DC bus. For this purpose, the harmonic SRF controller 336 may employ the measured DC bus voltage $V_{dc}$ in generating the harmonic inverter voltage command signals.

The harmonic inverter voltage command signals provided by the harmonic SRF controller 336 are designed to control the inverter 94 to generate inverter voltage signals at harmonic frequencies. The voltage restoration inverter voltage command signals provided by the voltage restoration SRF controller 142, in contrast, are designed to control the inverter 94 to generate an inverter voltage signal at the fundamental frequency. The harmonic inverter voltage command signals and the voltage restoration inverter voltage command signals may thus be combined before being provided to control the inverter 94. Since the harmonic filtering and voltage restoration inverter voltage command signals operate at different frequencies, both sets of signals may be applied to the inverter 94 simultaneously. Thus, in accordance with the present invention, the voltage restoration system inverter may be controlled simultaneously to provide harmonic filtering and voltage restoration. Of course, the harmonic filtering function may be provided during normal operation of the power system, when there is no need to provide fundamental voltage restoration.

The harmonic SRF controller 336 may be implemented in a conventional manner to provide the desired harmonic inverter voltage command signals to control the system inverter 94 to generate the inverter voltage signals necessary for harmonic filtering and/or compensation. The harmonic filtering function provided by the alternative embodiment voltage restoration system 326 is effectively the same as that provided by a conventional series connected active filter inverter. Thus, prior art references in the area of series connected active filter inverters may be consulted for more details concerning the design of the harmonic controller 336. U.S. Pat. Nos. 5,465,203 and 5,513,090, to Subhashish Bhattacharya and Deepakraj M. Divan, are incorporated herein by reference for this purpose.

Since the inverter 94 is typically the most expensive part of any active filter system, it is apparent that the harmonic filtering/compensation function may conveniently be incorporated into the voltage restoration system 326 for much less than it would cost to implement a series harmonic active filter as a separate device. Although the alternative embodiment voltage restoration system 336 illustrated in FIG. 31 is shown to incorporate both UPS and harmonic filtering functions, it should be apparent that a voltage restoration system in accordance with the present invention may include either UPS or harmonic filtering functions, or both, in combination with the voltage restoration function previously described.

Figure 16A:
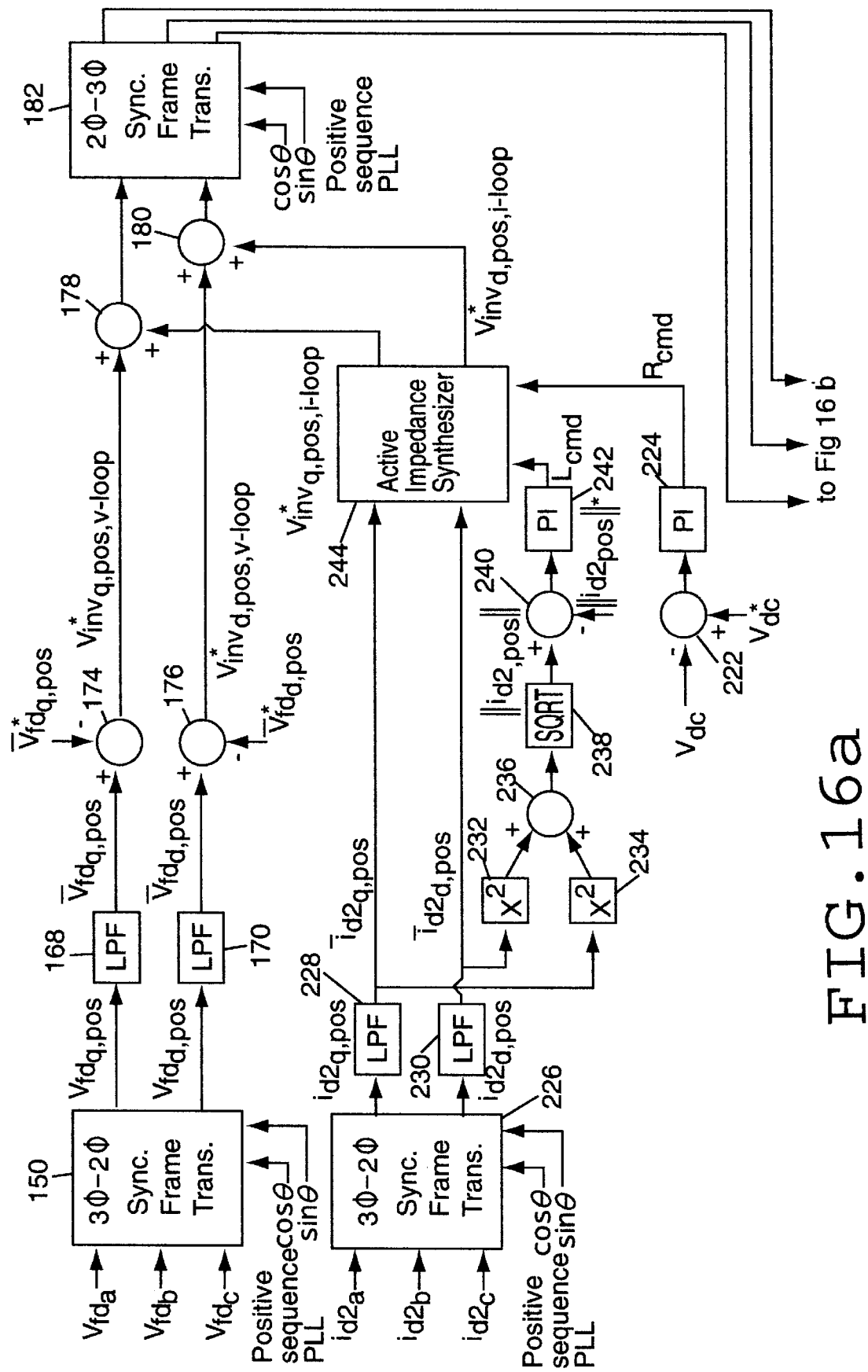
FIG. 16 is a block diagram of a synchronous reference frame based controller for a voltage compensator inverter of a dynamic series voltage restoration system in accordance with the present invention.
Figure 16B:
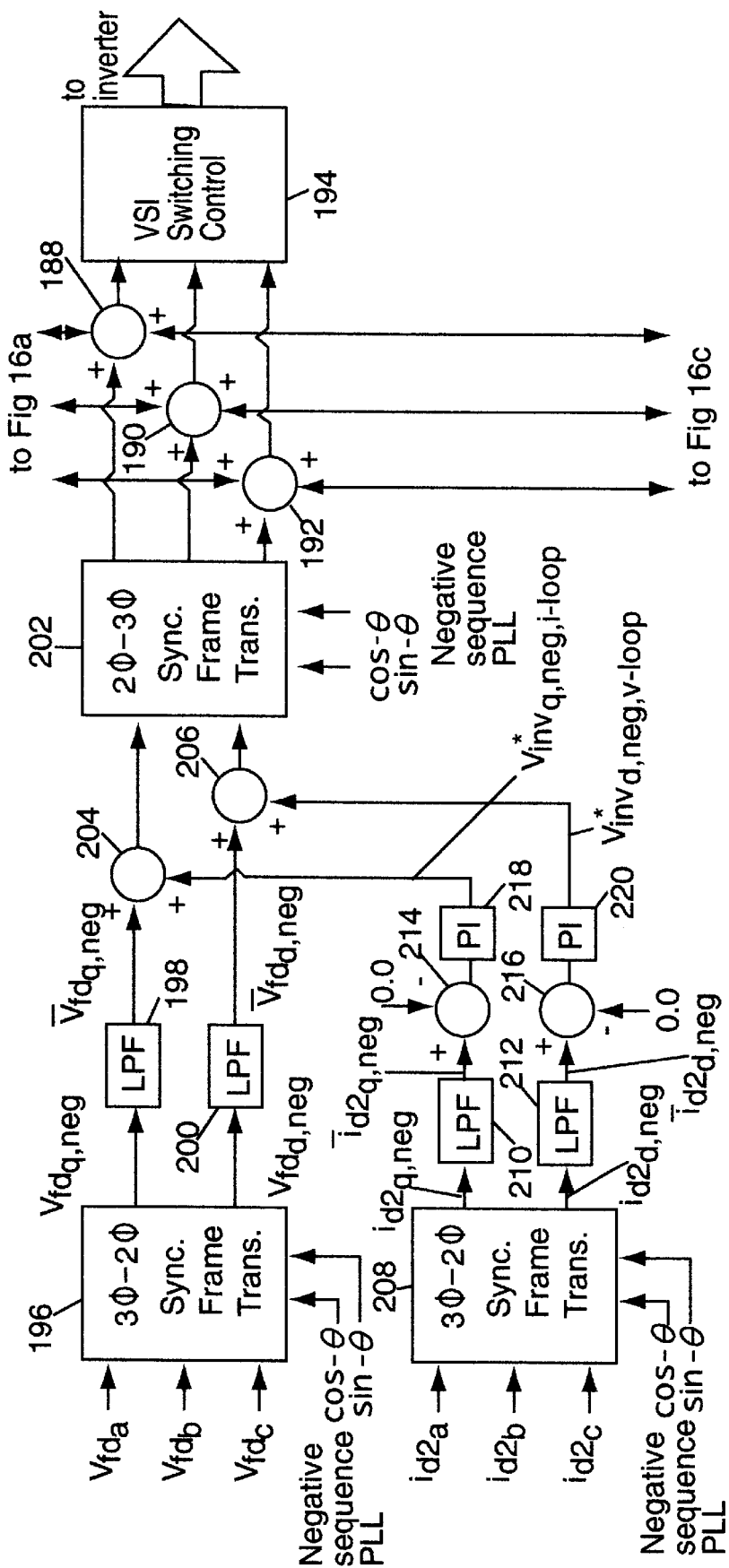
Figure 16C:
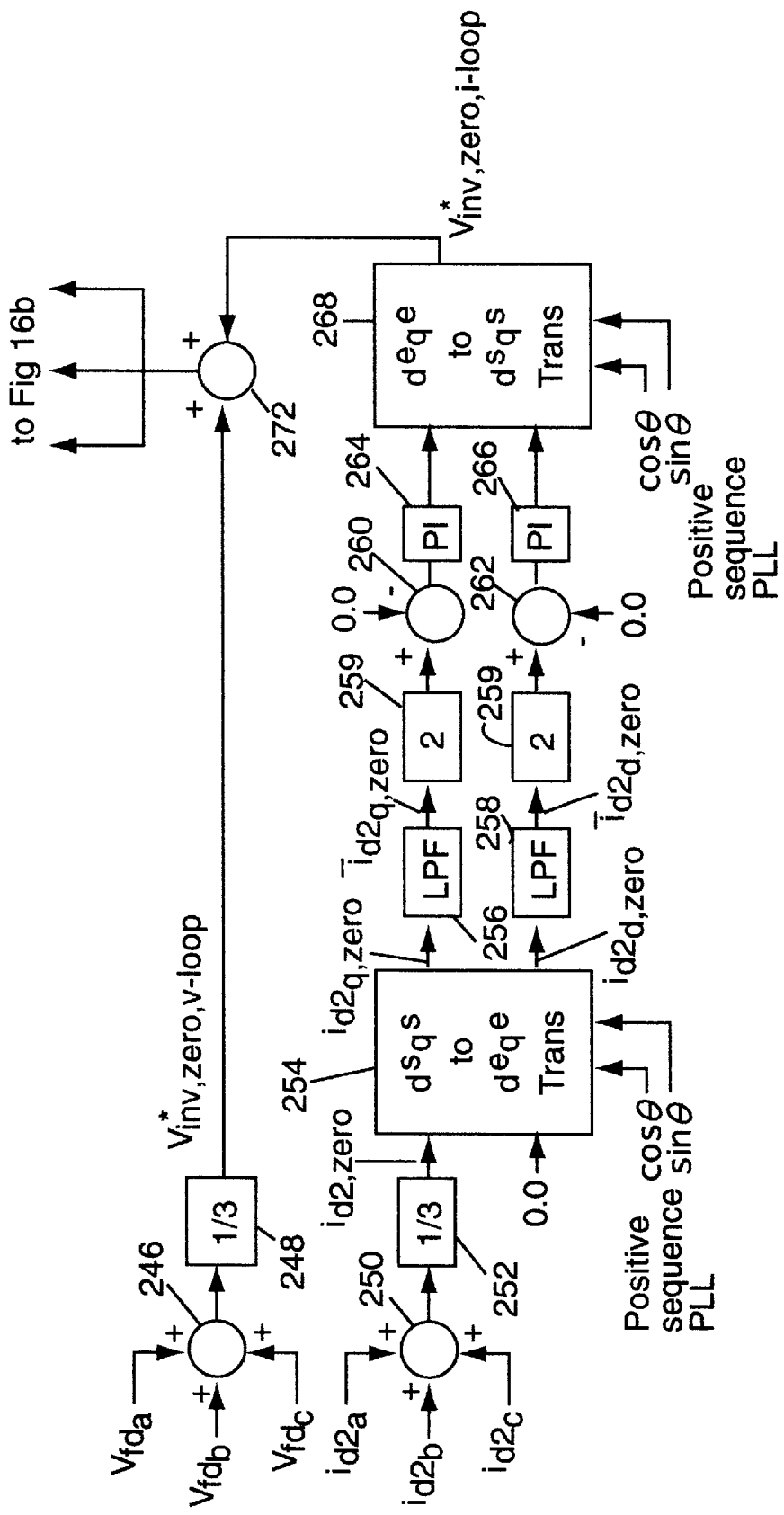
Figure 32:
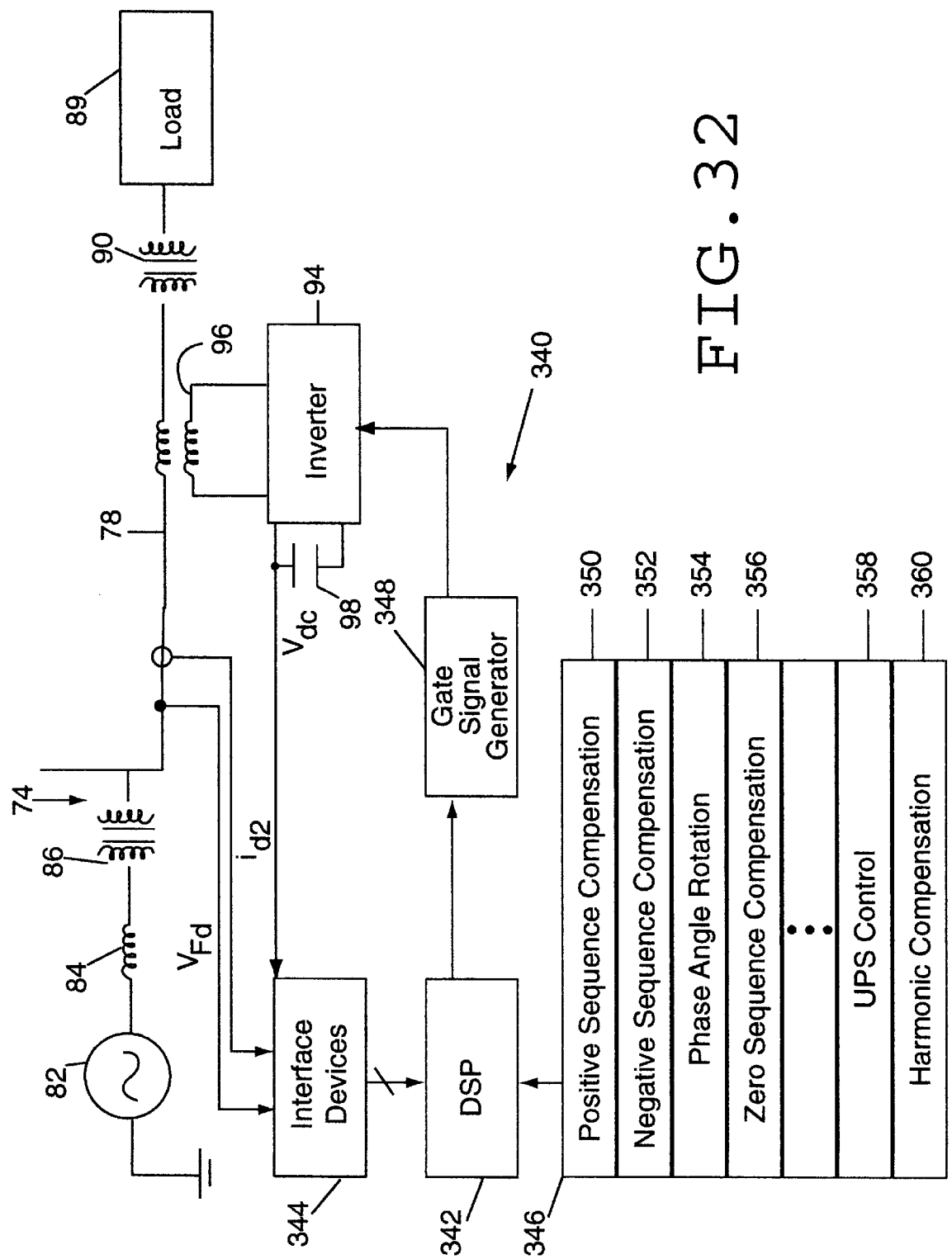
FIG. 32 is a block diagram of a dynamic voltage restoration system in accordance with the present invention wherein the main functional components of the voltage compensator inverter control system are implemented using a digital processor.

It should be understood that the SRF based compensator inverter controller 142, illustrated schematically in FIG. 16, may be implemented using analog components, digital components, or a combination thereof. FIG. 32 is a block diagram of an embodiment of a voltage restoration system 340 in accordance with the present invention wherein the compensator inverter control functions are implemented using a digital signal processor (DSP) 342, or similar programmable digital device. Measured system parameters, such as the voltage compensation inverter terminal voltages $V_{fd}$, the power line currents $i_{d2}$, and the DC bus voltage $V_{dc}$, are provided to the DSP 342 through interface devices 344 that, for example, convert the measured analog signals into digital signals for use by the DSP 342. The DSP employs a software program 346 to generate inverter control signals that will control the inverter 94 to perform the voltage restoration function of the voltage restoration system 340, as previously described. A gate signal generator 348 may typically be employed to generate switching signals for the inverter switching devices from the low voltage control signals generated by the DSP 342. The DSP software program 346 implements the various voltage compensation inverter controller functions previously described, including, for example, positive sequence voltage component restoration 350, negative sequence voltage and current component cancellation 352, phase angle rotation 354 to ensure the zero real power flow condition, and, optionally, zero sequence voltage and current cancellation 356. The UPS control 358 and harmonic filtering/compensation control 360 functions described previously with respect to FIG. 31 may also be implemented in the DSP software program 346.

Although a dynamic series voltage restoration system in accordance with the present invention has been described with reference to the function of compensating for voltage sags caused by remote single line-to-ground faults on a utility system, it should be noted that the present invention also serves other power conditioning functions. For example, a dynamic series voltage restoration system will automatically compensate for voltage surges as well as voltage sags. Also, since a voltage compensator in accordance with the present invention may be controlled to cancel negative and zero sequence currents, the present invention also performs the function of a line conditioner system for restoring a three-phase balanced condition to systems which have become unbalanced, such as by the application of an unbalanced load. Finally, the present invention will compensate for voltage sags regardless of their cause. Thus, the present invention will provide voltage compensation for voltage sags caused by remote three-phase faults or other faults. However, for severe fault conditions, such as most three-phase faults, a dynamic series voltage restoration system in accordance with the present invention may not be able to provide 100% voltage restoration while maintaining a zero net power flow condition.

It is understood that this invention is not confined to the particular embodiments, implementations, and applications herein illustrated and described, but embraces all such modified forms thereof as come within the scope of the following claims.

What is claimed is:

1. A voltage restoration system for restoring a voltage signal provided to a load on multi-phase power lines which is effected by a fault condition, comprising:

(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines; and (b) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines.

2. A voltage restoration system for restoring a voltage signal provided to a load on multi-phase power lines which is effected by a fault condition, comprising:

(a) a three-phase voltage source inverter selected from the group of three-phase voltage source inverters consisting of: three single phase inverters connected across a DC bus to form a three-phase inverter, and a four-leg three-phase inverter, wherein the inverter is adapted to be connected in series with the multi-phase power lines between a utility power source and the load and receives power from a DC storage device connected across a DC bus thereof, the inverter responsive to control signals to generate an inverter voltage signal in series with the multi-phase power lines; and (b) an inverter controller means for generating control signals that are provided to the inverter to control the inverter to generate an inverter voltage signal in series with the multi-phase power lines such that the voltage signal provided to the load is a balanced multi-phase voltage signal at the pre-fault voltage signal level and such that there is no real power flow between the inverter and the multi-phase power lines.

3. The voltage restoration system of claim 1 wherein the DC storage device is a capacitor.

4. A voltage restoration system for restoring a voltage signal provided to a load on multi-phase power lines which is effected by a fault condition, comprising:

(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines; and (b) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines, including means for generating control signals that are provided to the compensator inverter to control the compensator inverter to generate an inverter voltage signal in series with the multi-phase power lines such that the voltage signal provided to the load on the multi-phase power lines is defined by balanced load voltage vectors having magnitudes equal to magnitudes of pre-fault load voltage vectors of the pre-fault voltage signal provided to the load and such that the load voltage vectors are rotated by a phase rotation angle from the pre-fault load voltage vectors, the phase rotation angle selected such that there is no real power flow between the compensator inverter and the multi-phase power lines.

5. The voltage restoration system of claim 1 comprising additionally a multi-phase transformer adapted to be connected between the compensator inverter and the multi-phase power lines.

6. A voltage restoration system for restoring a voltage signal provided to a load on multi-phase power lines which is effected by a fault condition, comprising:

(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines; and (b) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines including:

(i) means for generating control signals that are applied to the compensator inverter to control the compensator inverter to generate an inverter voltage signal in series with the multi-phase power lines such that a positive sequence component of the voltage signal provided to the load on the multi-phase power lines is equal to a pre-fault positive sequence component of the pre-fault voltage signal provided to the load;

(ii) means for generating control signals that are applied to the compensator inverter to control the compensator inverter to generate an inverter voltage signal in series with the multi-phase power lines such that a negative sequence component of the voltage signal provided to the load is eliminated; and (iii) means for generating control signals that are applied to the compensator inverter to control the compensator inverter to generate an inverter voltage signal in series with the multi-phase power lines such that there is no real power flow between the compensator inverter and the multi-phase power lines.

7. The voltage restoration system of claim 6 wherein the compensator inverter controller means includes means for generating control signals that are applied to the compensator inverter to control the compensator inverter to generate an inverter voltage signal in series with the multi-phase power lines such that a zero sequence component of the voltage provided to the load is eliminated.

8. A voltage restoration system for restoring a voltage signal provided to a load on multi-phase power lines which is effected by a fault condition, comprising:

(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines; and (b) a compensator inverter controller means including a synchronous reference frame based controller for generating control signals that are provided to the compensator inverter to control the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines.

9. The voltage restoration system of claim 8 wherein the synchronous reference frame based controller includes:

(a) a positive sequence three-phase to two-phase transformation means for transforming measured three phase compensator inverter terminal voltage signals into two-phase synchronously rotating reference frame signal values, DC signal extraction means for extracting a DC component corresponding to a fundamental positive sequence component of the compensator inverter terminal voltage signals from the two-phase signals, means for comparing the extracted DC signals to positive sequence compensator inverter terminal voltage reference command signals to generate two-phase positive sequence inverter voltage command signals, and positive sequence two-phase to three-phase transformation means for transforming the two-phase positive sequence inverter voltage command signals from the two-phase reference frame to the three-phase reference frame to form three-phase positive sequence inverter voltage command signals;

(b) a negative sequence three-phase to two-phase transformation means for transforming measured three-phase compensator inverter terminal voltage signals into two-phase synchronously rotating reference frame signal values, DC signal extraction means for extracting a DC component corresponding to a fundamental negative sequence component of the compensator inverter terminal voltages from the two-phase signals to generate two-phase negative sequence inverter voltage command signals, and negative sequence two-phase to three-phase transformation means for transforming the two-phase negative sequence inverter voltage command signals from the two-phase reference frame to the three-phase reference frame to form three-phase negative sequence inverter voltage command signals;

(c) a positive sequence three-phase to two-phase transformation means for transforming measured three-phase line current signals into two-phase synchronously rotating reference frame signal values, DC signal extraction means for extracting a two-phase DC component corresponding to a fundamental positive sequence component of the line currents from the two phase signals, an active impedance synthesizer means for generating two-phase DC bus control inverter voltage command signals from the fundamental positive sequence component of the line currents and a resistance command signal value and an inductance command signal value, the resistance command signal value defining the magnitude of a positive sequence voltage component to be generated in series with the multi-phase power lines and in phase with a positive sequence component of the line current such that there is no real power flow between the compensator inverter and the multi-phase power lines, the inductance command signal value defining the magnitude of a positive sequence voltage component to be generated in series with the multi-phase power lines and in quadrature with the positive sequence component of the line current such that the magnitude of the voltage signal provided to the load equals the pre-fault voltage magnitude, and a positive sequence two-phase to three-phase transformation means for transforming the two-phase DC bus control inverter voltage command signals from the two-phase synchronously rotating reference frame to the three-phase reference frame to form three-phase DC bus control inverter voltage command signals; and (d) means for combining the three-phase positive sequence inverter voltage command signals, the three-phase negative sequence inverter voltage command signals, and the three-phase DC bus control inverter voltage command signals to form a combined three-phase inverter voltage command signal.

10. The voltage restoration system of claim 9 wherein the positive sequence compensator terminal voltage reference command signals are equal to a positive sequence component of the pre-fault voltage signal at terminals of the compensator inverter.

11. The voltage restoration system of claim 9 wherein the positive sequence compensator terminal voltage reference command signals are set by a compensation reference decision system in response to selected system information.

12. The voltage restoration system of claim 9 comprising additionally means for combining the two-phase positive sequence inverter voltage command signals and the two-phase DC bus control inverter voltage command signals, and wherein the positive sequence two-phase to three-phase transformation means for transforming the two-phase positive sequence inverter voltage command signals into the three-phase positive sequence inverter voltage command signals and the positive sequence two-phase to three-phase transformation means for transforming the two-phase DC bus control inverter voltage command signals into the three-phase DC bus control inverter voltage command signals is a single positive sequence two-phase to three-phase transformation means for transforming the combined two-phase positive sequence and DC bus control inverter voltage command signals from the two-phase synchronously rotating reference frame to the three-phase reference frame.

13. The voltage restoration system of claim 9 comprising additionally:

(a) means for comparing a measured DC bus voltage signal to a DC bus voltage reference command signal to form a DC bus voltage error signal, and means for deriving the resistance command signal value from the DC bus voltage error signal; and (b) means for squaring the two-phase DC components corresponding to the fundamental positive sequence component of the line current, means for adding together the squared two-phase DC components corresponding to the fundamental positive sequence component of the line current, means for taking the square root of the squared and summed two-phase DC components corresponding to the fundamental positive sequence component of the line current to form a positive sequence line current component magnitude signal, means for comparing the positive sequence line current component magnitude signal to a positive sequence line current component magnitude reference command signal to form a positive sequence line current component magnitude error signal, and means for deriving the inductance command signal value from the positive sequence line current component magnitude error signal.

14. The voltage restoration system of claim 13 wherein the positive sequence line current component magnitude reference command signal is equal to a magnitude of a positive sequence component of a pre-fault current on the multi-phase power line.

15. The voltage restoration system of claim 13 wherein the DC bus voltage reference command signal and the positive sequence line current component magnitude reference command signal are set by a compensation reference decision system in response to selected system information.

16. The voltage restoration system of claim 9 comprising additionally a negative sequence three-phase to two-phase transformation means for transforming measured three-phase line current signals into two-phase synchronously rotating reference frame signal values, DC signal extraction means for extracting a DC component corresponding to a fundamental negative sequence component of the line current from the two-phase signals, means for comparing the extracted DC signals to negative sequence line current reference command signals to generate negative sequence line current error signals, means for deriving a two-phase negative sequence line current component for the negative sequence inverter voltage command signals from the negative sequence line current error signals, and means for combining the two-phase negative sequence line current component for the negative sequence inverter voltage command signals with the two-phase negative sequence inverter voltage command signals.

17. The voltage restoration system of claim 16 wherein the negative sequence line current reference command signals are equal to zero.

18. The voltage restoration system of claim 9 comprising additionally a means for adding together the measured three-phase compensator inverter terminal voltage signals, means for dividing the summed three-phase compensator inverter terminal voltage signals by three to form a zero sequence inverter voltage command signal, and means for combining the zero sequence inverter voltage command signal with the three-phase positive sequence inverter voltage command signals, the three-phase negative sequence inverter voltage command signals, and the three-phase DC bus control inverter voltage command signals.

19. The voltage restoration system of claim 18 comprising additionally a means for adding together the measured three-phase line current signals, means for dividing the summed three-phase line current signals by three, stationary to rotating transformation means for transforming the summed and divided three-phase line current signals into rotating reference frame signal values, DC extraction means for extracting a DC component corresponding to a zero sequence component of the line current from the rotating reference frame signals, means for comparing the extracted DC signals to zero sequence line current component reference command signals to form zero sequence line current component error signals, means for deriving a rotating zero sequence line current component for the zero sequence inverter voltage command signal from the zero sequence line current component error signal, rotating to stationary transformation means for transforming the rotating zero sequence line current component for the zero sequence inverter voltage command signal from the rotating reference frame to the stationary reference frame to form a zero sequence line current component for the zero sequence inverter voltage command signal, and means for combining the zero sequence line current component for the zero sequence inverter voltage command signal with the zero sequence inverter voltage command signal.

20. The voltage restoration system of claim 19 wherein the zero sequence line current component reference command signals are equal to zero.

21. A voltage restoration system for restoring a voltage signal provided to a load on multi-phase power lines which is effected by a fault condition, comprising:

(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines;

(b) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines;

(c) a utility system isolation switching device adapted to be connected in series with the multi-phase power lines between the utility power source and the compensator inverter, the utility system isolation switching device being responsive to utility system isolation switching device control signals to connect and disconnect the utility system from the multi-phase power lines; and (d) an uninterruptible power supply controller means for providing the utility system isolation switching device control signals and for providing control signals to the compensator inverter, the uninterruptible power supply controller means including means for detecting an interruption of and a return of a source power signal provided from the utility power source on the multi-phase power lines, means for providing a utility system isolation switching device control signal to disconnect the utility system from the multi-phase power lines and for providing control signals to the compensator inverter to control the compensator inverter to provide power to the load from power stored in the DC storage device when an interruption of the source power signal is detected, and means for providing a utility isolation switching device control signal to connect the utility system to the multi-phase power lines and for terminating the provision of control signals to the compensator inverter when a return of the source power signal is detected.

22. The voltage restoration system of claim 21 wherein the DC storage device is a battery.

23. A voltage restoration system for restoring a voltage signal provided to a load on multi-phase power lines which is effected by a fault condition, comprising:

(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines;

(b) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines; and (c) a harmonic compensation controller means for generating harmonic inverter control signals that are provided to the compensator inverter to control the compensator inverter to generate a harmonic inverter voltage signal having harmonic components which reduce a harmonic component of a voltage signal on the multi-phase power lines.

24. A voltage restoration system for restoring a voltage signal provided to a load on multi-phase power lines which is effected by a fault condition, comprising:

(a) a compensator inverter connected in series with the multi-phase power lines of one feeder of a multiple feeder power distribution system between a utility power source and the load and receiving power from a DC storage device connected across a DC bus thereof, the compensator inverter responsive to control signals to generate a compensator inverter voltage signal in series with the multi-phase power lines; and (b) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines.

25. A method for restoring the voltage signal provided to a load on multi-phase power lines which is effected by a fault condition, comprising the step of:

injecting a compensation voltage signal in series with the multi-phase power lines such that the voltage signal provided to the load is a balanced multi-phase voltage signal at the pre-fault voltage signal level and such that the compensation voltage signal does not cause any real power flow into the multi-phase power lines.

26. The method of claim 25 wherein the injected compensation voltage signal causes the voltage signal provided to the load on the multi-phase power lines to be defined by balanced load voltage vectors having magnitudes equal to magnitudes of pre-fault load voltage vectors of the pre-fault voltage signal provided to the load and wherein the load voltage vectors are rotated by a phase rotation angle from the pre-fault load voltage vectors, wherein the phase rotation angle is selected such that the compensation voltage signal does not cause any real power flow into the multi-phase power lines.

27. A method for restoring the voltage signal provided to a load on multi-phase power lines which is effected by a fault condition, comprising the steps of:

(a) connecting a compensator inverter in series with the multi-phase power lines between a utility power source and the load, wherein the compensator inverter receives power from a DC storage device connected across a DC bus thereof; and (b) controlling the compensator inverter to generate an inverter voltage signal in series with the multi-phase power lines such that the voltage signal provided to the load is a balanced multi-phase voltage signal at the pre-fault voltage signal level and such that there is no real power flow between the compensator inverter and the multi-phase power lines.

28. The method of claim 27 wherein the inverter voltage signal generated in series with the multi-phase power lines causes the voltage signal provided to the load on the multi-phase power lines to be defined by balanced load voltage vectors having magnitudes equal to magnitudes of pre-fault load voltage vectors of the pre-fault voltage signal provided to the load and wherein the load voltage vectors are rotated by a phase rotation angle from the pre-fault load voltage vectors, wherein the phase rotation angle is selected such that there is no real power flow between the compensator inverter and the multi-phase power lines.

29. The method of claim 27 wherein the step of controlling the compensator inverter includes the steps of:

(a) controlling the compensator inverter to generate an inverter voltage signal in series with the multi-phase power lines such that a positive sequence component of the voltage signal provided to the load on the multi-phase power lines is equal to a pre-fault positive sequence component of the pre-fault voltage signal provided to the load;

(b) controlling the compensator inverter to generate an inverter voltage signal in series with the multi-phase power lines such that a negative sequence component of the voltage signal provided to the load is eliminated; and (c) controlling the compensator inverter to generate an inverter voltage signal in series with the multi-phase power lines such that there is no real power flow between the compensator inverter and the multi-phase power lines.

30. The method of claim 29 wherein the step of controlling the compensator inverter further includes the step of controlling the compensator inverter to generate an inverter voltage signal in series with the multi-phase power lines such that a zero sequence component of the voltage provided to the load is eliminated.

31. The method of claim 29 wherein the step of controlling the compensator inverter includes the steps of:

(a) measuring three-phase compensator inverter terminal voltage signals;

(b) transforming the measured three-phase compensator inverter terminal voltage signals into positive sequence two-phase synchronously rotating reference frame signal values;

(c) extracting a DC component corresponding to a fundamental positive sequence component of the compensator inverter terminal voltage signals from the positive sequence two-phase signals;

(d) comparing the extracted DC component to positive sequence compensator inverter terminal voltage reference command signals to generate two-phase positive sequence inverter voltage command signals;

(e) transforming the two-phase positive sequence inverter voltage command signals from the two-phase reference frame to the three-phase reference frame to form three-phase positive sequence inverter voltage command signals;

(f) transforming the measured three-phase compensator inverter terminal voltage signals into negative sequence two-phase synchronously rotating reference frame signal values;

(g) extracting a DC component corresponding to a fundamental negative sequence component of the compensator inverter terminal voltages from the two-phase signals to generate two-phase negative sequence inverter voltage command signals;

(h) transforming the two-phase negative sequence inverter voltage command signals from the two-phase reference frame to the three-phase reference frame to form three-phase negative sequence inverter voltage command signals;

(i) measuring three-phase power line current signals;

(j) transforming the measured three-phase line current signals into positive sequence two-phase synchronously rotating reference frame signal values;

(k) extracting a two-phase DC component corresponding to a fundamental positive sequence component of the line currents from the two phase signals;

(l) generating two-phase DC bus control inverter voltage command signals from the fundamental positive sequence component of the line currents and a resistance command signal value and an inductance command signal value, wherein the resistance command signal value defines the magnitude of a positive sequence voltage component to be generated in series with the multi-phase power lines and in phase with a positive sequence component of the line current such that there is no real power flow between the compensator inverter and the multi-phase power lines, and wherein the inductance command signal value defines the magnitude of a positive sequence voltage component to be generated in series with the multi-phase power lines and in quadrature with the positive sequence component of the line current such that the magnitude of the voltage signal provided to the load equals the pre-fault voltage magnitude;

(m) transforming the two-phase DC bus control inverter voltage command signals from the two-phase synchronously rotating reference frame to the three-phase reference frame to form three-phase DC bus control inverter voltage command signals;

(n) combining the three-phase positive sequence inverter voltage command signals, the three-phase negative sequence inverter voltage command signals, and the three-phase DC bus control inverter voltage command signals to form a combined three-phase inverter voltage command signal; and (o) providing the three-phase inverter voltage command signals to the voltage compensator inverter.

32. The method of claim 31 wherein the step of providing the three-phase inverter voltage command signals to the voltage compensator inverter includes the step of converting the three-phase inverter voltage command signals into switching control signals for controlling switching devices in the voltage compensator inverter.

33. The method of claim 31 wherein the positive sequence compensator terminal voltage reference command signals are equal to a positive sequence component of the pre-fault voltage signal at terminals of the voltage compensator inverter.

34. The method of claim 31 comprising additionally the step of combining the two-phase positive sequence inverter voltage command signals and the two-phase DC bus control inverter voltage command signals, and wherein the steps of transforming the two-phase positive sequence inverter voltage command signals into the three-phase positive sequence inverter voltage command signals and transforming the two-phase DC bus control inverter voltage command signals into the three-phase DC bus control inverter voltage command signals are performed in a combined step of transforming the combined two-phase positive sequence and DC bus control inverter voltage command signals from the two-phase synchronously rotating reference frame to the three-phase reference frame.

35. The method of claim 31 comprising additionally the steps of:

(a) comparing a measured DC bus voltage signal to a DC bus voltage reference command signal to form a DC bus voltage error signal;

(b) deriving the resistance command signal value from the DC bus voltage error signal;

(c) squaring the two-phase DC components corresponding to the fundamental positive sequence component of the line current;

(d) adding together the squared two-phase DC components corresponding to the fundamental positive sequence component of the line current;

(e) taking the square root of the squared and summed two-phase DC components corresponding to the fundamental positive sequence component of the line current to form a positive sequence line current component magnitude signal;

(f) comparing the positive sequence line current component magnitude signal to a positive sequence line current component magnitude reference command signal to form a positive sequence line current component magnitude error signal; and (g) deriving the inductance command signal value from the positive sequence line current component magnitude error signal.

36. The method of claim 35 wherein the positive sequence line current component magnitude reference command signal is equal to a magnitude of a positive sequence component of a pre-fault current on the multi-phase power line.

37. The method of claim 31 comprising additionally the steps of:

(a) transforming the measured three-phase line current signals into negative sequence two-phase synchronously rotating reference frame signal values;

(b) extracting a DC component corresponding to a fundamental negative sequence component of the line current from the two-phase signals;

(c) comparing the extracted DC signals to negative sequence line current reference command signals to generate negative sequence line current error signals;

(d) deriving a two-phase negative sequence line current component for the negative sequence inverter voltage command signals from the negative sequence line current error signals; and (e) combining the two-phase negative sequence line current component for the negative sequence inverter voltage command signals with the two-phase negative sequence inverter voltage command signals.

38. The method of claim 37 wherein the negative sequence line current reference command signals are equal to zero.

39. The method of claim 31 comprising additionally the steps of:
(a) adding together the measured three-phase voltage compensator inverter terminal voltage signals;
(b) dividing the summed three-phase voltage compensator inverter terminal voltage signals by three to form a zero sequence inverter voltage command signal; and
(c) combining the zero sequence inverter voltage command signal with the three-phase positive sequence inverter voltage command signals, the three-phase negative sequence inverter voltage command signals, and the three-phase DC bus control inverter voltage command signals.

40. The method of claim 39 comprising additionally the steps of:
(a) adding together the measured three-phase line current signals;
(b) dividing the summed three-phase line current signals by three;
(c) transforming the summed and divided three-phase line current signals into rotating reference frame signal values;
(d) extracting a DC component corresponding to a zero sequence component of the line current from the rotating reference frame signals;
(e) comparing the extracted DC signals to zero sequence line current component reference command signals to form zero sequence line current component error signals;
(f) deriving a zero sequence line current component for the zero sequence inverter voltage command signal from the zero sequence line current component error signal;
(g) transforming the zero sequence line current component for the zero sequence inverter voltage command signal from the rotating reference frame to the stationary reference frame to form a zero sequence line current component for the zero sequence inverter voltage command signal; and
(h) combining the zero sequence line current component for the zero sequence inverter voltage command signal with the zero sequence inverter voltage command signal.

41. The method of claim 40 wherein the zero sequence line current component reference command signals are equal to zero.

42. The method of claim 27 comprising additionally the step of controlling the voltage compensator inverter to generate a harmonic inverter voltage signal in series with the multi-phase power lines, wherein the harmonic inverter voltage signal includes harmonic frequency components which reduce a harmonic component of a voltage signal on the multi-phase power lines.

43. A voltage restoration system for restoring a voltage signal provided to a load on multi-phase power lines which is effected by a fault condition, comprising:
(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines;
(b) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at a selected percentage of the pre-fault voltage signal level and such that there is no real power flow between the compensator inverter and the multi-phase power lines; and
(c) a compensation reference decision system means for determining the selected percentage of the pre-fault voltage signal level based on selected system information.

44. The voltage restoration system of claim 43 wherein the compensation reference decision system means includes:
(a) means for calculating a phase rotation angle of the voltage signal provided to the load with respect to the pre-fault voltage signal provided to the load; and
(b) means for reducing the selected percentage of the pre-fault voltage signal level of the calculated phase rotation angle exceeds a selected maximum phase rotation angle.

45. A combined voltage restoration, uninterruptible power supply, and harmonic compensation system, for conditioning the voltage signal provided to a load on multi-phase power lines, comprising:
(a) an inverter adapted to be connected in series with the multi-phase power lines between a utility power source and the load and receiving power from a DC storage device connected across a DC bus thereof, the inverter responsive to control signals to generate an inverter voltage signal in series with the multi-phase power lines;
(b) a utility system isolation switching device adapted to be connected in series with the multi-phase power lines between the utility power source and the inverter, the utility system isolation switching device being responsive to utility system isolation switching device control signals to connect and disconnect the utility system from the multi-phase power lines
(c) a compensator inverter controller means for generating control signals that are provided to the compensator inverter to control the compensator inverter to generate an inverter voltage signal in series with the multi-phase power lines such that the voltage signal provided to the load is a balanced multi-phase voltage signal at a pre-fault voltage signal level and such that there is no real power flow between the compensator inverter and the multi-phase power lines;
(d) an uninterruptible power supply controller means for providing the utility system isolation switching device control signals and for providing control signals to the inverter, the uninterruptible power supply controller means including means for detecting an interruption of and a return of a source power signal provided from the utility power source on the multi-phase power lines, means for providing a utility system isolation switching device control signal to disconnect the utility system from the multi-phase power lines and for providing control signals to the inverter to control the compensator inverter to provide power to the load from power stored in the DC storage device when an interruption of the source power signal is detected, and means for providing a utility isolation switching device control signal to connect the utility system to the multi-phase power lines and for terminating the provision of control signals to the inverter when a return of the source power signal is detected; and (e) a harmonic compensation controller means for generating harmonic inverter control signals that are provided to the inverter to control the inverter to generate a harmonic inverter voltage signal having harmonic components which reduce a harmonic component of a voltage signal on the multi-phase power lines.

46. The system of claim 45 wherein the DC storage device is a battery.

47. A voltage restoration system for restoring a voltage signal provided to a load on multi-phase power lines which is affected by a fault condition, comprising:

(a) a compensator inverter adapted to be connected in series with the multi-phase power lines between a utility power source and the load and receiving power from a DC storage device connected across a DC bus thereof, the compensator inverter responsive to control signals to generate a compensator inverter voltage signal in series with the multi-phase power lines; and (b) a compensator inverter controller means for generating voltage control signals that are provided to the compensator inverter to control the compensator inverter to generate an inverter voltage signal in series with the multi-phase power lines such that the voltage signal provided to the load is a balanced multi-phase voltage signal at the pre-fault voltage signal level, including:

(i) means for generating voltage control signals that are applied to the compensator inverter to control the compensator inverter to generate an inverter voltage signal in series with the multi-phase power lines such that a positive sequence component of the voltage signal provided to the load on the multi-phase power lines is equal to a pre-fault positive sequence component of the pre-fault voltage signal provided to the load; and (ii) means for generating voltage control signals that are applied to the compensator inverter to control the compensator inverter to generate an inverter voltage signal in series with the multi-phase power lines such that a negative sequence component of the voltage signal provided to the load is eliminated.

48. The voltage restoration system of claim 47 wherein the compensator inverter controller means includes means for generating control signals that are applied to the compensator inverter to control the compensator inverter to generate an inverter voltage signal in series with the multi-phase power lines such that a zero sequence component of the voltage provided to the load is eliminated.

49. The voltage restoration system of claim 47 wherein the compensator inverter controller means includes a synchronous reference frame-based controller.

50. The voltage restoration system of claim 49 wherein the synchronous reference frame-based controller includes:

(a) a positive sequence three-phase to two-phase transformation means for transforming measured three-phase compensator inverter terminal voltage signals into two-phase synchronously rotating reference frame signal values, DC signal extraction means for extracting a DC component corresponding to a fundamental positive sequence component of the compensator inverter terminal voltage signals from the two-phase signals, means for comparing the extracted DC signals to positive sequence compensator inverter terminal voltage reference command signals to generate two-phase positive sequence inverter voltage command signals, and positive sequence two-phase to three-phase transformation means for transforming the two-phase positive sequence inverter voltage command signals from the two-phase reference frame to the three-phase reference frame to form three-phase positive sequence inverter voltage command signals;

(b) a negative sequence three-phase to two-phase transformation means for transforming measured three-phase compensator inverter terminal voltage signals into two-phase synchronously rotating reference frame signal values, DC signal extraction means for extracting a DC component corresponding to a fundamental negative sequence component of the compensator inverter terminal voltages from the two-phase signals to generate two-phase negative sequence inverter voltage command signals, and negative sequence two-phase to three-phase transformation means for transforming the two-phase negative sequence inverter voltage command signals from the two-phase reference frame to the three-phase reference frame to form three-phase negative sequence inverter voltage command signals; and (c) means for combining the three-phase positive sequence inverter voltage command signals and the three-phase negative sequence inverter voltage command signals to form a combined three-phase inverter voltage command signal.

51. A method for restoring a voltage signal provided to a load on multi-phase power lines which is affected by a fault condition, comprising the steps of:

(a) connecting a compensator inverter in series with the multi-phase power lines between a utility power source and the load, wherein the compensator inverter receives power from a DC storage device connected across a DC bus thereof; and (b) controlling the compensator inverter to generate an inverter voltage signal in series with the multi-phase power lines such that the voltage signal provided to the load is a balanced multi-phase voltage signal at the pre-fault voltage signal level, including the steps of:

(i) controlling the compensator inverter to generate an inverter voltage signal in series with the multi-phase power lines such that a positive sequence component of the voltage signal on the multi-phase power lines is equal to a pre-fault positive sequence component of the pre-fault voltage signal provided to the load; and (ii) controlling the compensator inverter to generate an inverter voltage signal in series with the multi-phase power lines such that a negative sequence component of the voltage signal provided to the load is eliminated.

52. The method of claim 51 wherein the step of controlling the compensator inverter further includes the step of controlling the compensator inverter to generate an inverter voltage signal in series with the multi-phase power lines such that a zero sequence component of the voltage signal provided to the load is eliminated.

53. The method of claim 51 wherein the step of controlling the compensator inverter includes the steps of:

(a) measuring three-phase compensator inverter terminal voltage signals;

(b) transforming the measured three-phase compensator inverter terminal voltage signals into positive sequence two-phase synchronously rotating reference frame signal values;

(c) extracting a DC component corresponding to a fundamental positive sequence component of the compensator inverter terminal voltage signals from the positive sequence two-phase signals;

(d) comparing the extracted DC component to positive sequence compensator inverter terminal voltage reference command signals to generate two-phase positive sequence inverter voltage command signals;

(e) transforming the two-phase positive sequence inverter voltage command signals from the two-phase referenced frame to the three-phase reference frame to form three-phase positive sequence inverter voltage command signals;

(f) transforming the measured three-phase compensator inverter terminal voltage signals into negative sequence two-phase synchronously rotating reference frame signal values;

(g) extracting a DC component corresponding to a fundamental negative sequence component of the compensator inverter terminal voltages from the two-phase signals to generate two-phase negative sequence inverter voltage command signals;

(h) transforming the two-phase negative sequence inverter voltage command signals from the two-phase reference frame to the three-phase reference frame to form three-phase negative sequence inverter voltage command signals;

(i) combining the three-phase positive sequence inverter voltage command signals and the three-phase negative sequence inverter voltage command signals to form a combined three-phase inverter voltage command signal; and (j) providing the combined three-phase inverter voltage command signal to the voltage compensator inverter.

* * * * *